US009922096B2

(12) United States Patent
Silverstein et al.

(10) Patent No.: US 9,922,096 B2
(45) Date of Patent: Mar. 20, 2018

(54) AUTOMATED PRESENTATION OF INFORMATION USING INFOGRAPHICS

(75) Inventors: Todd Silverstein, Portland, OR (US); D. Eli Tucker, Portland, OR (US); Jeff Cutler-Stamm, Portland, OR (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 252 days.

(21) Appl. No.: 14/131,650

(22) PCT Filed: Jul. 9, 2012

(86) PCT No.: PCT/US2012/045970
§ 371 (c)(1),
(2), (4) Date: Jan. 8, 2014

(87) PCT Pub. No.: WO2013/009710
PCT Pub. Date: Jan. 17, 2013

(65) Prior Publication Data
US 2014/0143252 A1    May 22, 2014

Related U.S. Application Data

(60) Provisional application No. 61/505,635, filed on Jul. 8, 2011.

(51) Int. Cl.
*G06F 7/00* (2006.01)
*G06F 17/30* (2006.01)
*G06Q 10/10* (2012.01)
*G06T 11/20* (2006.01)
*G06F 17/22* (2006.01)

(52) U.S. Cl.
CPC .... *G06F 17/30554* (2013.01); *G06F 17/2247* (2013.01); *G06F 17/30076* (2013.01); *G06F 17/30598* (2013.01); *G06F 17/30893* (2013.01); *G06F 17/30908* (2013.01); *G06Q 10/105* (2013.01); *G06T 11/206* (2013.01)

(58) Field of Classification Search
CPC ......... G06F 17/30893; G06F 17/30598; G06F 17/30076; G06F 17/30554; G06Q 10/105
USPC .................. 707/661, 737, 738, 748, 809
See application file for complete search history.

(56) References Cited

U.S. PATENT DOCUMENTS

| | | | | |
|---|---|---|---|---|
| 7,415,697 | B1 * | 8/2008 | Houldling | G06F 8/75 709/224 |
| 2008/0040371 | A1 * | 2/2008 | Bayyapu | G06F 9/4443 |
| 2009/0254557 | A1 * | 10/2009 | Jordan | G06F 17/30994 |

(Continued)

*Primary Examiner* — Md. I Uddin
(74) *Attorney, Agent, or Firm* — James J. DeCarlo; Greenburg Traurig, LLP

(57) ABSTRACT

In one embodiment, a web browser-based scheme for combining structured data, infographic definitions, and visual styling information to render infographics and aggregate collections of infographics, referred to herein as "Vizumes" and "Personas." In exemplary embodiments of the disclosure, a relational database and/or a file system stores user data, infographic definitions, templates and palettes; combines these elements to produce individual infographic representations or a collection of infographic/visualizations (Vizumes) on a single canvas; allows users to choose different infographic visualizations of the same underlying data; and allows users to change the layout, font style, and color palette to instantly produce different visual presentations from the same data.

9 Claims, 24 Drawing Sheets

(56) References Cited

U.S. PATENT DOCUMENTS

| | | | |
|---|---|---|---|
| 2010/0079486 A1* | 4/2010 | Baier | G06T 1/00 345/619 |
| 2010/0168874 A1* | 7/2010 | Lucas | G05B 19/0426 700/17 |
| 2012/0197870 A1* | 8/2012 | Simon | G06F 17/30448 707/722 |

* cited by examiner

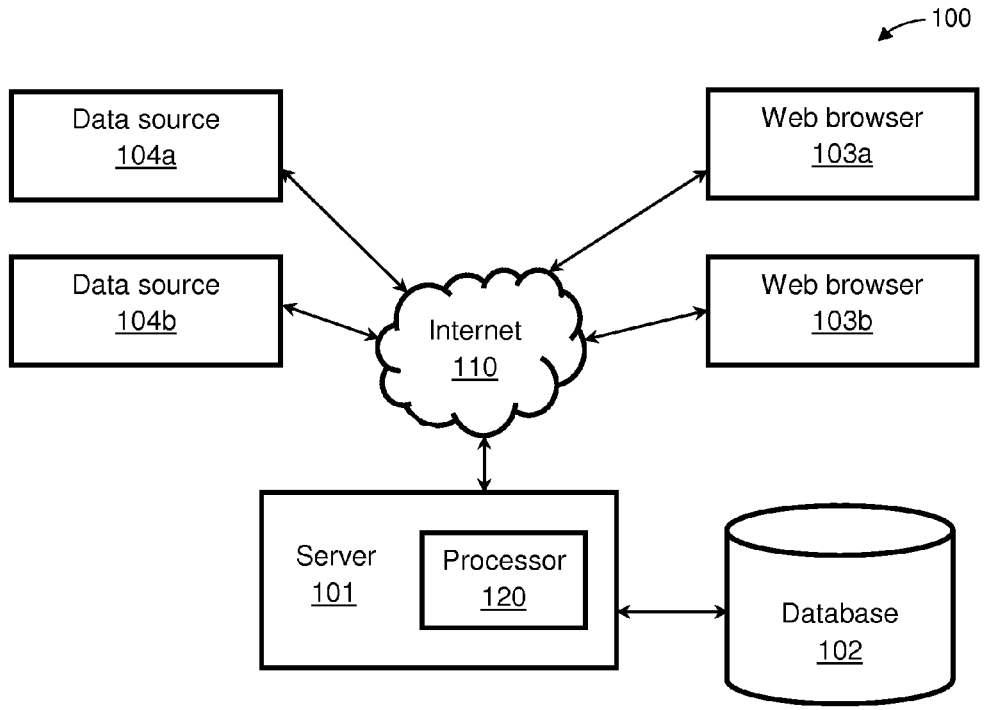

FIG. 1

```
built-in-types
        date-range
                start-date
                end-date proficiency: enum
                [beginner, intermediate, advanced, expert]

reference
                id: string infographic-definition
        name: string
        schema: reference[*]
        orientation: [vertical, horizontal]
        preferred-size
                width: [one-col, two-col, three-col]
                height: ...

persona
        datasources
                datasource
                        name: string
                        id: string
                        source:
                                type: [external, document, manual, ...]
                                url: string
                        created: date
                        updated: date
                        update-schedule: [daily, hourly, realtime, onaccess]
                        schema: reference[*]  # ref to a node in the schema hierarchy
                        data: *
```

FIG. 2a

```
name: string
headline: string
summary: string industry
        name: string
        id: string
        industry-data: *  # data specific to given industry positions
        position *
                date-range: date-range
                title: string
                company
                        name: string
                        logo: url
                        location: string
                summary: string
                narrative: string educations
        education *
                date-range
                institution
                degree
                field-of-study awards
        award *
                title: string
                date: date
patents
        patent *
                name:
                link: url
                date: date associations
        association *
                name: string
                date-range: date-range interests
        interest *
                name: string skills
        skill *
                name: string
                years: decimal
                expertise: proficiency
                positions: reference[positions]

recommendations
        recommendation *
                recommender: string
                position: reference[position]
                date: date
                text: string
```

FIG. 2b

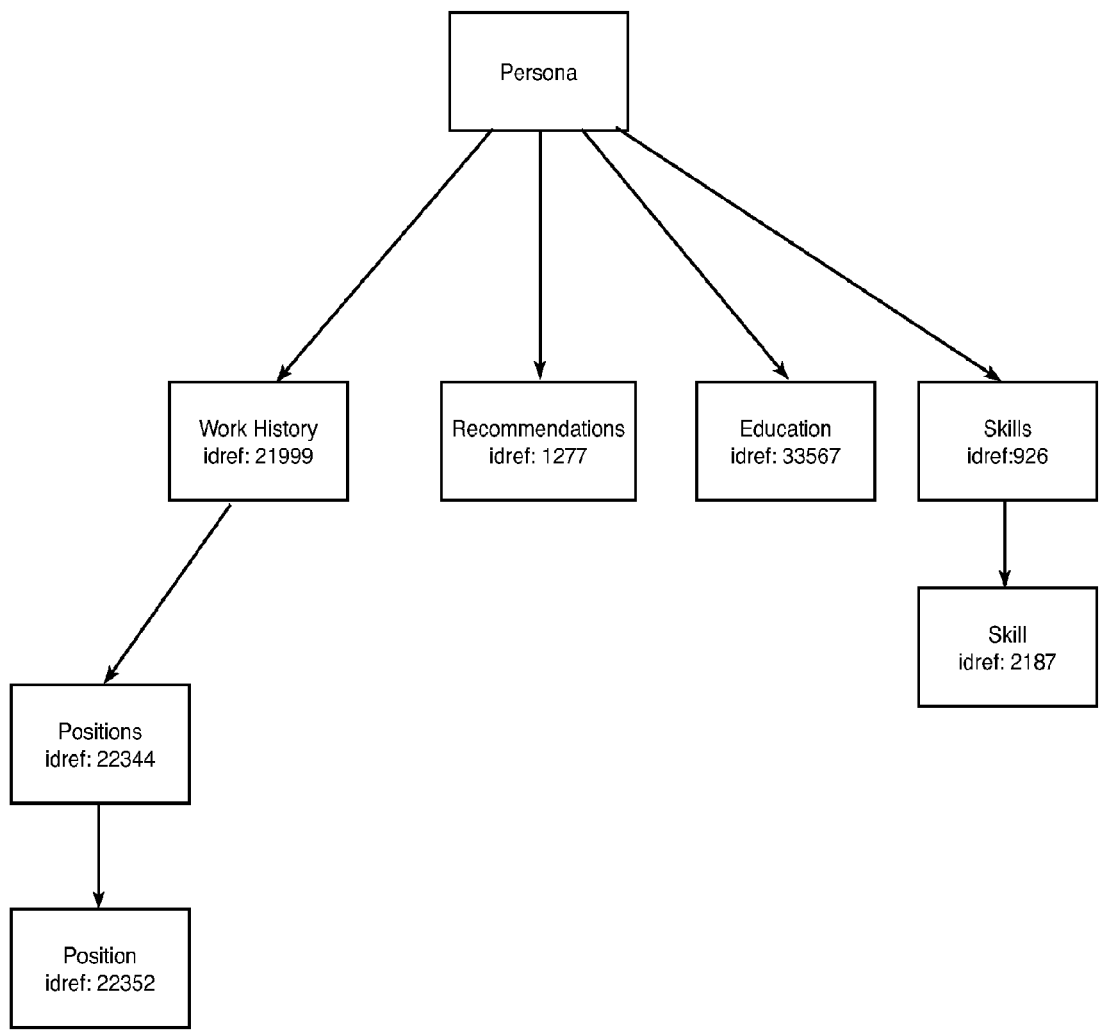

FIG. 4

```
.timeline#timeline
  .positions
    -positions.each_with_index do |pos, index|
    -color_index = position_index % 10
    -color_style = "bg-color-#{color_index}"
    -id = "position-#{pos.id}"
    %span(class="headline-container")
        %span.headline(id="#{id}")
      %span.title= pos.title
      %br
      %span.company= pos.company
    .position(id="#{id}" class="#{color_style}")
      .position-details
        .title= pos.title
        .company= pos.company
        .year(class="#{color_style}")
        .summary= pos.summary
      -position_index = position_index + 1
```

FIG. 5

```css
.timeline {
    margin-top: 30px;
    margin-left: 20px;
    margin-right: 90px;

.education {
        font-size: 14px;
        margin-top: 40px;
        border-style: double;
        border-top: black, double, thick;
        text-align: center;
    }

.education .institution {
        font-size: 24px;
        font-weight: bold;
        text-align: center;
    }

.education .honors {
        font-style: italic;
    }

.headlines {
        position: relative;
        width: 100%;
    }

.headline-container {
        font-family: "Arial Narrow", "Trebuchet MS", sans-serif;
        position: absolute;
        min-width: 150px;
        max-width: 300px;
        padding-left: 5px;
        border-left: 1px solid #cccccc;
    }

.headline-highlight {
        border-left: 2px double orange;
    }

.title {
        font-weight: bold;
        color: black;
    }

.company {
        font: 12px Arial, sans-serif;
        font-style: italic;
        color: gray;
    }
```

```css
    .level {
        position: relative;
        height: 65px;
        width: 100%;
    }

.position {
        position: absolute;
        height: 50px;
        border-left: 1px solid gray;
        font: 36px Verdana, sans-serif;
        color: #fff;
        padding-left: 2px;
        z-index: 100;
    }

.position-hover {
        color: #E9E9FF;
        background-color: #aabbdd;
        cursor: pointer;
    }

.position-details {
        padding-left: 10px;
        background-color: white;
        display: none;
        min-width: 200px;
        z-index: 0;
    }

.year {
        font: 36px Verdana, sans-serif;
        color: #fff;
        padding-left: 2px;
    }

.summary {
        font-style: italic;
        padding-top: 10px;
        padding-bottom: 10px;
    }
}
```

Template A:

-options = {:color_palette => color_palette(7),
    :font_palette => font_palette(5)}

=render :partial => "coversheet", :locals =>
 @view_locals[:coversheet].merge(options)
=render :partial => "timeline", :locals =>

@view_locals[:timeline].merge(options).merg
e(
    :style => "thin-with-milestones")
=render :partial => "recommendations",
:locals =>

@view_locals[:recommendations].merge(opti
ons)

FIG. 8a

Template B:

-options = {:color_palette => color_palette(1),
    :font_palette => font_palette(2)}

=render :partial => "coversheet". :locals =>
 @view_locals[:coversheet].merge(options)
=render :partial => "timeline", :locals =>

@view_locals[:timeline].merge(options).merg
e(
    :style => "thick")
=render :partial => "recommendations",
:locals =>

@view_locals[:recommendations].merge(opti
ons)

FIG. 8b

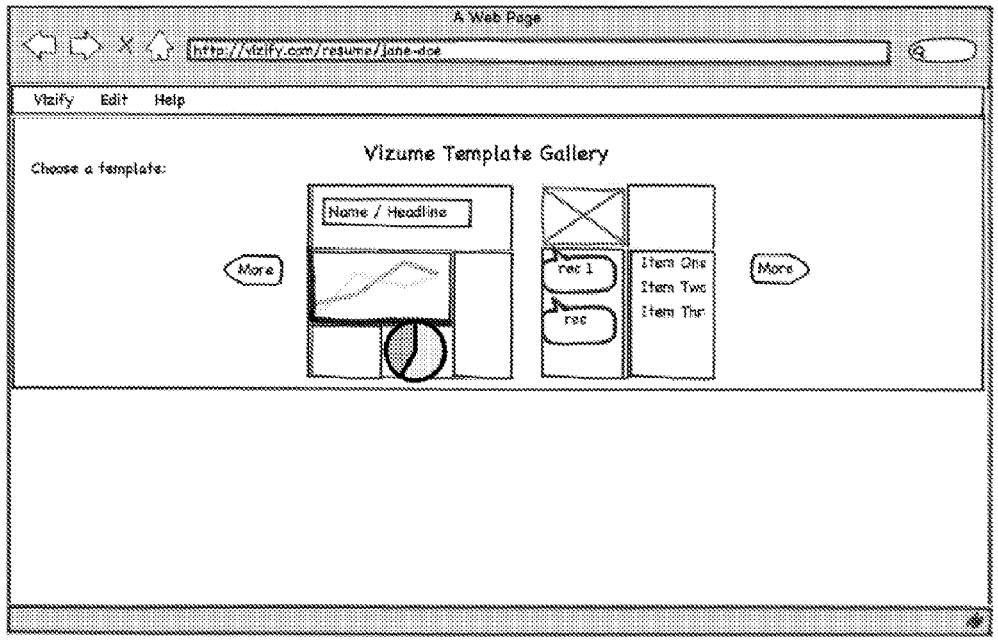

FIG. 9

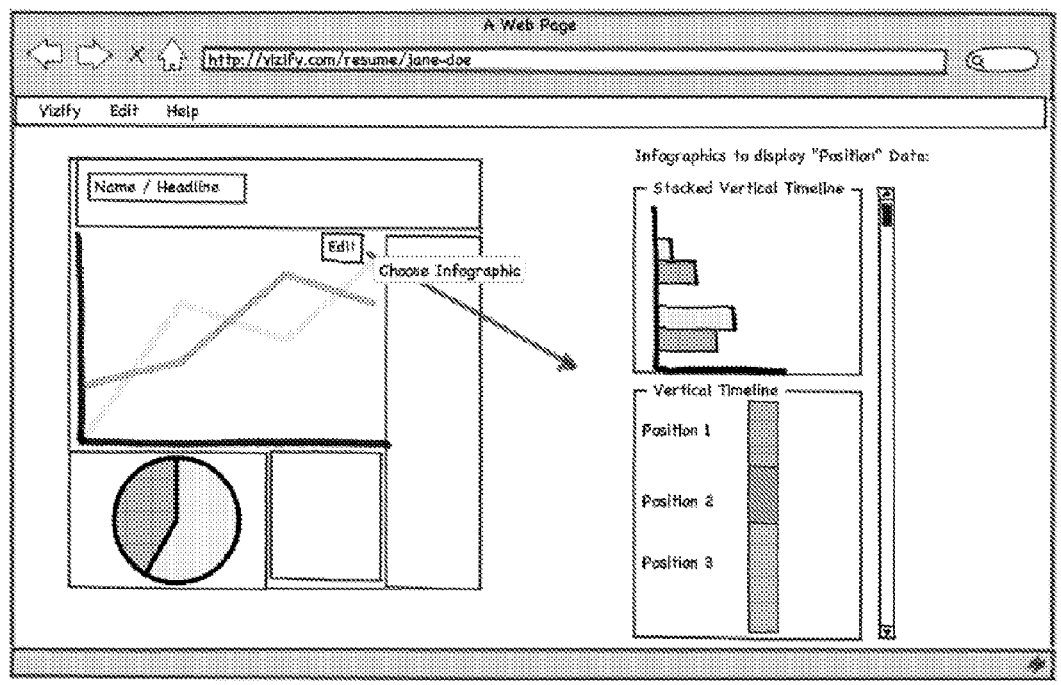
FIG. 10
```
-options = {:color_palette => color_palette(1),
           :font_palette => font_palette(2)}
.container
  .half-width-column
    =render :partial => "timeline", :locals =>
     @view_locals[:timeline].merge(options).merge(
          :style => "thick", :orientation => "vertical")
  .half-width-column
    =render :partial => "recommendations", :locals =>
     @view_locals[:recommendations].merge(options)
```
FIG. 11
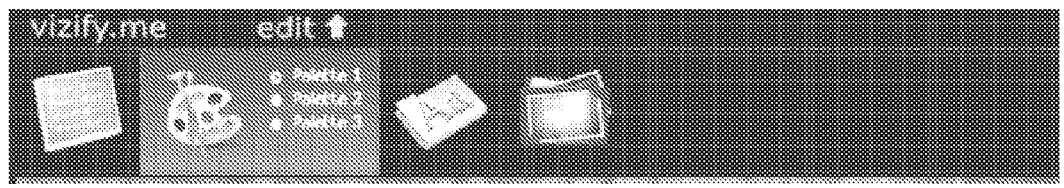
FIG. 12

Persona A:

```
"persona" : {
        "positions" : {
                "position" : {
                        "idref" : 1
                },
                "position" : {
                        "idref" : 2
                },
                "position" : {
                        "idref" : 3
                }
        }
        ...
}
```

FIG. 14a

Persona B:

```
"persona" : {
        "positions" : {
                "position" : {
                        "idref" : 2
                },
                "position" : {
                        "idref" : 4
                },
                "position" : {
                        "idref" : 5
                }
        }
        ...
}
```

FIG. 14b

```
"persona" : {
        "bignumbers" : {
                "bignumber" : {
                        "id" : 78110
                        "number" : {
                                "idref" : 7793
                        }
                        "text" : {
                                "idref" : 7890
                        }
                },
                "bignumber" : {
                        "id" : 78111
                        "number" : {
                                "idref" : 8873
                        }
                        "text" : {
                                "idref" : 8881
                        }
                }
        }
        ...
}
```

FIG. 15

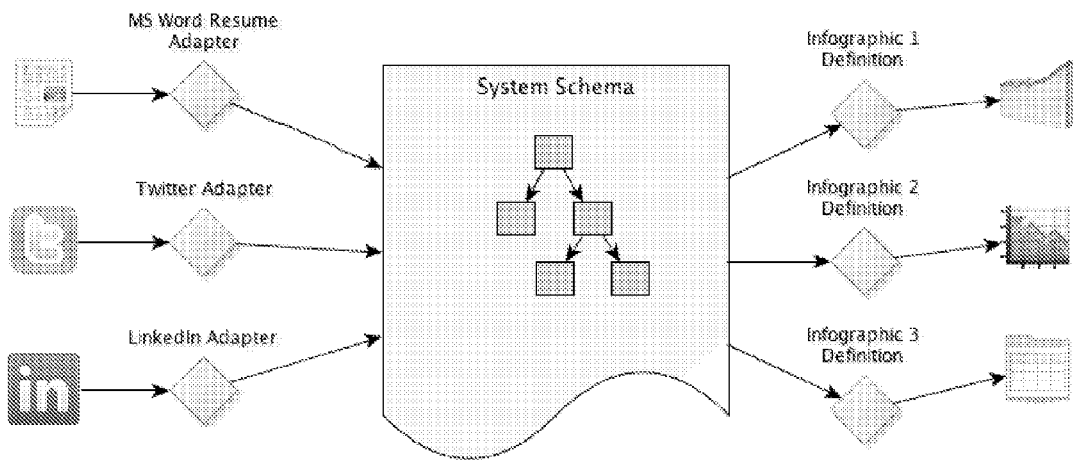

FIG. 16

Work History

Senior Software Engineer,           Acme Corp.      1999-2004
Responsible for all aspects of Acme SuperWidget....

Software Engineer,                BigCo Inc.      1995-1999
Instrumental in building BigCo's flagship product....

FIG. 17a

```
"workhistory" : {
        "positions" : {
                "position" : {
                        "id" : 1
                        "company" : "Acme Corp."
                        "title"   : "Senior Software Engineer"
                        "summary" : "Responsible for all aspects..."
                        "date-range" : {
                                "start-year" : 1999,
                                "end-year"   : 2004
                        }
                },
                "position" : {
                        "id" : 2
                        "company" : "BigCo Inc."
                        "title"   : "Software Engineer"
                        "summary" : "Instrumental in building..."
                        "date-range" : {
                                "start-year" : 1995,
                                "end-year"   : 1999
                        }
                }
        }
        ...
}
```

FIG. 17b

AUTOMATED PRESENTATION OF INFORMATION USING INFOGRAPHICS

CROSS-REFERENCE TO RELATED APPLICATIONS

This application is a United States National-Stage Application, filed under 35 U.S.C. § 371, of Patent Cooperation Treaty Application Serial No. PCT/US2012/045970, filed on Jul. 9, 2012, which claims the benefit of and priority to U.S. Provisional Patent Application Ser. No. 61/505,635, filed Jul. 8, 2011, the disclosures of both of which are hereby incorporated by reference in their entirety.

BACKGROUND

Technical Field

The present disclosure relates, generally, to the display of data, and more particularly, to the graphical presentation and arrangement of data for visual presentation.

Description of the Related Art

Infographics (or data visualizations) are graphical representations of information, data, or knowledge, which representations include one or more text elements and/or graphic elements. The use of infographics has increased in recent decades in both consumer and corporate domains. However, most professionals (including, e.g., individuals, organizations, professional practitioners, service providers, and small-business owners) do not employ infographics to present their professional résumé or profile, nor to convey information about their accomplishments, skills, capabilities, services, or effectiveness, for various reasons.

At the most fundamental level, many professionals lack the ability to produce attractive graphics on their own, let alone infographics designed to effectively convey particular personalized professional or service information. Accordingly, specialists such as design professionals and computer/web developers are typically hired to produce such graphics. Once an infographic has been designed, several rounds of manual rework with the specialist might be involved, such as to significantly change its design (e.g., converting a horizontal plot to a vertical plot) or to update the style of the graphic or its elements (e.g., its fonts, or colors). Additionally, an infographic designed at a particular point in time might involve an additional round of manual rework with the specialist each time new information becomes available.

In addition, the typical professional does not have their personal or professional data organized in a coherent and usable format for the construction of an infographic via a purely algorithmic drawing technique. Often, such data is in lexical, unstructured form, such that generating an infographic would involve the costly and time-consuming process of gathering and transforming the data into a coherent and usable format. Moreover, the use of data in a given infographic often involves manually plotting the data prior to the construction of the infographic itself, often to explore manually the best way for presenting that set of data prior to finalizing the presentation, often even prior to being able to identify an appropriate type of infographic for displaying the data.

Other barriers to the creation of infographics exist even for specialists who routinely create such infographics. Conventionally, there has been no marketplace that connects those seeking to have personal/professional infographics created with the designers, creators, and editors of those infographics, nor a marketplace with infographics templates available for purchase. Nor are conventional methods known for tracking or quantifying a viewer's engagement with and/or attention to a given infographic, including the numbers of loads and/or views, and the numbers of clicks, views, time spent viewing, and/or events associated with the individual components of a given infographic. No conventional scheme is known for test-marketing (using, e.g., A/B or multivariate testing) a given infographic rendered in different views and formats in order to identify the most effective presentation of a given set of data. Nor do systems exist for varying the presentation of a particular infographic based on a owner-supplied list of rules, or other data gathered and/or generated by a potential infographic viewer, such as the specific URL or entry path a potential viewer takes to a given infographic, their clickstream behavior prior to seeing an infographic, or preferences they might provide prior to the viewing of an infographic. Further, no systems are known for readily extracting and showing benchmarks for comparable data that happens to be expressed across a collection of infographics, especially those with varying design formats. Additionally, there are typically no systems for packaging a collection of individual infographics into larger objects that can be treated as coherent documents, nor any methods for enabling the infographic to be dynamic and interactive, such as by showing a summary view of a set of data that can be further expanded through event-driven triggers, without having to specifically model those interactions on a one-off basis, in conjunction with a computer programmer.

Additional challenges exist because there are no known systematic, repeatable solutions for those seeking to work with collections of infographics that collectively represent more than one individual or subject area. More specifically, there is no known systematized method for assembling a "portfolio" of professionals, where the professionals are represented by individual instances of one or more particular infographics reflecting either the identity of those professionals or some aspect of their professional skills or services. Even if such a portfolio were assembled, there are currently no methods for normalizing the infographic presentations according to a design "override" established by a portfolio builder or viewer (including, e.g., selection of which data elements to include/exclude, and optionally remapping the presentation related to those elements). Nor are there known methods for transmitting the portfolio to a third party or website for viewing and interaction, or methods for allowing the viewer to further remap the presentation of those elements to their own specification.

Additionally, there are no known conventional methods for dynamically creating an "aggregate infographic" that collectively summarizes the equivalent infographics in the portfolio. For example, if there are a number of infographics representing an individual attorney's practice specialties, there is no known method for using an aggregate infographic to portray the skills of an entire group of lawyers, whether through layered overlays or through aggregated sums that could point to the individual data comprising those sums. Even if a portfolio as described above were assembled, there are also no known methods for measuring engagement with the portfolio as a whole, including numbers of views and identifying interaction/engagement with particular infographics within the portfolio. Finally, there are no known methods to take a collection of homologous infographics and automatically generate benchmarks, averages, and mean comparisons, particularly where the presentation of those infographics or the amount of data they contain varies.

SUMMARY

Embodiments of the disclosure provide solutions to the foregoing problems and additional benefits, by providing schemes for generating, manipulating, measuring engagement with, and facilitating transactions related to infographics, especially infographics concerned with the presentation of either an individual's professional résumé, profile, accomplishments, skills/capabilities, services, or effectiveness and/or a particular group's (i.e., a collection of individuals') presentation of their aggregate résumés, profiles, accomplishments, skills/capabilities, services, and/or effectiveness.

In one embodiment, a processor-implemented method for creating one or more infographics includes: (a) the processor receiving, from one or more third-party services, data in a first format, the data associated with an individual or an entity; (b) the processor mapping the data from the first format to a second format according to a schema; (c) the processor storing the mapped data, in the second format, on one or more storage devices; (d) the processor reading at least a portion of the mapped data from one or more storage devices; (e) the processor reading an infographic definition from one or more storage devices; (f) the processor generating one or more infographics based on (i) the at least a portion of the mapped data and (ii) the infographic definition; and (g) the processor providing the one or more generated infographics to an output device.

In another embodiment, an apparatus for creating one or more infographics includes a processor adapted to: (a) receive, from one or more third-party services, data in a first format, the data associated with an individual or an entity; (b) map the data from the first format to a second format according to a schema; (c) store the mapped data, in the second format, on one or more storage devices; (d) read at least a portion of the mapped data from one or more storage devices; (e) read an infographic definition from one or more storage devices; (f) generate one or more infographics based on (i) the at least a portion of the mapped data and (ii) the infographic definition; and (g) provide the one or more generated infographics to an output device.

In another embodiment, a non-transitory machine-readable medium has encoded program code, wherein, when the program code is executed by a machine, the machine implements a method for creating one or more infographics, the method including: (a) receiving, from one or more third-party services, data in a first format, the data associated with an individual or an entity; (b) mapping the data from the first format to a second format according to a schema; (c) storing the mapped data, in the second format, on one or more storage devices; (d) reading at least a portion of the mapped data from one or more storage devices; (e) reading an infographic definition from one or more storage devices; (f) generating one or more infographics based on (i) the at least a portion of the mapped data and (ii) the infographic definition; and (g) providing the one or more generated infographics to an output device.

In another embodiment, a processor-implemented method for creating one or more infographics includes: (a) the processor reading, from one or more storage devices, stored data associated with two or more individuals or entities; (b) the processor reading an infographic definition from one or more storage devices; (c) the processor generating one or more aggregate infographics based on (i) the stored data associated with the two or more individuals or entities and (ii) the infographic definition; and (d) the processor providing the one or more generated aggregate infographics to an output device.

In another embodiment, an apparatus for creating one or more infographics includes a processor adapted to: (a) read, from one or more storage devices, stored data associated with two or more individuals or entities; (b) read an infographic definition from one or more storage devices; (c) generate one or more aggregate infographics based on (i) the stored data associated with the two or more individuals or entities and (ii) the infographic definition; and (d) provide the one or more generated aggregate infographics to an output device.

In another embodiment, a non-transitory machine-readable medium has encoded program code, wherein, when the program code is executed by a machine, the machine implements a method for creating one or more infographics, the method including: (a) reading, from one or more storage devices, stored data associated with two or more individuals or entities; (b) reading an infographic definition from one or more storage devices; (c) generating one or more aggregate infographics based on (i) the stored data associated with the two or more individuals or entities and (ii) the infographic definition; and (d) providing the one or more generated aggregate infographics to an output device.

BRIEF DESCRIPTION OF THE DRAWINGS

FIG. 1 is a system diagram illustrating an exemplary infographic system consistent with one embodiment of the disclosure;

FIGS. 2a and 2b collectively show code for the implementation of an exemplary system schema, in one embodiment of the disclosure;

FIG. 4 shows an exemplary schematic for a Persona in one embodiment of the disclosure;

FIG. 5 shows code for the implementation of an exemplary HAML timeline infographic definition, in one embodiment of the disclosure;

FIG. 6 shows code for the implementation of a timeline stylesheet, in one embodiment of the disclosure;

FIG. 7 shows the transformation of variant views of the same data that results from changing the visualization definition, in one embodiment of the disclosure;

FIG. 8a shows an exemplary HAML template labeled "Template A," in one embodiment of the disclosure;

FIG. 8b shows an exemplary HAML template labeled "Template B," in one embodiment of the disclosure;

FIG. 9 shows a screen view of the template gallery, in one embodiment of the disclosure;

FIG. 10 shows a screen view of template selection, in one embodiment of the disclosure;

FIG. 11 shows code for an exemplary template, in one embodiment of the disclosure;

FIG. 12 shows an exemplary color-palette control screen view, in one embodiment of the disclosure;

FIG. 14a shows an excerpt from an exemplary Persona A, in one embodiment of the disclosure;

FIG. 14b shows an excerpt from an exemplary Persona B, in one embodiment of the disclosure;

FIG. 15 shows another exemplary Persona for a user, in one embodiment of the disclosure;

FIG. 16 graphically illustrates an exemplary transformation pipeline, in one embodiment of the disclosure;

FIG. 17a shows a Microsoft Word-formatted résumé document fragment, in one embodiment of the disclosure;

FIG. 17b shows a schema-compatible Data Store fragment derived from the document fragment of FIG. 17a, in one embodiment of the disclosure;

DETAILED DESCRIPTION

Figure 3:
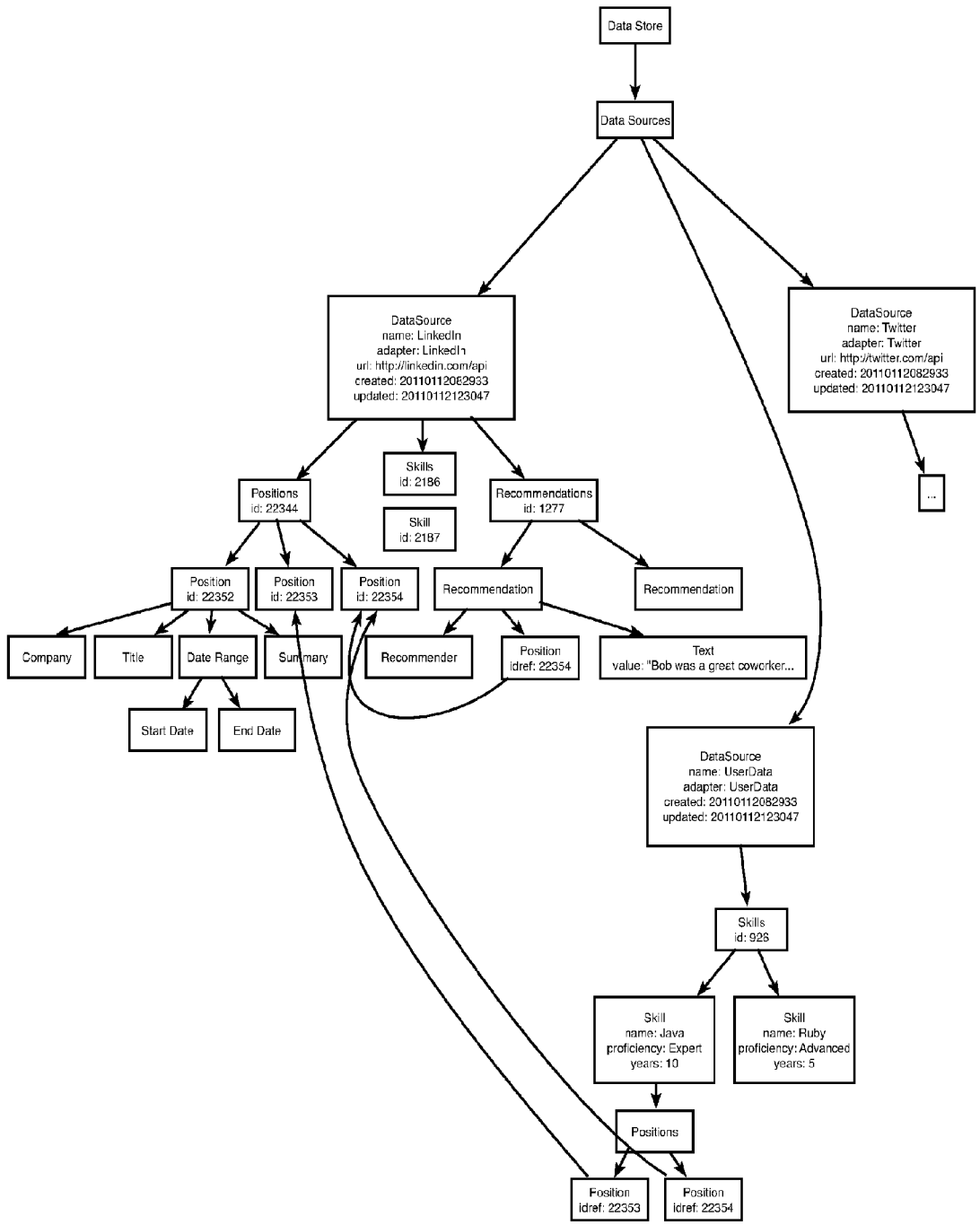
FIG. 3 shows an exemplary schematic for a Data Store in one embodiment of the disclosure.

Embodiments of the disclosure provide web browser-based schemes for combining structured data, infographic definitions, and visual styling information to render infographics and aggregate collections of infographics. In certain embodiments of the disclosure, a relational database and/or a file system stores user data, infographic definitions, templates and palettes. These elements are then combined to produce either individual infographic representations or a collection of infographics or visualizations on a single canvas. Users may choose different infographic visualizations of the same underlying data and can change particular visual aspects, such as layout, font style and color palette, to instantly produce different visual presentations.

FIG. 1 shows an exemplary infographic system 100 consistent with one embodiment of the disclosure. As shown, system 100 includes an infographic server 101 coupled to a database 102 and having a processor 120 adapted to perform functions based on software instructions, to implement the functionality described in various embodiments of the disclosure herein. Infographic server 101 is in communication, via the Internet 110, with one or more web browsers 103a, 103b and one or more data sources 104a, 104b. Web browsers 103a, 103b might be used, e.g., by a user employing server 101 to create and/or edit infographics, or alternatively, by a viewer (such as a prospective employer) of those infographics. Data sources 104a, 104b contain the underlying data used by server 101 to create infographics and might include, e.g., LinkedIn, Twitter, and other web services.

Vizume (Infographic Representation) Scheme

An exemplary scheme for representing one or more infographics based on separate structured data, visual infographic definitions, and visual styling elements will now be described. In one exemplary scheme for representing infographics, server 101 employs the structured data, infographic definitions, and visual styling information to render, in a web browser, "Vizumes," which are infographics and aggregate collections of infographics. A specific instance of a Vizume that belongs to a given user will be referred to herein as a "Persona."

Various embodiments of this scheme may include one or more of the following features: a template language that allows non-developers/designers the ability to easily define their own infographics; the ability to save these definitions as partial or complete templates; the ability for different authors/designers to specify individual components of an infographic (e.g., only the color palette) in a templated format; dynamically rendering one or more infographics from this representation or saved template; enabling visual reskinning and transformation of an infographic while preserving the underlying data; generating multiple presentations (or Personas) from a single data seed; bundling a collection of infographics into a single aggregate object (or Vizume) that can also be manipulated in similar fashion; enabling the infographic owner to order independent infographics into layouts or sequences that can serve as comic-book like narratives; updating those layouts; providing a set of base-infographic definitions from which non-developers/designers can define specific instances by providing minimal configuration information; defining an infographic in terms of the schema of the data to be displayed; and relating a base-infographic definition to a schema element.

A running example will be used to describe how server 101 stores user data, infographic definitions, templates and palettes, how the system combines these elements to produce Vizumes, i.e., individual infographic representations or a collection of infographic visualizations, on a single canvas; how the system allows users to choose different infographic visualizations of the same underlying data; and how the layout, font style and color palette can be changed to instantly produce different visual presentations. In one embodiment, server 101 executes a Ruby on Rails ("Rails") web application that employs, e.g., HTML Abstraction Markup Language (HAML), Syntactically Awesome Stylesheets (SASS) stylesheet language, Cascading Style Sheets (CSS) stylesheet language, JavaScript scripting language, jQuery JavaScript library, and other web-application components. Data in the system is stored in a relational database 102 and/or a file system.

In one embodiment, an infographic definition includes one or more of the following elements: (i) a reference to the subset of the schema describing the data that is to be visualized (e.g., a timeline infographic definition might have a reference to "positions" in the schema), (ii) transformation rules governing how the schema data is to be transformed to an intermediate "pre-rendered" representation, such as Hypertext Markup Language (HTML), (iii) visual settings affecting layout, look and feel (e.g., orientation, style, size, colors, fonts, etc.), and (iv) rendering rules specifying how individual data elements are to be rendered.

In one embodiment, structured data in the system is described by a system schema that defines the data types and relationships between data elements in the system. The schema also provides information used by the system to dynamically construct editing components to edit data represented by the schema. Infographics are defined in part by the types of data they visualize according to the schema. The system employs the schema for several main features such as: (i) defining infographics in terms of the data they visualize, (ii) assisting system users in selecting data to visualize with a given infographic, (iii) assisting users in selecting infographics compatible with a given type of data, and (iv) automatically generating editing components and/or forms that enable users to add, remove, and edit data. FIGS. 2a and 2b collectively show code for the implementation of an exemplary system schema, in one embodiment of the disclosure.

FIG. 3 shows an exemplary schematic for a Data Store (also referred to herein as a "Data Store tree") in one embodiment of the disclosure. The term "Data Store" refers to a unique set of stored data corresponding to a given user of the system. In this embodiment, the Data Store stores the user's professional information as a tree of JavaScript Object Notation (JSON) data structured according to the schema. The Data Store tree stores lexical, time series, and scalar data from a variety of data sources, such as LinkedIn, Twitter, and other web services, including data that can be supplied by the user by directly editing infographics. Although the Data Store itself may be generally contained within database 102 (or some other storage medium), it should be understood that the Data Store may also include links, pointers, or other references to external data sources for some underlying data, rather than the underlying data itself, as will be discussed in further detail below.

FIG. 4 shows an exemplary schematic for a Persona (also referred to herein as a "Persona tree") in one embodiment of the disclosure. Each data element in the Data Store has a unique element ID attribute that can be used by system modules to locate and refer to that element. The system implements a mechanism called a "Persona," which embodies a collection of such element ID references to specific data elements. This enables a system user to create multiple disparate views of the same underlying Data Store for the purpose of presenting alternate Vizumes. For example, a user applying for two different jobs might create two different Vizumes reflecting different aspects of his or her professional experience. The data in the Data Store presented by a Vizume is accessed through a Persona. The Persona in the running example contains a user's LinkedIn profile data including work experience, education, skills, and recommendations. In this example, the "Recommendations" element with "idref: 1277" refers to element ID no. 1277 in the Data Store, which is a link to a list of recommendations from the LinkedIn data source in the Data Store tree (see FIG. 3). That list of recommendations is referred to in its entirety, with no alterations. The "Skills" element with "idref: 926" refers to element ID no. 926 in the Data Store, which is a list of skills from the LinkedIn data source in the Data Store tree. The child "Skills" element with "idref: 2187" is a reference to an additional skill residing in the Data Store tree because that skill was manually entered by the user. This child element is appended to the list referenced by its parent element.

In this embodiment, a template mechanism is provided to allow third-party designers the ability to easily define their own infographics. These definitions can be saved as partial or complete templates. An exemplary system consistent with embodiments of the disclosure typically contains some number of predetermined infographic definitions. In the running example, the following exemplary infographic descriptions are represented: a timeline displaying positions held ordered by time, a visual depiction of the user's recommendations from colleagues, a headline component to display the user's name and headline, and a "bignumber" component to display the number of LinkedIn connections for this user.

In this exemplary system, these infographic definitions are written in HAML and stored as Rails partial templates. HAML provides a flexible content-generation template engine, and the structure of the HAML template defines how the Persona data is transformed into a pre-rendered form, namely HTML annotated with element IDs and CSS class names. This pre-rendered form is delivered to a web browser for rendering and display to a viewer. FIG. 5 shows code for the implementation of an exemplary HAML timeline infographic definition, in one embodiment of the disclosure.

The exemplary system uses web-standard SASS/CSS stylesheets to specify layout and visual styling of infographic elements. Stylesheets are delivered to a web browser along with pre-rendered HTML for final infographic rendering. The use of web-standard stylesheets enables third-party developers and/or designers to design their own infographics. Stylesheets reference data elements by semantic attributes, such as class and element ID. This enables the same underlying data to be "reskinned" and displayed in multiple different ways, because multiple different stylesheets can be chosen that reference the same data by class name or element ID. FIG. 6 shows code for the implementation of a timeline stylesheet, in one embodiment of the disclosure.

Figure 7:
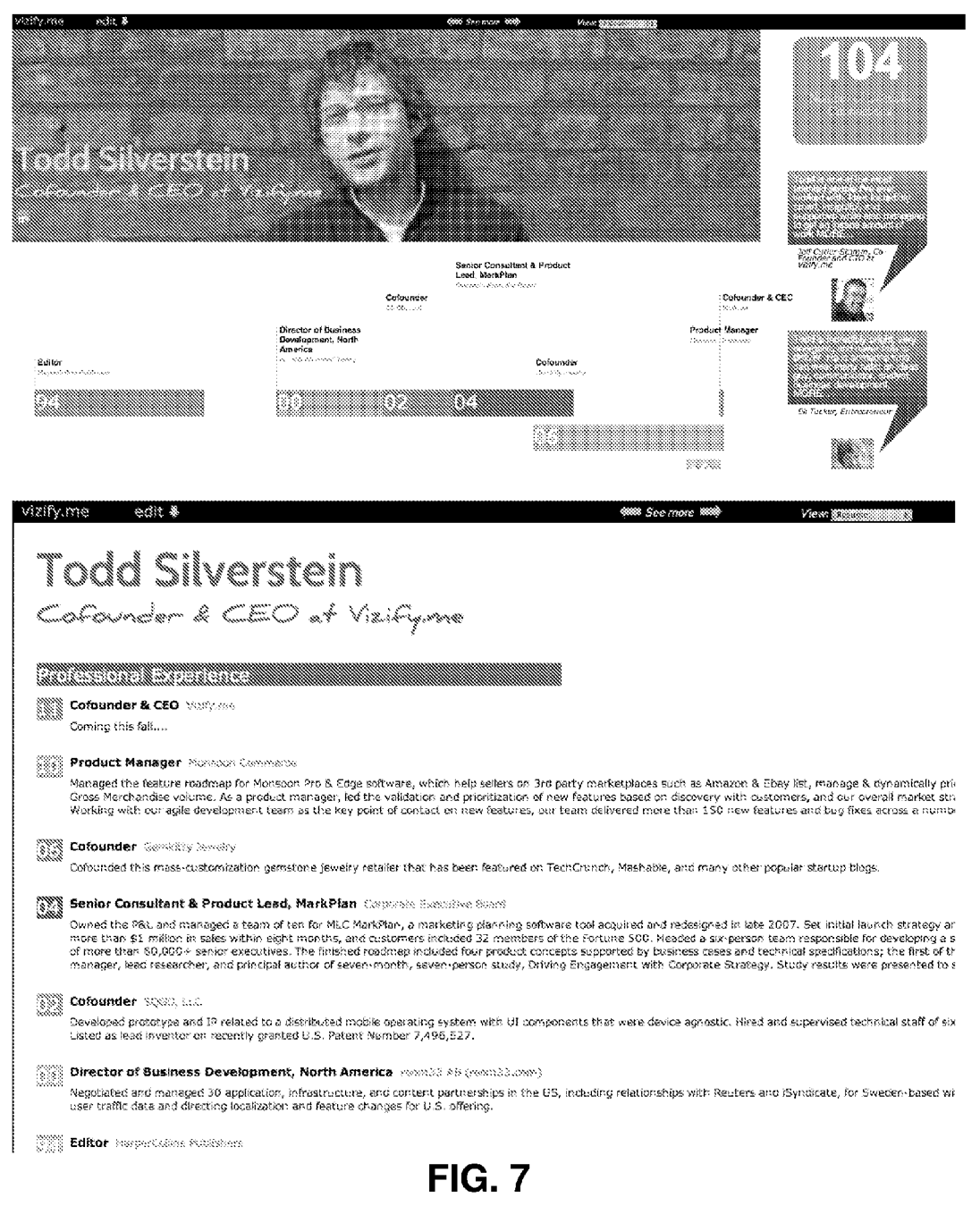

As a result of this structure, by changing the visualization definition, visually transforming or "restyling" the visualization for a given set of data can be accomplished quickly and with relatively little skill on the part of the user. For example, as shown in FIG. 7, a given user's headline (name and summary) and professional experience (as represented by a visual timeline in the top portion of the image and a more traditional résumé format in the bottom portion of the image) can be easily switched between these two representations by applying and rendering different visualization stylesheets.

Third-party authors can thus create new infographics by writing HAML and/or HTML templates and SASS and/or CSS stylesheets. The HAML template specifies how data represented by the system schema is transformed into HTML, and the SASS template specifies how that HTML is to be styled and/or rendered by the browser. In one embodiment, a user interface is provided that allows third-party authors to upload these HAML and SASS template files and give a name to the resulting infographic. The resulting infographic is then registered in the system and made available for selection by end users and Vizume template authors via a Gallery user interface, as is described in further detail below.

In one embodiment, a set of base infographic definitions is provided, from which third-party designers can define specific instances by providing minimal configuration information. Such base infographic types may include one or more of: (i) timeline (e.g., a visual timeline of jobs/positions in a user's work history), (ii) headline (e.g., an introductory component with headline text in a large font), (iii) bignumber (e.g., a component to display a single number in a large font with explanatory text), (iv) matrix (e.g., a multi-dimensional table used to display skills, languages, and other personal attributes), (v) table (e.g., a simple table for displaying two-dimensional data), (vi) bar graph (e.g., a standard bar graph to display numeric data), (vii) line graph (e.g., a standard line graph to display numeric data), (viii) pie chart (e.g., a standard pie chart to display numeric data), (ix) word cloud (e.g., a component to display text data with variable text sizes depending on word frequency or other attributes), (x) recommendations/quotes (e.g., a component to display recommendations and/or endorsements from other people), (xi) radial list (e.g., a list of values displayed in a radial manner), (xii) scaled or interval values, and (xiii) time-series data.

These base types provide properties that allow a designer or template author to configure them to produce specific variants. For example, the timeline has an orientation property allowing it to be configured to display vertically or horizontally, the word cloud has properties to define how text is scaled based on word frequency or other attributes, the matrix has several properties that define the dimensions of data displayed, based on the corresponding schema, and so forth.

Third-party designers can create specific variants of the base infographic types by specifying values for these configuration properties and saving the result as a named variant (e.g. "Vertical Timeline"). This method of customizing permits system users without significant design talent to create their own variant infographics in order to personalize the presentation of their information.

The foregoing exemplary base infographic types are defined using the same mechanism afforded to designers to create their own infographic definitions. Designers can thus create their own base types by declaring one or more settable properties to enable minimal configuration by either other designers or system users. Thus, the capabilities of the system are infinitely expandable based on third-party input.

In one embodiment, a template language is provided that allows third-party developers and/or designers the ability to easily define their own aggregate infographic presentations, i.e., Vizumes, and the ability to save these definitions as templates. This permits users and designers with varying degrees of technical ability to create custom themes and more complex templates (e.g., with component arrangement and advanced functionality) by creating their own infographic visualizations and visualization themes, thereby enriching the kinds of infographics available through the system and the variety of style variants that can be applied to them.

Vizume templates combine references to multiple infographic definitions, color and font palettes, and layout information to produce a single aggregate infographic (i.e., a Vizume) from a set of component infographics. The system allows third-party authors and designers to create templates by visually selecting their components from a gallery of choices and optionally providing values for settings exposed by the component infographics.

The exemplary system includes a library of templates also written in HAML specifying the layout and ordering of infographics to create different aggregate infographic views of the user's Persona. Each template also contains a reference to a default color palette and a default font palette, which govern the overall appearance of the infographic.

Templates specify which infographics to display and how they are to be displayed. Each infographic may support a number of settings, such as orientation, style, and size, which govern the look and feel of the infographic when it is rendered. Their containing template can provide values for these settings. Reasonable default values are provided for settings not specified in the template. In one embodiment, the timeline infographic in the exemplary system supports a "style" setting having two possible values, "thin-with-milestones" and "thick." These settings allow a template author to quickly assemble unique presentations of Persona data.

FIG. 8a shows an exemplary HAML template labeled "Template A," and FIG. 8b shows an exemplary HAML template labeled "Template B," in one embodiment of the disclosure. Templates A and B differ in their respective "color_palette" and "font_palette" settings as well as their respective "style" settings specific to the timeline infographic.

In one embodiment, the exemplary system provides a layout canvas in a web browser to allow template creation and editing, as will now be discussed in further detail. As shown in the template-gallery screen view of FIG. 9, a template author assembles a template by choosing component infographics from a gallery view. As shown in the template selection screen view of FIG. 10, the author chooses an infographic by dragging it onto the canvas. As discussed above, the template definition also contains the styles to be applied to the infographics contained with the templates. In the system infographic, the term "variants" refers to different infographic views of the same underlying data.

As shown in FIG. 10, an exemplary process for selecting a given infographic includes two steps. First, as seen on the left portion of FIG. 10, an infographic representation of a given set of data is selected. The selected infographic representation is used as the "visualization master," i.e., the visualization from which a plurality of variants is derived. Second, as seen on the right portion of FIG. 10, the particular visual variation to be applied to the data is then selected. The exemplary system also supports an alternate method where the foregoing two steps are combined, by simply presenting all of the infographics (and variants) for direct selection by the user.

Infographics are laid out on the canvas by means of a container structure of HTML <div> and <span> elements with CSS class attributes referenced by a default stylesheet. The default stylesheet sets properties for these classes to effect a particular layout. In the exemplary system, individual infographics are referenced from the template as Rails partials.

FIG. 11 shows an exemplary template having a two-column layout with a vertical timeline in the left column and a block of recommendations in the right column. The default stylesheet would contain the following property settings for the 'half-width-column' class:

```
.half-width-column {
    width: 50%;
}
```

Once created, templates are stored in the system database or file system and made available for system users to choose. Using the "template gallery" user interface, which shows a thumbnail of each template in a scrolling view, the user can instantly change the presentation of her Persona data by simply selecting different templates.

In one embodiment, the system provides the ability for different authors and/or designers to specify individual styling components of an infographic (e.g., only the color palette) in a templated format. Each infographic definition refers to colors and fonts by reference to a name defined in a palette, rather than specifying them directly. For example, an infographic definition might specify an element's foreground color as $color-1 and its font as $font-1 in a selected palette. These names are resolved into RGB and font values when the infographic definition is combined with color and font palettes at the time of rendering.

In one embodiment, a color palette is a file containing a collection of SASS variables that map color names to RGB values. An example of such a mapping follows:

```
$foreground-color = #ffffff;
$background-color = #cccccc;
$color-1 = #000000;
$color-2 = #0000ff;
$color-3 = #fb6547;
...
```

Font palettes are defined in substantially the same manner, as the following example shows:

```
$body-font = 12pt Arial;
$h1-font = 16pt bold Helvetica;
$h2-font = 14pt bold Helvetica;
...
$font-1 = 32pt Comic Sans;
$font-2 = 18pt Times Roman;
...
```

The exemplary system provides a web-form user interface that allows authors and/or designers to create new color and font palettes by selecting RGB values for each color name and font values for each font name. The author then provides a name for the new palette, which is then stored in the system database.

Once stored, color and font palettes are made available for selection from a gallery view, as shown in FIG. 12. From the gallery, a system user can select a palette to apply that palette to a Vizume.

In one embodiment, one or more infographics can be dynamically rendered from a saved template. As discussed above, a fully-rendered view of a single infographic or collection of infographics is referred to as a Vizume. A Vizume contains references to a Persona and a Vizume template, which are combined by the system to render the Vizume. The following discussion describes how, in one embodiment, the system combines data from the Persona with the infographic definitions, layout, and style information in the Vizume template, to render a Vizume in a web browser.

Figure 13:
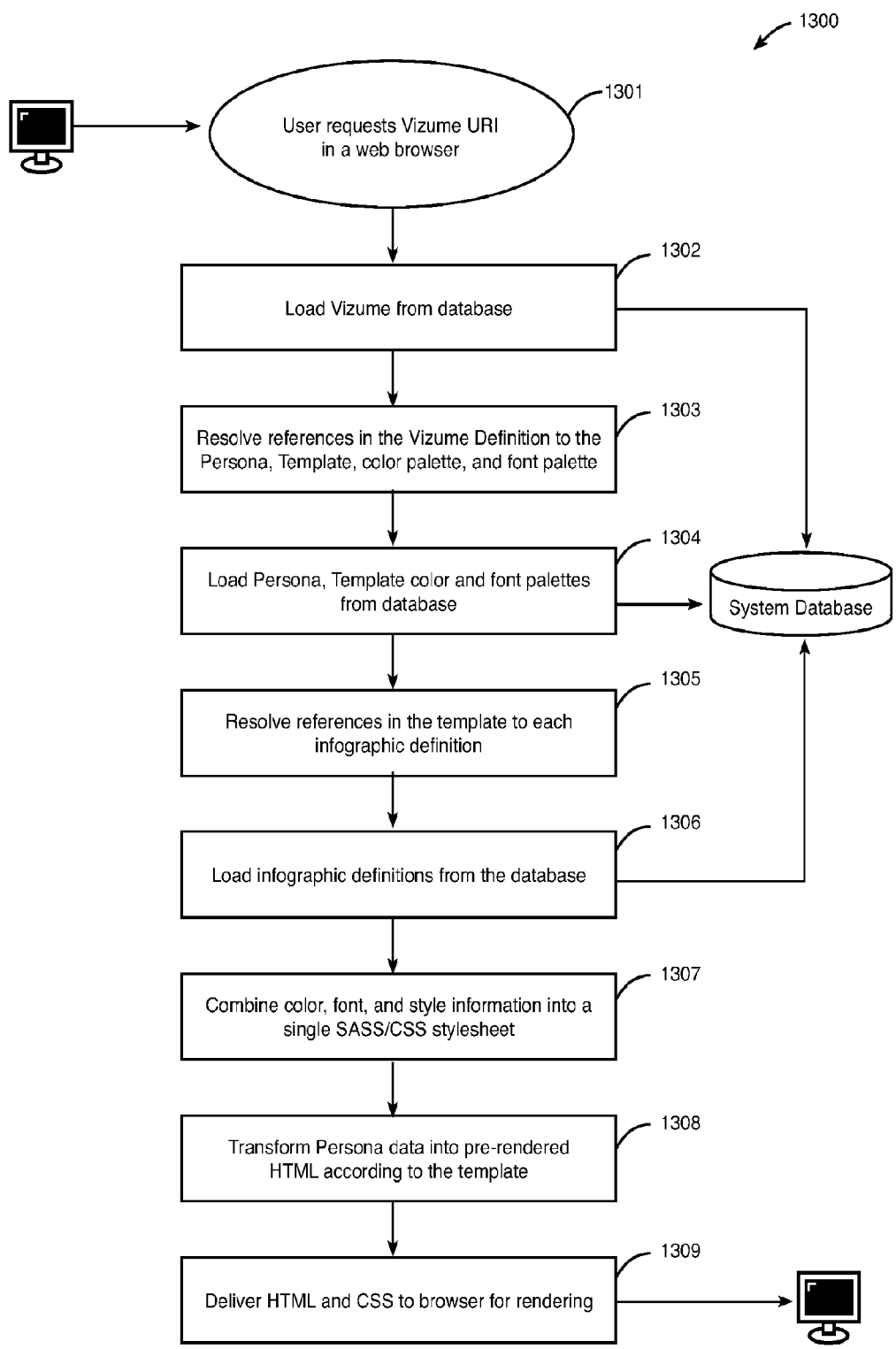
FIG. 13 shows a flowchart of an exemplary process for rendering a Vizume, in one embodiment of the disclosure.

FIG. 13 shows a flowchart of an exemplary process 1300 for rendering a Vizume, in one embodiment of the disclosure. The process begins at step 1301, when a user initiates a request via a web browser to render a Vizume. Next, at step 1302, a Vizume infographic definition is loaded from the system database. Next, at step 1303, references in the infographic definition to the Persona, template, color palette, and font palette objects are resolved. Next, at step 1304, the Persona, template, color palette, and font palette objects are loaded from the system database. More specifically, the Persona tree (e.g., as shown in FIG. 4) is traversed, and references to Data Store elements are resolved to produce a fully-realized data tree. Next, at step 1305, references in the template to each infographic definition are resolved. Next, at step 1306, referenced infographic definitions are loaded from the system database. Next, at step 1307, color, font, and style information is combined into a single SASS/CSS stylesheet. Next, at step 1308, Persona data is transformed into pre-rendered HTML according to the template. Next, at step 1309, the HTML code and corresponding CSS stylesheet is delivered to the user's browser for rendering. Additional details of the rendering process will now be discussed.

A Vizume is rendered in response to a user request for the Vizume's uniform resource identifier (URI). A URI uniquely identifies a particular Vizume in the system. The URI is used to look up and load the Vizume from the database to begin the rendering process.

The Vizume references a single Persona tree (e.g., as shown in FIG. 4), which is then loaded from the database. The tree is traversed depth-first, and each reference to a specific data element in the Data Store is replaced with a copy of that data element. The resulting Persona tree contains all data that is to be rendered, with each node having an element ID that uniquely identifies that node. Element IDs of nodes are used downstream to enable those elements to be edited by the user, as will be discussed in further detail below. The Persona tree is stored as a variable that is made available to each infographic template to retrieve its data.

Each infographic HAML template is loaded from the file system and is rendered by the Rails HAML/SASS engine. The template references data in the Persona tree by means of a Rails variable passed to the template when it is rendered. The rendering process produces HTML adorned with CSS classes and element ID-linked elements, which is then delivered to the viewer's browser along with a CSS stylesheet that combines color, font, and other style information, as described above. The resulting infographic view is rendered by the browser from the final-form HTML/CSS data and other data generated by the system.

In one embodiment, a JavaScript application-programming interface (API) is provided to enable infographic designers to specify interactive behavior of an infographic. The API provides a number of hooks that can call third-party JavaScript functions for various system events, such as when a user clicks on a timeline component, or when the user hovers the mouse over a headline. Each infographic definition can have an associated JavaScript file to code such behavior.

The system enables visual reskinning and transformation of an infographic while preserving the underlying data. Because the system maintains strict separation of data, layout, and style, and because infographics reference their associated data via the system schema, such that two or more different infographics can be defined to visualize the same data in different ways, the system allows users to select different infographic presentations of the same Persona data using several different methods.

First, as described above, the system allows the user to choose a template from a gallery view, such that data referenced in the user's Persona is instantly rendered and laid out according to the selected template.

Second, the system allows the user to choose which infographics to include in the presentation. With a given template selected, the user can further alter the presentation by choosing which infographics to display within that template. For example, if the template by default references the "radial timeline" infographic to display work history, then the user could choose to display a "horizontal timeline" infographic instead. Because each different timeline infographic is designed to display data with the same schema, the same underlying data can be visualized differently with no other changes required. As discussed above, FIGS. 9 and 10 show an example user interface for choosing an infographic to include in a template.

Third, the system allows the user to select color and font palettes. The system allows the user to choose different color palettes in a manner similar to the method by which templates are chosen. With a given template chosen, the user can browse through a scrolling color palette gallery and select different color palettes. The infographic display immediately updates by coloring infographic components with the colors specified in the chosen palette. As described above, infographic descriptions apply color to each infographic component by reference to a location in the selected color palette. In the running example, the headline component specifies its foreground color as $color-1. When the headline infographic is rendered, $color-1 is resolved to an RGB color value, as defined in the color palette in effect. When a palette is chosen, the system combines the palette file with the default stylesheet to produce a single SASS stylesheet. The color and/or font variables defined in the palette are used by the resulting stylesheet to resolve actual RGB color and/or font values.

In one embodiment, multiple presentations or "Personas" can be generated from a single data seed. The system allows users to create multiple Personas that reference a set of elements in the Data Store tree for the purpose of creating alternate infographic presentations from the same underlying data seed. Whereas the schema describes data types, the Persona references specific instances of those data types. Every data element in the Data Store has an element ID which uniquely identifies that data element. Personas reference data elements in the Data Store by element ID. In the exemplary system, Personas are the means by which a specific collection of data is assembled such that it can be rendered as an infographic or aggregate collection of infographics, i.e., a Vizume.

FIG. 14a is an excerpt from an exemplary Persona A, and FIG. 14b is an excerpt from an exemplary Persona B. These two excerpts represent different lists of positions in order to highlight different aspects of a person's work history. In this example, the user has created these two different Personas in order to apply for different jobs. Accordingly, Persona A references positions 1, 2, and 3, while Persona B references positions 2, 4, and 5. Each Persona is associated with a single Vizume presentation (A and B). When Vizume A is rendered, positions 1, 2, and 3 will be shown. When Vizume B is rendered, positions 2, 4, and 5 will be shown.

In one embodiment, a collection of infographics can be bundled into a single aggregate object or Vizume that can also be manipulated in similar fashion. In addition to the Vizume template mechanism discussed above, the system also permits users to easily create their own Vizumes from scratch by dragging infographics from a gallery view onto a blank canvas. When a particular infographic is dragged onto the canvas, the system displays a form that allows the user to specify properties of the infographic, such as orientation, style, size, and background image, as well as which data items from the corresponding Persona should be shown.

Each infographic definition specifies the schema type of the data that the infographic is meant to display. This enables the system to assist the user in selecting data to visualize. For example, when a timeline infographic is chosen, this form will prompt the user to select one or more particular "positions" from the user's job history to display, because that is the schema type referred to in the timeline definition. Similarly, if the user has selected a "recommendations" infographic, then the properties form would prompt the user to select particular recommendations from their Data Store.

As the user selects data to display in an infographic, the Persona associated with the selected Vizume is updated to reflect each choice by saving element ID references to elements in the Data Store. For example, if the user adds two "bignumber" infographics to a Vizume, then the associated Persona might appear as shown in FIG. 15.

In one embodiment, the system permits an infographic owner to order independent infographics into layouts or sequences that can serve as comic-book like narratives, and to update those layouts. The layout of the infographics on the canvas is stored in the system database in a Vizume object, which takes the same form as a Vizume template. As infographics are added, removed, and re-ordered, the Vizume object is updated to reflect the new composition.

Automatic Vizume (Infographic) Generation

In certain embodiments of the disclosure, the system automatically processes lexical data and numbers to generate an instant infographic (i.e., Vizume) from a given infographic definition, from a set of data supplied by upload, from a set of data supplied by direct entry, and/or from a set of data supplied by connecting to a third-party data source by providing additional descriptions of that data through "data adapters." In this scenario, the system employs a processing pipeline that progressively transforms unstructured and semi-structured input data into a visual presentation.

FIG. 16 graphically illustrates an exemplary processing pipeline for effecting the transformation of data into a visual presentation, in one embodiment of the disclosure.

First, unstructured and semi-structured data are transformed into a normalized representation based on a schema definition. As shown, data is received from sources that include a user's Microsoft Word-format résumé file, the user's Twitter account, and the user's Facebook account. A "data adapter" that governs how that data is to be transformed into the schema is used to normalize each supported data type.

Second, data stored in the system's schema is transformed into an intermediate representation such as HTML, scalable vector graphics (SVG), Action Script, JavaScript, or the like. Each infographic component may take input data in one of several forms. This stage in the pipeline transforms data from the schema to such intermediate forms as determined by the infographic definition.

Third, intermediate data is transformed into a visual representation by applying stylesheets and scripts to determine the final layout and rendering of one or more infographics.

Further implementation details of the foregoing-described processing pipeline, in one embodiment of the disclosure, will now be discussed.

Data enters the system in one of several ways: manual data entry, document upload, and/or accessing external data sources via the web. For each data type, there exists a "data adapter" component, which can access, transform, and store that data into a representation compatible with the system schema.

The data adapter defines how data external to the system is accessed, transformed to system data, and stored. Each data source has a corresponding data adapter. In one embodiment, a data adapter is implemented as a Rails class that contains code to access data from the associated data source. The system provides an API to write schema-compliant data to the Data Store. This API is used by the data adapters to store transformed data. A data adapter is registered in the system with properties that define the location or uniform resource locator (URL) of the external data along with the schema elements supported by that data source. The data adapter's schema property is used by the system to enable users to match infographic definitions with compatible data sources. For example, a user can configure a "timeline" infographic to show "positions" from the user's work history by selecting any external data adapter that supports the "position" schema type. Compatible adapters might include, e.g., LinkedIn, Facebook, XING, and the like.

One exemplary external data source is a user's profile data from LinkedIn (www.linkedin.com). An exemplary process for accessing, transforming, storing, and displaying LinkedIn position data as a visual timeline proceeds as follows. The LinkedIn data adapter accesses the LinkedIn service via its public API and downloads profile data to be transformed. LinkedIn profile data is represented as an XML document. The LinkedIn data adapter contains rules that map XML elements from the input document into JSON objects defined by the system schema. This XML document is traversed depth-first, and each element of interest is mapped into its corresponding JSON object and written to the Data Store via the system API. This data is then available for further transformation into infographic presentations, as described in further detail above.

Another exemplary external data source are user-supplied files. The system allows users to enter data into the system by uploading documents in various formats, each format having its own data adapter. For example, the system allows users to upload a résumé in Microsoft Word format. When such a résumé document is uploaded to the system, the "MS Word Résumé Adapter" is called to parse the document and transform it into JSON data according to the system schema. The parsing process applies lexical analysis to identify a combination of formatting rules and lexical tokens to identify source data to be mapped to the system schema.

For example, in one embodiment, the MS Word-formatted résumé document fragment shown in FIG. 17a would be parsed and transformed into the schema-compatible Data Store fragment shown in FIG. 17b.

A further exemplary data source is manually-entered data. In one embodiment, the system allows users to directly enter lexical and numeric data into forms generated by the system for each infographic. The system uses schema information to generate type-specific editing controls for each type of data supported by the schema. For example, when a user drags a "bignumber" infographic onto the canvas, the bignumber infographic definition specifies the type of data to display (by reference to the schema) as:

```
"bignumber" : {
    "number" : "decimal"
    "text" : "string"
}
```

Figure 18:
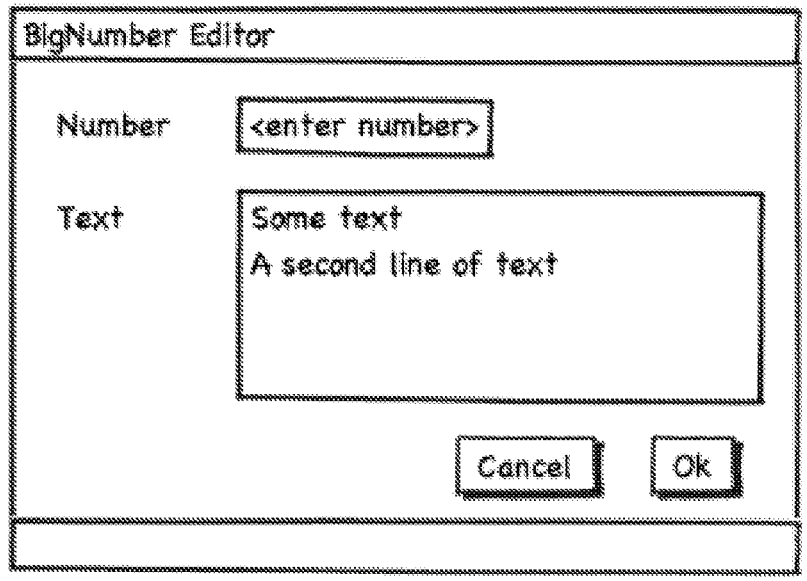
FIG. 18 shows a screen view of an editing dialog for the bignumber component, in one embodiment of the disclosure.

From this schema information, the system generates an editing dialog for bignumber, e.g., as shown in FIG. 18. It should be noted that this editing dialog (also called a "collector" or "form") is entirely auto-generated and not pre-compiled. Data entered into this form is saved as a subtree in the user's Data Store, and references to that data are added to the appropriate Persona.

In one embodiment, the system permits the automatic creation of an instant infographic "résumé" from a single source containing sufficient seed data, e.g., a LinkedIn profile, résumé text, a Microsoft Word document, or other word-processing document. A scheme for constructing instant infographic visualizations, consistent with embodiments of the disclosure, can be further applied to the specific case of building an infographic "résumé," with very little effort required on the part of an individual professional. The user simply supplies either a data source that contains sufficient seed data to construct multiple visualizations or a login that provides access to this kind of seed data, and the system automatically creates an infographic visualization.

Figure 19A:
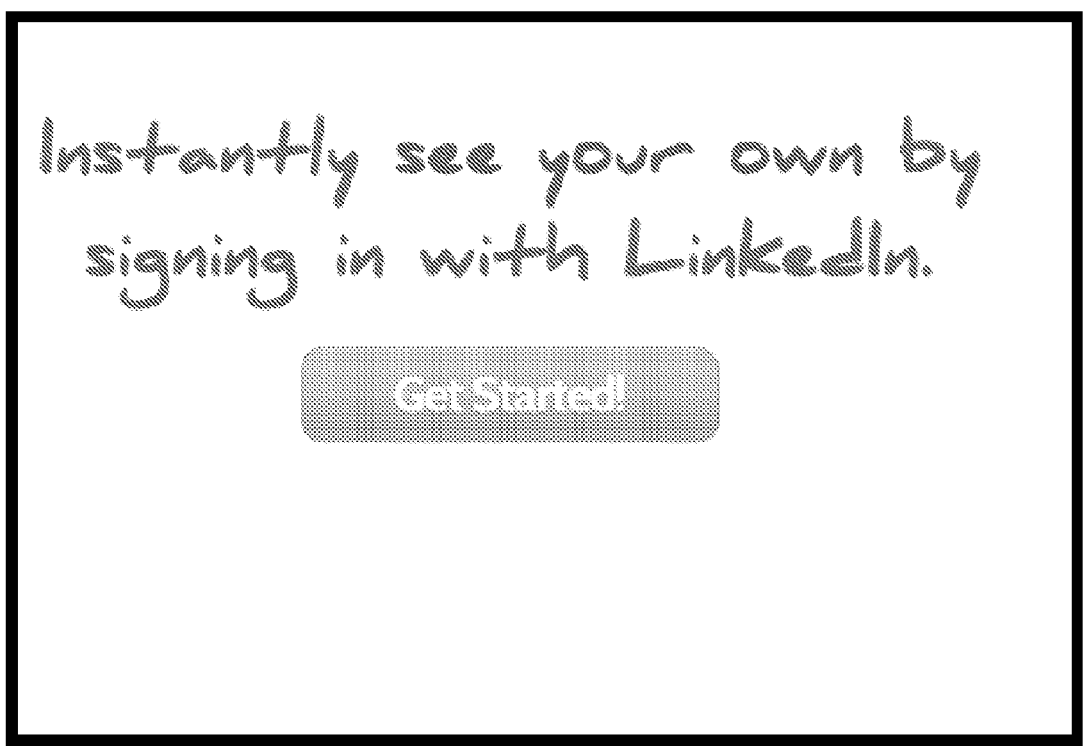
FIGS. 19a-19c illustrate an exemplary automated infographic creation process, in one embodiment of the disclosure.
Figure 19B:
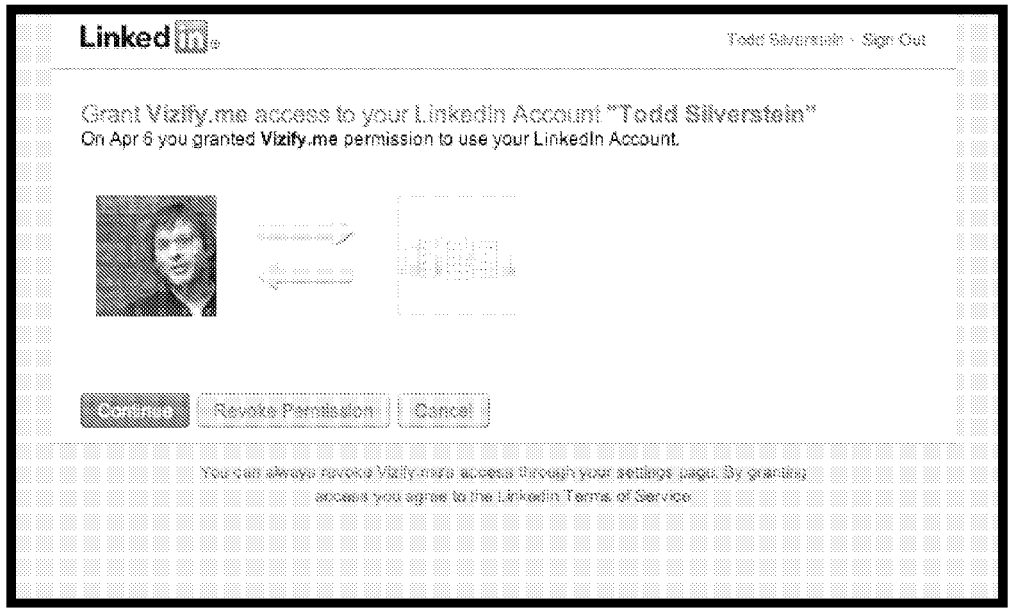
Figure 19C:
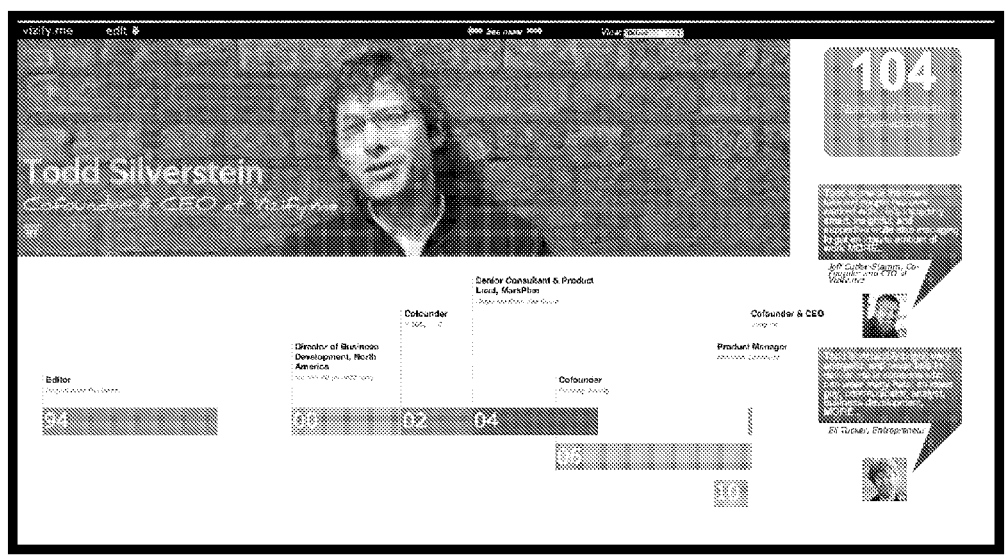

One exemplary automated infographic creation process using the LinkedIn example described above, in one embodiment of the disclosure, is illustrated in the screen views of FIGS. 19a-19c.

FIG. 19a shows a exemplary screen view of an exemplary invitation for a user to click on a "get started" button to begin the automated process. The user, e.g., an individual professional, clicks the button to begin.

As shown in the exemplary screen view of FIG. 19b, the user is then asked to supply credentials that will provide the system access to LinkedIn data that can be used as seed data. Like an actual résumé, a LinkedIn profile contains a number of data items commonly found on traditional résumés, including work history and dates, education, skills, publications and patents, industry experience, summary data, etc. One or more of these data items can be used as seed data. In this example, the LinkedIn login is provided via an open-standard OAuth authentication mechanism that will grant the system access to the professional's LinkedIn profile.

Next, the system uses a data adapter to parse and structure the LinkedIn seed data (as described in further detail above). After parsing and processing the seed data, a full infographic representation with multiple visualizations, i.e., a Vizume, instantly results, as shown in the exemplary screen view of FIG. 19c.

Once the Vizume has been generated and shown to the user, a series of visualizations can be generated that instantly visualize these individual collections of data. In FIG. 19c, which is an the exemplary screen view of an "overview" or "cover" page summarizing content relating to an individual professional, there is a visual cover area containing an image and headline data, an infographic timeline depicting the individual's work history, a recommendations section displaying the recommendations the individual has received, and a bignumber-style numerical counter representing the number of connections the person has on LinkedIn. Other information might be included or omitted in a Vizume, e.g., badges linking to an individual's Twitter account or other websites, and alternative formats are possible. The view of FIG. 19c is merely one exemplary illustration of a type of visualization that can all be generated from LinkedIn seed data.

Figure 20:
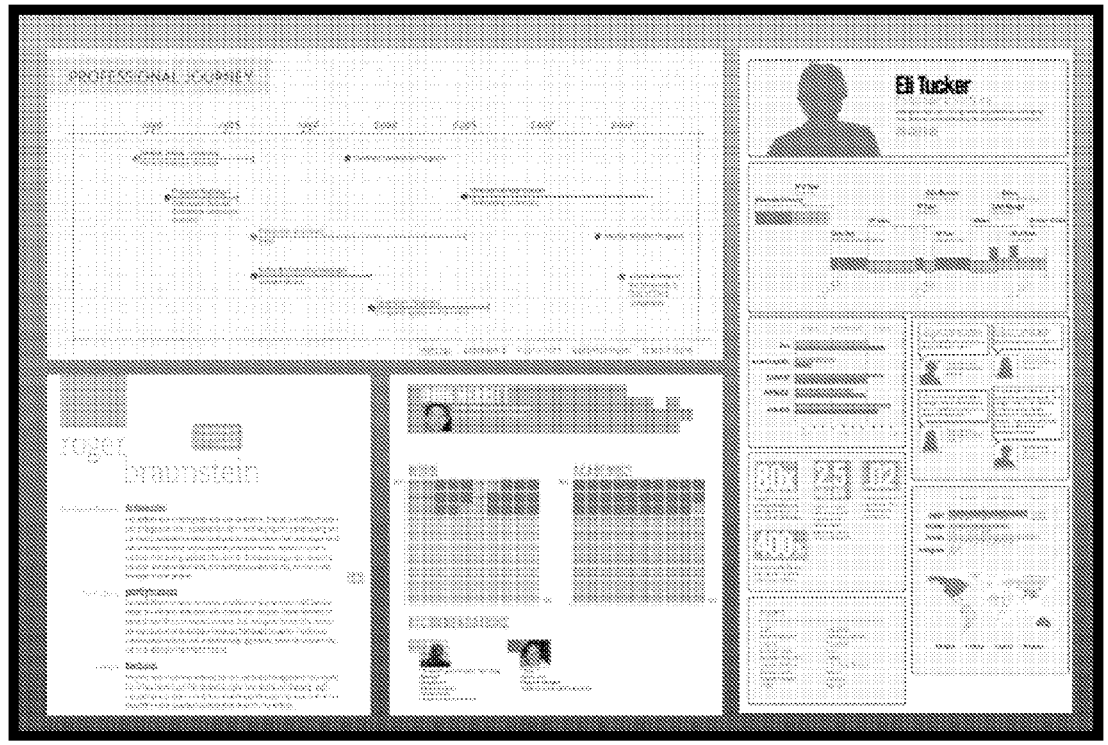
FIG. 20 shows a screen view of examples of different styles of infographic presentations, in one embodiment of the disclosure.

By parsing an uploaded résumé, an approach similar to that illustrated in FIGS. 19a-19c can be employed to create similar kinds of visualizations, i.e., résumé-based Vizumes. Since the sections of a typical résumé, such as skills, experience, and education, are fairly standard, it is possible to generate a complete infographic visualization of this material from a single document, whereby multiple visualizations representing these and other distinct parts of the document can be generated side by side to create the resulting visualization. FIG. 20 shows a screen view of examples of different styles of infographic presentations that can be selected for application to the same set of basic professional résumé data in a résumé-based Vizume. As discussed in further detail above, the resulting infographic can easily be reskinned by applying various theming and templating styles to the underlying data.

Bootstrapping an Infographic

In certain embodiments of the disclosure, an infographic can be "bootstrapped" through automated data collection and/or editing components presented to an individual that have been derived from an infographic schema definition. An infographic can be bootstrapped and/or updated by plugging it in to a data source that may be independently updated over time. In some embodiments, type-specific data-editing user-interface components are generated directly from the data schema. In some embodiments, the system enables infographic authors to specify only data-display behavior, while providing type-specific, schema-directed editing components for the end user to manipulate Persona data. In one embodiment, the data represented in the system is described by the system schema described above. The schema defines each data element with its data type and relationship to other elements. For example, an exemplary set of skills might be defined by the following schema excerpt:

```
skills : {
    collection: {
        skill: {
            label: Skill
            object: {
                name: string
                years: decimal
                proficiency: proficiency
                positions: reference[positions]
            }
        }
    }
}
```

Each infographic visually represents data defined by the schema. When data has not been entered for a specific schema element, data editors are presented to the user to collect data based on the schema definition.

If none of the elements of data exist (the empty case), then the user is presented with an empty representation of the schema element. In the skill set example above, the user would be presented with a dialog box containing a text field to edit the recommender, a dropdown menu to select the job which is populated with all the existing position elements in the Data Store, a date editor to edit the date, and a text field to edit the recommendation text.

Standard types exist in the system for each schema element. In one embodiment, there are types for each basic kind of variable: text (strings), numbers (integers), collections (lists), and also types for more specific types of data entry, such as sliders for interval or scalar values. For each standard type, a data collector for that type that is suitable for collecting that specific data is constructed. The system determines where data is needed for an infographic but is not present, in which case the user will be given visual prompts to enter such data.

Figure 21:
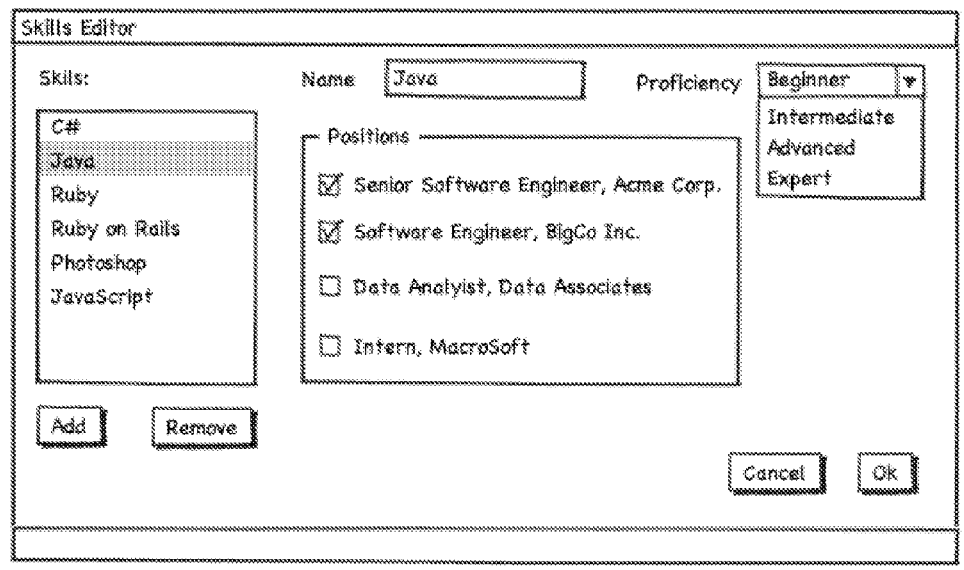
FIG. 21 shows a screen view of an exemplary editor dialog box, in one embodiment of the disclosure.

For example, if the user chooses a template with a "Skills Matrix" infographic and no skills data exists in the Data Store, then the user will be presented with a form to enter skills. Such forms are dynamically generated based on the types of data to be collected. The schema defines what an object is, what a collection of objects is, and what data types the object contains. The form for data entry allows the user to create new objects in a collection, remove objects from a collection, or edit individual types in the object. The form may include standard form elements like labels and text entry boxes and radio buttons, and/or more interactive elements like sliders, visual selectors, etc. FIG. 21 shows a screen view of an exemplary editor dialog box dynamically generated as described above, for the purpose of adding, removing, and/or editing skills data.

Figure 22:
FIG. 22 shows a screen view of an exemplary edit mode, in one embodiment of the disclosure.

An "edit" mode is invoked, e.g., by clicking a toolbar button. Edit mode changes the infographic display to add edit controls and/or buttons to each infographic. These edit buttons invoke the dynamically-created data editors to edit the underlying Persona data associated with each infographic. FIG. 22 shows a screen view of an exemplary edit mode, in one embodiment. In this screen view, the user is employing visual editing controls to place a text element at the bottom-left corner of the canvas.

It is noted that, because the system automatically constructs data editing forms and components based on the schema definition, infographic authors need not specify how data is edited, only how such data is displayed.

In like manner to the construction of form elements, the system can build a data template, such as a spreadsheet, that an individual or external system may retrieve, populate, and re-introduce to the system. The data is then stored in the system in the schema format outlined above.

Figure 23:
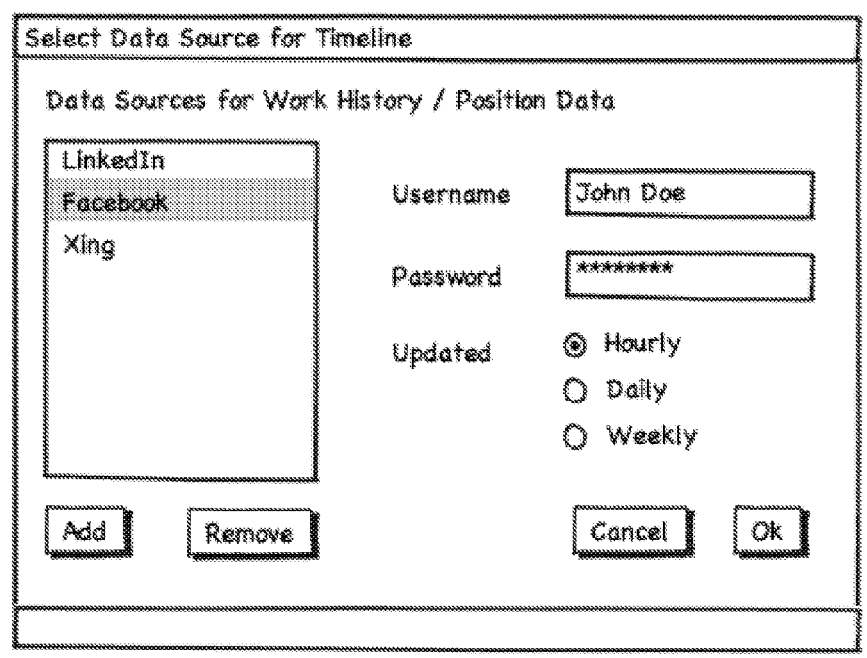
FIG. 23 shows a screen view of an exemplary dialog box for selecting a data source for a timeline infographic to display positions from a user's work history, in one embodiment of the disclosure.

In addition to prompting system users to enter data, data may be gathered by data adapters that access external data sources and structure the data according to the schema outlined above, as described in further detail above. Users can configure infographics to display data from an external data source by selecting the appropriate data adapter from a list that is filtered to display adapters whose schema is compatible with the infographic. FIG. 23 shows a screen view of an exemplary dialog box for selecting a data source for a timeline infographic to display positions from a user's work history.

Automated Updating of Infographics

In one embodiment, information can be appended to infographics, and/or infographics can be updated without requiring additional work by a graphic artist, designer, or in some cases, any other human. Traditionally, infographics are created by graphic artists to depict specific static information. If the data depicted in the infographic changes, then the graphic artist would have to be re-commissioned to update or create a new infographic with the updated data. In certain embodiments of the disclosure, the system supports both automatic, non-user initiated updates and also user-initiated updates to the underlying Data Store, which can then trigger new or updated infographic visualizations without requiring additional labor by a graphic artist, nor any additional human work to effect the rendering.

The system may also include the ability to notify users to remind them to update the data that an infographic depicts if the current data is becoming stale or dated, or to notify the user that additional data has been collected that may be optionally included in an existing or new infographic. After such notification, users can choose to update their data and or infographic visualizations via the same creation/update mechanisms described below.

One exemplary process flow for modifying data in the system proceeds as follows. First, the data in the Data Store is updated (e.g., via an automatic update, a user-initiated update of data retrieved from an external source, or a user-initiated update of data entered by a user, as described in further detail below). Next, data in the Data Store is propagated to individual Personas as described in further detail below. Lastly, infographics and/or visualizations are rendered (e.g., via the methods described in further detail above) using data from the updated Persona. Thus, the infographic depicts new or changed data without requiring any manual intervention by a graphic artist or visual design professional.

Further details about methods for updating the Data Store will now be discussed. In one embodiment of the disclosure, the Data Store is a store of all data available to be depicted for a given user inside the system (as described in further detail above with reference to FIG. 3). As will be discussed in further detail below, updates to this data can happen using one or more of several different methods, including via notifications that the system produces to signal data that may be updated.

A first method for updating the Data Store is through automatic updates. Data in the Data Store may be updated automatically without any user-generated action. In certain embodiments, the system will periodically poll outside data sources for new or additional data. Alternatively or additionally, outside systems may push new or additional data to the system. In one embodiment, a job system is employed to handle such updates, based on a list of automatic-update jobs to be run and the frequency of such runs. When the job system starts up, it examines each job in the list and determines when and how often the job should be run. The database is examined to determine whether the job has not run for at least the configured predetermined period of time. If the job has not run recently enough, then the job is started.

In one embodiment, the job system contains individual jobs (defined, e.g., through Rails programs) to accomplish gathering credentials, polling each external system, and updating a user's Data Store. The jobs examine each user's Data Store to see if there is enough data to run the job on that Data Store (such as having a Twitter username, or perhaps having credentials to login to Twitter). The job is then run on the Data Store and updates data inside it as needed. For example, in one embodiment, the job system has a job to periodically poll the Twitter API using an HTTP request for "tweets" (i.e., Twitter messages) to determine whether a given user was mentioned in a tweet, by comparing the element ID of the most-recent-mention tweet to the least-recent-mention tweet element ID stored in the Data Store. The element ID of each tweet mentioning the user is stored in a database within the system in a form, as described in further detail above. Upon discovering one or more new tweets mentioning the user (with the non-matching tweet IDs pulled from the Twitter API), the system saves the one or more element IDs corresponding to these new one or more tweets. If an infographic visualization depicts the contents of the three most recent times a user was mentioned on Twitter, then the change in the Data Store will be detected by a module in the system that periodically cycles through Data Stores looking for changes. Because the Persona references data in the Data Store by element ID, data is propagated automatically when it is updated in the Data Store. When the visualization is subsequently rendered, it will include the new tweets, thereby updating the visualization without human intervention.

The Data Store can also be updated using "processed" data, rather than new instances of specific data. The Persona object discussed in further detail above references specific data elements in the Data Store by element ID. The Persona can also reference data by query. The query language includes a number of functions to aggregate and process data, including count( ), sum( ), min( ), and max( ), as well as a host of text-manipulation functions. An example Persona employing the count( ) query function follows:

```
"persona" : {
    "tweetcount" : {
        "query" : "datasource/twitter/tweets/count( )"
    }
    ...
}
```

A visualization representing a count of the number of tweets that mention a given user would refer to the count via the Persona, as shown above. The underlying tweet data is refreshed by the job system, as described in further detail above. The new tweet IDs are added to the Data Store, as described in further detail above. Because the visualization definition and Persona reference the data by query, the visualization definition and Persona will be updated to reflect the results of that query at the time of rendering. In that scenario, the query will count the updated tweets in the Data Store, and the visualization will be updated accordingly.

Figure 24:
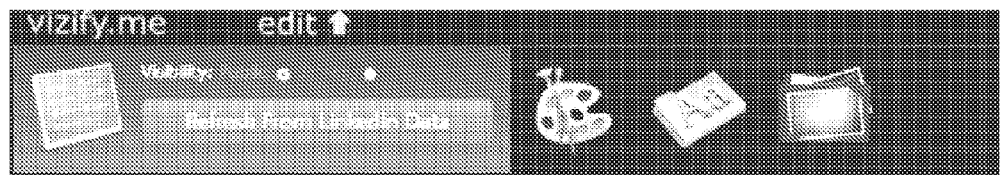
FIG. 24 shows a screen view of exemplary editing controls that include a user interface button to manually trigger an update, in one embodiment of the disclosure.

A second method for updating the Data Store is through user-initiated updates of data retrieved from an external source. An infographic may be updated automatically when the user requests that the latest data from one or more external data sources should be used. In one embodiment, the user clicks a button inside the system to refresh their work history from an outside API or web page source such as LinkedIn. For example, FIG. 24 shows exemplary editing controls that include a user interface button to "Refresh From LinkedIn Data," which button can be used to manually trigger the update process described above. When a user-initiated refresh of a given outside data source is triggered, the system will revisit that data source, reprocess the raw data (possibly using a specific adapter, as described in further detail above), and replace the relevant section of the Data Store with the newly-processed and/or updated data. A request to render the infographic (i.e., Vizume) is then made again, and the infographic is re-rendered via the standard process. Accordingly, for example, if the outside source had updated their LinkedIn profile information with a new job, this new job data from the source would be saved (as would all of the other profile job data) in the Data Store in a format that fits the schema. Personas that reference the job history information in the Data Store will use this new information the next time the Vizume is to be rendered.

A third method for updating the Data Store is through user-initiated updates of data entered by a user. An infographic can be updated automatically by a user adding new data to the Data Store or editing existing data in the Data Store. In one embodiment, the system allows for users to add, modify, and delete data in the Data Store. User-initiated edits will automatically invoke updates of one or more related infographics/visualizations once the user indicates that the user's edits should be saved. The save action triggers the re-rendering action for the specific related visualization for the currently active Persona.

Figure 25:
FIG. 25 shows a screen view of editing controls for selection of a header background image, in one embodiment of the disclosure.

A variation of this user-initiated updating method, in one embodiment, is the ability to edit a digital asset (e.g., photograph, drawing, audio clip, video clip, or other multimedia content) or link to a digital asset that may be contained in the underlying data schema. For example, as shown in the screen view of FIG. 25, the visual "header area" has a background image, which is currently a photograph of the individual. By toggling the editing controls shown at the top of the screen, a list of other image-asset thumbnails pops up for selection by the user. When an image is selected for replacement, the reference link to the new image is written to the Data Store, replacing the current reference, and causing the element to be redrawn. New images or links to images can be uploaded and stored in the system database via standard methods. These user-uploaded images or links to images would then be available for a selection as with any images already provided by the system when the editing mode is toggled.

As described above, the exemplary system may periodically automatically poll outside data sources for new information. In addition to the automatic updates described above, a system consistent with certain embodiments of the disclosure also contains methods that trigger an update-event notification each time new information is found. Each adapter can be configured so that, when updated data becomes available, either data in the Data Store is automatically overwritten, or an update-event notification is triggered.

In one embodiment of the disclosure, when new data is retrieved by an adapter, and that adapter is configured to require approval before saving the new data into the Data Store, the new data is instead stored away in a separate table in a database called PendingDataStoreUpdates, which table is used for unapproved data and stores data in the same format and using the same schema as in the Data Store. The table indicates when the data was retrieved and the source of the data. When data is inserted into this table, a notification such as an email is sent to the user to indicate that new data is available.

In the notification, the system shows the user the new data that is available and asks the user to choose between updating the data currently in the Data Store with the new data shown (i.e., overwrite or replace that data) or ignoring the new data. If the user chooses to use the new data, then the data is copied from the PendingDataStoreUpdates table. If the user chooses to ignore the new data, then no changes are made to the Data Store. In either case, the row is removed from the PendingDataStoreUpdates table in the database.

In this scenario, while the polling of external data sources remains automatic, a notification-response "permission" paradigm determines whether the data in the Data Store is updated via the mechanisms previously described, or whether the data in the Data Store should be left in its current state. When a system user chooses to update the data, any associated infographics are automatically updated as described in further detail above. When the user chooses to leave the data in the Data Store as-is, then the current visualization is not updated.

Embodiments of the disclosure employ various notification methods to poll a user electronically. Such notification methods can be via electronic messages, such as email, text message, Twitter message, Facebook message, or the like, based on messaging-address data associated with the user's account profile. Each notification contains a mechanism for the viewing user to indicate a reply of either "use new data" or "ignore new data." The notification can request a reply using, e.g., (i) a link in the notification back to a web page on the system where the user can either accept or reject the new data, or (ii) two or more links embedded within the notification that can be chosen to directly accept or reject the new data.

In one embodiment, the system periodically polls the Internet Movie Database (IMDB) for a list of movies in which the user has appeared and saves the list of movies into a database within the system. If a new movie that wasn't previously saved appears in the list, then the user is sent an email to the messaging address associated with the user's account asking if the user would like to update any infographics/visualizations that depict the movies in which the user has appeared. The user can click on appropriate links in the email to respond. If the user responds to the notification by clicking the "use new data" link, then the data in the format of the schema is updated in the Data Store. Upon the next request, all infographics that rely on this data will be updated using the latest data and will depict the latest data in infographic form. If the user responds by clicking a link in the email indicating to "ignore new data", the Data Store is not updated and no infographics will be updated.

In one embodiment, in the event a given subset of data within an infographic has not been updated by the user within a given period of time set as a predetermined variable within the system (e.g., by a system administrator), then the system will notify the user through an electronic message about the lack of updates.

In one embodiment, the system records the last updated time for each individual piece of data within the schema in the Data Store. The system can be configured through an internal variable to define the maximum acceptable age of an element of a specific schema type. The system periodically queries the database for elements of data that belong to a user where none of the elements are newer than the configured maximum acceptable age. If all items of a specific type are beyond an acceptable age, then a call is initiated to the notification module, so that an email (or other message type) is sent to the owner of the data as a reminder that the owner may need to update their data. The email includes a link to the system and presents a list of data elements that are beyond a given age (returned by the query) and allows the user to update these elements.

Exemplary processes for propagating data from the Data Store to the Persona will now be discussed. As explained in further detail above, updates to data are stored in a Data Store for individual users in the system. When an update to data is stored, the system also records the date and time that each individual piece of data was updated. In addition, the Data Store also stores the last time that any individual piece of data was changed within the Data Store for a given user. A single embodiment of the system might employ multiple methods for propagating data that has been stored in a user's Data Store to individual Personas. Which method is chosen can be made configurable globally or on an individual data-type basis (e.g., by either a system administrator or users of the system).

One exemplary process for propagating data from the Data Store to the Persona is the use of a background job that queries the database to find all Personas that were last updated after the update of the Data Store to which those Personas point. Queries are made using standard database-query techniques. If any Personas are found that meet this criteria, then each element of data is examined. If the last update date and time in the Data Store for this element is newer than the last updated date and time on the Persona, then the data from the Data Store is copied to the Persona.

Another exemplary process for propagating data from the Data Store to the Persona is the use of an event request, i.e., the system updates an individual Persona when an event requests it. This could be a manually-triggered event, such as by a user or system administrator requesting that a Persona be updated (e.g., when a user is manually entering new or updated data into the system), or it could be an automatic event that is triggered when a request for an infographic that uses data from a given Persona is requested. When the event is triggered, the last updated date and time of the Persona is compared with the last updated time of the Data Store. If the Data Store's last updated time stamp is newer, then the data from the Data Store is copied to the Persona.

Once data has been propagated to the Persona, that data is immediately available to be rendered in infographics, as described in further detail above, without any additional effort on the part of a graphic artist or Data Store owner.

Publishing Up-to-Date Infographics

In one embodiment, the system can publish an infographic or collection of infographics to a web page or digital device, while updates made to the data or presentation from a central point dynamically update the infographic in near real time. Traditionally, a designer would create infographics from data in a static format such as an image or PDF file. When an update is made to the underlying data and then to the infographic itself, the designer would need to create a new version of the file and then distribute it to wherever the file is to be displayed. A system consistent with embodiments of the disclosure allows changes to data that result in an updated infographic to be immediately available to all destinations that reference the infographic by its uniform resource identifier (URI).

Figure 26:
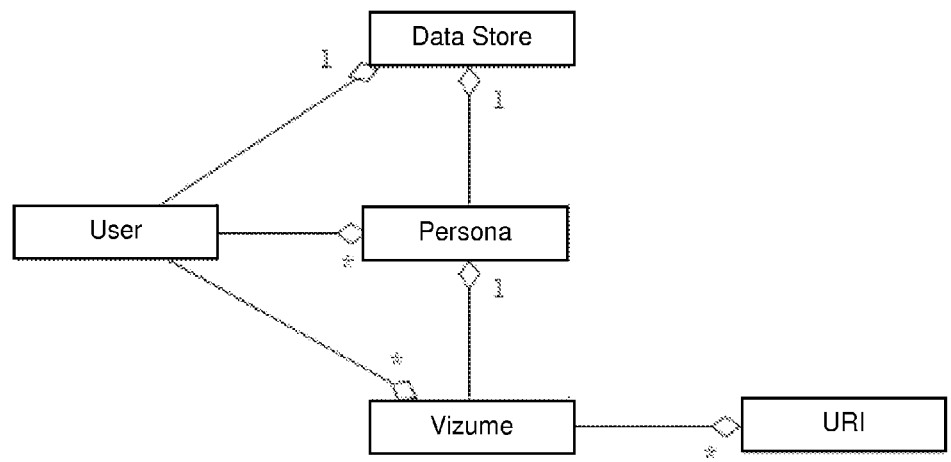
FIG. 26 is a class diagram showing the relationship of URIs to Vizumes, in one embodiment of the disclosure.

As discussed above, the system uses URIs to identify unique infographics, sets of infographics to be displayed together, or portions of an infographic to be displayed independently (i.e., a Vizume). One or more URIs can point to a Vizume. The object to which a URI points can be updated by the user or the system so that the next request to that URI returns an alternate infographic or set of infographics or alternate displays or styling of an infographic (i.e., a Vizume). Users can also disable specific URIs so that they are no longer active. FIG. 26 is a class diagram showing the relationship of URIs to Vizumes, in one embodiment of the disclosure. As shown, each Vizume may have one or more URIs that point to it. Each Vizume references a single Persona which references a single Data Store.

Figure 27:
FIG. 27 shows an exemplary URI location dialog box, in one embodiment of the disclosure.

In one embodiment, the system allows users to create an infographic or set of infographics, as described in further detail above, and further allows users to configure what is displayed at a particular URI location that the user has created. FIG. 27 shows an exemplary URI location dialog box, in one embodiment of the disclosure. As another example, the user might designate that an infographic résumé created by the user is available to be accessed at a specific URI, such as http://vizify.com/resume/franz-kafka/dxy137. Internally, the system has a table of resources located at each location. In this example, there may be a table of résumé resources. In that table, there will be an entry for "franz-kafka/dxy137" that contains a pointer to the element ID of the Vizume that is to be displayed when this URI is requested. The user may alter this resource by changing the Vizume to which the resource points, or by disabling the resource (e.g., by making it private so that others can no longer see it).

When a web browser requests a given URI, the content needed to generate the infographic or set of infographics (as discussed in further detail above) will be returned. Any event that causes the infographic to alter (such as user-initiated data changes, layout changes, font or style changes, or automatic updates, such as data received from an external data source) will result in the infographic or set of infographics addressed by that URI to be updated to depict the new data, as discussed in further detail above. No additional configuration work or any change in behavior is required on the part of viewer visiting the URI to view one or more infographics/visualizations that reside at this resource. The updating takes place without human intervention.

In one embodiment, the system allows users to embed infographics created by the system inside an inline frame (iframe) in a web page. As with URIs that point to visualizations/resources within the system domain (e.g. vizify.com), the user is able to embed those visualization inside an iframe on their own web page. When a user chooses to embed the infographic within another web page, the system produces HTML code that the user can insert into the source code of another web page. The code to be copied is an iframe component, with the source of the iframe pointing to a URI in the system. An example of iframe code is as follows:

<iframe src="http://vizify.com/resume/perry-tucker/a38f0q?as=iframe">
</iframe>

The URI indicates that the returned results will be rendered inside an iframe. Requests to that URI would return code to generate the infographic inside a web browser in the same fashion, as described above. Therefore, when the data that the infographic is depicting is updated, future requests to this URI will produce infographics that depict that updated data.

In one embodiment, the system adds code to the URI that can run in a browser and that periodically polls the system to determine if new data is present that would require one or more visualizations to be updated. Such a system may be useful for kiosks or permanent displays, where users might otherwise regularly reload a page or may not even interact with the display, but the display should be updated when new data is introduced to the system. In this embodiment, this method is accomplished by using a standard web browser that loads a web page in the system. The web page contains not only the infographic, but also JavaScript code that periodically contacts the system server to (i) check to see if any new data exists, and (ii) if new data exists, then reload the page or part of the page through an Asynchronous JavaScript and XML (AJAX) call to display an infographic with the updated data.

In one embodiment, the system creates a URI associated with an infographic or Vizume that, when requested, produces and returns a static image, PDF file, or other standard static representation of an infographic. If a user wishes to embed a static representation of the infographic, such as a PNG file, then the user instructs the system to create a unique URI that will point to the infographic or Vizume that the user wishes to produce. The system records these associations, as discussed in further detail above, when describing the URI's within the system. When the URI is requested, the system first examines if a cached version of this infographic in this format exists. If so, then the cached version is returned. Otherwise, the system creates a static version of this infographic by first using the rendering techniques discussed in further detail above to generate the visualizations, and subsequently using one of several commonly-available tools and methods for rendering output of the document in a static image format as required. Such tools might include, e.g.:

PDFKit: https://github.com/jdpace/PDFKit,

HTML2Image: http://www.guangmingsoft.net/htmlsnapshot/html2image.htm, and wkhtmltopdf: http://code.google.com/p/wkhtmltopdf/.

This rendered image is then both returned to the client and cached for future requests. A background job runs periodically to mark the cache of images as "dirty" if the data in the Persona is newer than the data from when the image was last placed in the cache. Thus, if the data used to render an infographic is updated, then the cache will be refreshed upon the next request for the item. Additionally, a background job could periodically refresh the cache even though an item hasn't yet been requested outside of the system.

When generating static or print-ready images, the system may refer to a "print" stylesheet in order to render images or content that may be masked behind an interaction layer (for example, data about a particular position that may not appear until the position is clicked on by a viewer) to "flatten" these interactive images, so as to be able to reproduce all of the content they contain.

Measuring Viewer Engagement

In one embodiment, the system enables measuring engagement with an infographic by tracking interaction with individual infographics in a collection of infographics or individual elements in an infographic. There has, to date, been no way to measure the different parts of an infographic that a viewer has read and/or with which the viewer has engaged. The ability to measure engagement with an infographic allows knowledge to be gained about what was most interesting about the infographic to a given user or across a set of users. This engagement information is useful when the infographic is used in an attempt to help an individual or corporation be hired or gain business, persuade or influence others, or to inform the owner of the infographic about the component parts he or she should be prepared to speak more about (e.g., in a sales or hiring situation) after the infographic has been viewed.

There are a number of different aspects of engagement that the system can measure, in various embodiment of the disclosure, including the following.

1. When the request for an infographic or set of infographics was made: In one embodiment, the system accomplishes this by recording the date and time a request was made on a web server for a given URI that includes an infographic or set of infographics by using known web-request recording techniques (e.g., an HTTP proxy server).

2. Who requested the infographic: In one embodiment, the system records who viewed the infographic by recording the Internet-Protocol (IP) address and any identifying cookies of the party making the request for an infographic on a web server. The IP address and cookies may be used in conjunction with other systems (such as advertising systems that track users interests) or data (such as data gathered internally in the system regarding interests in other infographics) to determine the identity and interests of an individual user. The system will also precisely determine who requested an infographic when a user was individually invited using a unique URI to see the infographic. When a user is individually invited to view an infographic, a custom URI is created for them by the owner or sharer of the infographic that associates the URI with the individual who was invited to view the infographic. When this URI is requested, the system can look up the previously-identified user who was invited to view this infographic and record that the user viewed this infographic. (Additional methods for recording the identity of an individual at the time of transmittal of a URI or document via a mobile device will be described in further detail below.)

3. Who viewed infographics delivered by an electronic message and when: In one embodiment, the system tracks who viewed an infographic that is delivered via electronic message, such as email, Facebook message, Twitter, or SMS, and when the view took place. For email, the system attempts to track both that the email was opened and if any links in the email were clicked. As a first step, the system includes one or more images in the emails that are referenced on a server in the system and are addressable via a unique URI. An image filename is made unique by adding a unique identifier to the end to associate the image request with this particular email (for example, the image source in the email may point to http://email-images.vizify.com/email-open.jpg?email_id=28fjas-13rfas-23r8uds). When this image is requested, the system records that the email was opened. As a second step, the system will alter the contents of any links back to the system to view an infographic to include a special reference to the email_id corresponding to this user. For example, if there is a link to an infographic at the URI http://vizify.com/resume/matthew-eblen/e815ab, then the email_id is appended to the URI so that it becomes http://vizify.com/resume/matthew-eblen/e815ab?email_id=28fjas-13rfas-23r8uds). When the URI is requested, the system records that a link in the email has been opened. With this two-step combination, the system is able to record both when an email that contains an infographic was opened, and whether (and when) the viewer of that email chose to click on a link to see more information and/or the full infographic.

4. How long the requesting party stayed on the web page containing the infographic: In one embodiment, the system includes JavaScript code on the page that either (i) periodically makes calls back to the server to verify that the page is still active, and (ii) by registering JavaScript code that will call back to a server to record that the page was left in the on BeforeUnload event in the web browser.

5. How long the infographic was visible on the web page: In one embodiment, the system uses JavaScript code to measure when a given section of the page is visible to a user by periodically examining what areas of the document-object model of a page are visible to the user. This is accomplished, e.g., by using the getClientRects( ) and getBoundingClientRects( ), getElementFromPoint( ) methods as defined by the W3C (see: http://www.w3.org/TR/cssom-view/#the-getclientrects-and-getboundingclient and http://dev.w3.org/csswg/cssom-viewNdom-document-elementfrompoint). Results of testing which elements are visible are periodically recorded in data structures on the client. These results are then reported back to the system using background requests.

6. Whether and for how long a user hovered over an infographic component: In one embodiment, the system accomplish this by creating JavaScript code that registers for events when a user's cursor is hovering over and stops hovering over a component of an infographic by using JQuery's hover method (http://api.jquery.com/hover). These events execute code to record which item was hovered over and when the hovering began and ended and make additional background requests to report this information back to a web server.

7. Whether a user clicked on an infographic component: In one embodiment, the system accomplishes this by creating JavaScript code that registers to be notified of click events on infographic components. These events execute code to record which item was clicked and when it was clicked. Additional background requests are made to report this information back to a web server. The system uses, e.g., the Mixpanel API (http://mixpanel.com/api/docs/guides/integration/js#async) as the destination of this information.

8. How long a user viewed a secondary infographic component after clicking, hovering over, or otherwise engaging with a primary infographic component: In one embodiment, the system records which secondary infographic component is shown and when, as well as when the component is dismissed by the user (e.g., by clicking a close button or clicking on another item). Additional background requests are made to report this information back to a web server.

9. Whether a user printed an infographic or set of infographics: In one embodiment, the system accomplishes this by creating a hyperlink to a printable version of the infographic and recording that the printable version was requested. Another exemplary way to accomplish this is to create CSS to be used specifically for printing, whereby the web server would record a request for that CSS. Another exemplary way to accomplish this is to create CSS that uses a custom element that requires another request to be made, such as a background image with a unique URI to identify this particular infographic (e.g., http://vizify.com/images/background.jpg?action=print&unique_infographic_id=38aa21fj3). When this background image is requested, the web server would record the request as a print action for the given infographic.

Figure 28:
FIG. 28 shows an exemplary sharing panel provided to users, in one embodiment of the disclosure.

10. Whether a user shared an infographic with others: In one embodiment, the system tracks who shared an infographic, when they shared it, and how they shared it. FIG. 28 shows an exemplary sharing panel provided to users, in one embodiment of the disclosure. When a user wishes to share the current Vizume or selected infographic via the panel, the user simply clicks on the respective service icon, which generates an appropriate URL (and may also include thumbnail graphics of the current vizume/infographic), and calls the service in question (including, e.g., email, LinkedIn, Twitter, and Facebook). For third-party services such as Twitter and Facebook, the appropriate calls are made to these services' respective APIs to publish a new piece of content (i.e., to share one or more infographics/Vizumes). In one embodiment, the system also tracks who viewed the shared infographic, when it was viewed, and who shared it with them. The system accomplishes this by providing links on a web page to share via Facebook, Twitter, email, or other messaging platform. When a user clicks to share an infographic, a unique URI used for sharing is created and is associated with the infographic to be shared, the user that shared the infographic, and the medium on which the graphic is being shared (e.g., email, Facebook, Twitter, web link, embedded web page, etc.). Each time that URI is requested, the system records the request, along with who made the request and when the request was made.

11. Whether a user contacted someone regarding an infographic, résumé, or CV, and metrics associated with that communication: In one embodiment, the system permits contact with the owner of an infographic via electronic message (e.g., email, Facebook, Twitter, web link, embedded web page, etc.) or by placing a phone call. If contact was made, then the system records engagement around that contact and any further communication, to the extent possible. Being able to determine if contact is made after a potential employer or customer views an infographic, résumé, or CV allows the system to begin measuring how successful the given item is at attracting work or communicating an idea. In one embodiment, the system creates a mailto clickable link on an infographic or page containing an infographic. That link is addressable to a unique email address that the system creates, which is associated with a designated contact email address for the infographic. When the contacting party sends the email, the system (a) records the message itself and data about the message, such as when it was sent, who sent it, and the subject of the message; and then (b) forwards on the correspondence to the desired party, but using a reply-to email address to the system itself. When the recipient replies to the message, such further correspondence associated with this message would be routed through the system and be recorded.

Another exemplary way of accomplishing tracking of engagement for email is to create a fillable form that interested parties complete to contact the owning party. The party being addressed could respond and courtesy copy ("cc") or blind courtesy copy ("bcc") the system, so that all correspondence is tracked in the system. The system would keep a record of all messages sent and received, as well as metadata around these messages, including, e.g., when it was sent, who sent it, and the addressee of the message.

In one embodiment, the system tracks phone calls to owners of infographics or résumés, e.g., using an electronic service (e.g., Twilio: http://www.twilio.com) to place a phone call to a phone number designated to be called for a particular infographic. Such a service may require the calling party to enter in the phone number and would call them immediately or at a scheduled time and would then connect them to the designated phone number. When calls are made, the system records the length of the call, whether the call was answered, the recorded content of the call, and/or who was called. This data can be used to track the success or engagement of an individual infographic or résumé.

An exemplary method of measuring engagement with an "item of interest," such as a résumé, CV, infographic, or description of work for hire, involves querying the owner of the item of interest or the owner's representatives about outcomes or events associated with the item of interest that may not be directly observable by a system event. In this scenario, when a potential employer or potential client views the item of interest, the system employs methods to query the owner of the item of interest, e.g., through an electronic message, electronic survey, or telephone call. The system asks the owner of the item of interest one or more of the following: (i) whether he or she received communication from the potential employer or client, (ii) how the communication was received, (iii) when the communication was received, (iv) whether the communication or further communication resulted in an interview of the owner, and (v) whether the communication or further communication resulted in the employment or hiring of the owner.

Figure 29:
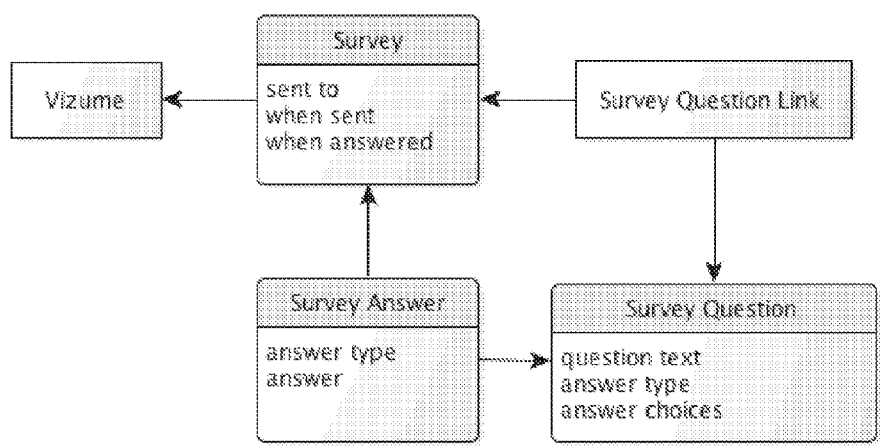
FIG. 29 shows a diagram of tables in an exemplary survey response-tracking database, in one embodiment of the disclosure.

In one embodiment, surveys are generated through the API of a third party system (e.g., Wufoo: http://wufoo.com and Survey Gizmo: http://www.surveygizmo.com/survey-support/tutorials/online-survey-api-integration-cms-intranet/), or by telephone call (which may be initiated programmatically, such as by using a third party API (e.g., Twilio). In an exemplary survey scheme, the first survey is sent two days after an item of interest was viewed (the amount of time is configurable in the system). Based on the results of that survey, additional surveys will be sent later. If the owner indicates that they have received communication from the potential employer or client or that the communication resulted in an interview, then the system waits one week (also configurable in the system) and queries the owner again to ask if the communication resulted in their employment. The results of the above queries are retrieved from the external survey systems through their APIs and recorded as follows: Each survey is recorded in its own row in a table in a database. FIG. 29 shows a diagram of tables in an exemplary survey response-tracking database consistent with one embodiment of the disclosure.

The questions that are in a survey are recorded in a link table that points to the survey and to the question on the survey. Each survey question is also in its own table in the database. Thus, a survey can contain any number of questions, and questions are uniquely stored in the database even if they belong to multiple different surveys. Answers to each question are stored in another table in the database that contains each individual answer to a question and points to both the survey that was being answered and the question that was being answered. Survey questions allow for different answer types, such as multiple choice, a date, or free-form text. Finally, surveys are sent regarding an individual Vizume, such that all surveys point back to the Vizume that is the subject of the survey.

In one embodiment, the system enables measuring engagement with an item of interest, where a potential employer or client is queried through an electronic message, phone call, or alerting box on a web page. In like manner to the method for measuring engagement with an item of interest described in further detail above, the system can also include methods to directly query the potential employer or client after engaging with an infographic or résumé.

An exemplary system consistent with embodiments of the disclosure can select from a list of possible survey questions in the system database and/or algorithmically construct survey questions based on the components having measured engagement (e.g., as recorded via the methods described above). The system contains a map of schema types of infographic component elements to survey questions for those elements. For example, if it was recorded that a potential employer engaged with an individual work history record in an infographic that uses the Position schema element, then the system looks up in the database which questions can be asked about a Position. The map contains a pointer to a particular question about a Position, and that question is included in the survey. For example, the potential employer may be asked a question about whether this work history had a positive, negative, or neutral effect on their decision to consider this candidate for a position. The results of these measurements may be used by the individual owners of the items of interest to alter them in order to make them more effective, or using techniques described in further detail below on a system-wide basis to understand or recommend what may work for other system users.

Measuring the engagement with a résumé, CV, infographic, or description of work for hire allows the system to measure the success of an item of interest or part of an item of interest. If a job seeker is called and asked to come in for an interview after their infographic or résumé has been viewed, that résumé or infographic can be considered successful. There has, to date, not been any known way to measure the success or failure of a résumé or infographic in attracting employment. This method allows the system to begin to measure what is successful and not successful in a résumé or infographic.

An exemplary method of accomplishing this, in one embodiment of the disclosure, proceeds as follows. The system records when an item of interest is viewed, who it was viewed by, what the specific item was, and the individual components in that item, in addition to some or all of the other types of engagement captured by the system as discussed in further detail above. After a predetermined amount of time has passed following the viewing of the item, the system sends an email or other electronic message to the owner with an embedded form or a link to a form. The answers to the responses from either the owner of the item of interest or a given viewer are recorded in the system, as described in further detail above. The system examines each instance of a question response and increments stored totals for each answer associated with a given item of interest or for each component in the item of interest. Extra weight may be given to components in the items of interest with which a viewer engaged.

The totals for each component for a given answer can then be examined. Totals can be examined by individual users for the components of infographics that they own. In addition, the totals can be compared across all infographics owned by anyone in order to examine effective uses of infographic components across the system. Finally, the totals can be compared across infographics of professionals in a given segment of the professional market, or professionals with similar skill sets, or any other slice of the total population in order to examine effective uses of infographic components within segments of the entire user base, including by using methods described in further detail below.

Statistical Methods

In one embodiment, the system enables methods for applying statistical testing techniques (e.g., A/B, multivariate, regression, and/or other techniques) to a defined collection of infographics or a single infographic with different visual and/or data presentations, to determine which one or more presentations are more effective at driving engagement and/or outcomes, or some combination of success variables as measured by the system. The relative performance of these different infographics in achieving one or more outcomes is evaluated from a defined set of success variables that are measured and tracked by the system. Such variables include, e.g., page views, time spent on a page, time spent viewing a specific infographic representation, clicks or interaction events associated with the parts of a particular visualization, open rates of and/or response rates to visualizations that have been sent via electronic means, time to response, whether the infographic resulted in a callback or interview, whether the infographic resulted in winning a job or position, and the like.

As discussed in further detail above, there are currently no known dedicated systems for conducting a statistical analysis across infographics, especially not in the case of infographics representing individual professionals seeking to secure work or new business. By performing this kind of statistical analysis across different infographic or data presentations, and across different populations of job seekers, embodiments of the disclosure enable the provision of both actionable feedback and, in some cases, forward-looking suggestions about which infographic presentation might be most effective within a given context, such as when applying for a job, or when seeking to win new clients.

In one embodiment, the system includes three separate modules (and associated processes) for conducting statistical analysis, which modules can work either separately or together within the scope of the system as a whole. In addition, the analysis effected by these modules can be applied both retrospectively to historical data (e.g., conducting analysis after the fact and then reporting results or making a forecast on the basis of historical data), or dynamically to a set of data that is still in the process of being accumulated as a result of subsequent viewers engaging with an infographic. In the case of dynamic data analysis, the frequency with which certain presentations are displayed can be manually or dynamically shifted to infographics that are more effective or appropriate, or away from infographics that have been determined by these statistical modules to be less effective or appropriate.

The first module is adapted to vary and/or test the presentation of a given set of professional infographics that reside at a single, defined destination location (such a specific URL path).

The second module is adapted to test the presentation of a defined set of professional infographics by treating a set of individual infographic presentations that each reside at separate locations (i.e. separate URLs), or that have each been delivered electronically via separate emails or shared links (again in the form of separate URLs or also in the form of digital documents such as PDF files) as testable instances of variation within a single unified set of variants.

The third module is adapted to test one or more aspects of presentation variation or a specific variation value (including, e.g., color and font presentations, layouts, visualization ordering, collection of visualizations contained, specific visualizations used, completeness of visualization data, different visualization data, etc.) as may be expressed amongst a set of professionals defined by any of the variables used to characterize them or their Data Stores within the system (e.g., those professionals who have indicated their industry as technology and who have listed one or more positions with IBM).

The fourth and fifth modules/processes may be utilized in partnership with, or separately from, the three modules described above:

The fourth module is adapted to recommend a particular presentation based on engagement or outcome results obtained via other professionals in the system in similar cases (e.g., identifying the most effective presentation for applying to a specific firm, such as Google).

The fifth module is adapted to display benchmarks to a particular user for some aspect of their professional data, based on averages, means or comparisons to other professionals with comparable data forms.

These five modules and their related processes will now be discussed in further detail.

First Module:

The first module is adapted to analyze different presentations of a given professional's data (initially accessed via a shared URL path) from a set of presentation variants by presenting different variants to different viewers of that data. The particular variant shown to a viewer (from the full set of presentation variants) can be determined either via a random selection from the set of possible presentations, or by assigning viewers to different presentation groups via common statistical sampling methods. In one embodiment, the exemplary system works as follows:

1. First, several different presentations of a given professional's experience are generated, either manually by the professional him/herself, or via a generative process, described in further detail below. In one embodiment of the disclosure, a professional can generate presentation variants through the system's user interface, including one or more of several different flavors of variation that could be tested separately or in combination, including: "theming" (i.e., the application of different color palettes, font sets, and layouts to their professional representation), "templating" (i.e., the selection of different individual or multiple visualization renderings or graphical approaches to the same underlying data, such as a work timeline that is represented as positions radiating out from a central core vs. a work timeline that represent positions as horizontal bars progressing from left to right across the page), and "content variation" (i.e., representing variation in the underlying data associated with a particular professional's experience, such as a "project management" work history, with summary information emphasizing the professional's project management experience vs. a "product management" work history, which provides alternative textual data related to the professional's experiences prioritizing and designing software product features). These expressive aspects of the infographic presentation are described in further detail above. Alternatively, the system can generate variations automatically, such as by randomly varying one or more aspects of the "theming" and "templating" options using random number generators to select new combinations of these variation values from a pool of options available natively through the system, or from a set of templates available natively through the system. For example, the system currently stores a library of color palettes that include a themed group of colors that are applied during the rendering of a given infographic and that define such presentation aspects as an infographic visualization's background color, object color, and the like. Because these themes are stored separately and referenced in a given infographic, alternative palettes can be selected that are referenced for use in a generated variation. Regardless of the method of generation, each the variations to be tested is stored in a schematic form as described in further detail above, and also relates each variation both back to the user who owns these infographic variants, and also to the shared URL path to which these variations belong. Under system usage, where presentation variations are not being actively tested, one of the variants is defined by the infographic owner as the default to be displayed when the URL root path is visited by a viewer who wishes to see the infographic.

2. Second, when the testing module is active (either turned on by the user or an administrator), additional code is triggered, which will vary the specific presentation returned to a particular visitor arriving at the destination URL. A number of different mechanisms can be used to determine the presentation to return. One exemplary method randomly selects one of the alternative presentations via a random-number generation based on the total count of variations associated with the specific destination URL. Another exemplary method consecutively cycles through each of the variations based on a fixed time interval or visitor count number set in the system database. Other, more sophisticated sampling methods for assigning visitors to test groups, especially for synchronous testing, may be employed (e.g., simple (random) sampling, systematic (random) sampling, stratified sampling, clustering sampling, convenience sampling, or snowball sampling) and applicable to the presentation that may be selected.

3. Third, for each of these visitors, engagement with the profile is tracked via methods such as those described in further detail above. When a test is running, each set of visitor results is tagged in the system database against the particular presentation that was displayed.

4. Fourth, a separate job in the job system periodically runs to evaluate whether a sufficient number of observations have been collected to statistically evaluate the performance of the variations against each of the measured success metrics and to update the statistical comparison calculations. In one embodiment, the significance (p-value) for the comparisons can be set as a variable within the system database. The updated testing results are stored separately in the system database, where they can be accessed as part of a report-results page presented to the user or via queries written directly to the database.

In one embodiment, the system accomplishes the above by creating new Vizumes for each variant. If, for example, the user wishes to create a variant of a Vizume that changes the color scheme, then the user selects the Vizume from which to create the variant, indicates to the system that the user would like to make a variant of this document, and then makes the variation to color. The system stores this variation as a new Vizume, ready to be rendered as described in further detail above. The system also makes note that this Vizume is a variant of another, in a link table that shows variants called VizumeVariants. This table has three columns: ParantVizumeId, VariantVizumeId, and ActivelyDistributeRequests. Thus, this table allows the system to find all variants of a particular Vizume by finding rows where the ParentVizumeId is equal to the element ID of the Vizume under question, and to know if requests to the parent Vizume should be actively distributed to the variants under test.

When a request is made for a Vizume, the VizumeVariants table is examined to see if there are any active variants under test to which requests should be distributed for this particular Vizume. If there are none, then the Vizume is rendered normally. If, however, there are active variants under test, then the system uses a configurable scheme for selecting which Vizume should be chosen out of all active Vizumes including the parent. The system may use one or more sampling methods described above, e.g., randomly picking or cycling through variants. The engagement and viewings are tracked, e.g., as described in further detail above with respect to measuring viewer engagement for non-variants.

Finally, a background job periodically runs to compile variant engagement and viewing data. This job joins the VizumeVariants data for a particular variant set with engagement data by joining based on the element ID of the Vizumes in the set. Statistical evaluations are performed on this data at this time, as described in step 4 above, and the results are stored in a separate table for variant results. When a user wishes to view results of a variant test, variant results are looked up from this VariantResults table and displayed to the user.

Second Module:

The second module is similar to the first module; however, rather than being adapted to vary the presentation of the experience of one or more professionals through serving different variations of the presentation and/or data to the same URL path, presentation variants are instead spread across some number of "fixed" professional presentations that either reside at different, distinct URLs (for example vizify/firstname-lastname-1, vizify/firstname-lastname-2, etc), or that have been electronically delivered (such as via email in digital document form) to a number of distinct messaging addresses.

Accordingly, for example, a professional might apply for a position to work for a first firm using a first presentation (e.g., a red background for the digital résumé) by sending URL 1 to one employer, and for a similar position at a second firm with a second presentation (e.g., blue background) served from URL 2 to this second potential employer. As with the previous process, engagement with both of these presentation profiles is tracked and can be compared for efficacy.

In one embodiment, the second module shares much of the code and programmatic methods as the first module, but differs in the following two ways. First, in the first step of the process, the variations generated by the system, when using the second module, are associated with separate destination URLs or messaging addresses. Second, in order to set up and activate a test via the second module, the user or administrator must first specify which of the set of variants that belong to a given system user (or group) should be considered and/or evaluated by the testing process. Rather than assigning visitors to different presentation groups (or serving different presentations to visitors to a specific URL), visitors fall into different test groups based on the particular destination URL or messaging address they use to arrive at the infographic presentation. Thus, the system creates entries in the VizumeVariants table, but the value of the ActivelyDistributeRequests field will be false. Otherwise, for the second module, the behavior of the system (and the other aspects of the testing process) generally remains the same as in the first module.

Third Module:

The third module is adapted to test one or more aspects of presentation variation or a specific variation value (including, e.g., color and font presentations, layouts, visualization ordering, collection of visualizations contained, specific visualizations used, completeness of visualization data, etc.) as may be expressed amongst a set of professionals defined by any of the variables used to characterize them or their Data Stores within the system (e.g. those professionals who have indicated their industry as technology and who have listed one or more positions with IBM). In one embodiment, this analysis is available only to system administrators and involves manual interaction with the system database. The basic approach, however, can be extended to other user groups in the future and accompanied by a more automated user interface. In one embodiment, the exemplary system works as follows:

1. First, the pool of professionals to be examined is selected through one or more database queries. A query can refer to the entire population of professionals in the system database, or can instead be a subset selected on the basis of a particular aspect of the population that is to be studied, including any of the information relating to either system users (e.g., demographics, gender, type of accounts, frequency of logins, etc.), their professional data (e.g., specific companies, schools, etc.), and/or their visualization or presentation data (active visualizations, color palettes, fonts, etc.). In one embodiment, individual professionals' Data Stores are represented as JSON trees stored as binary large objects (BLOBs) in the system database. The system maintains indices on these JSON trees in order to facilitate the queries described above. In one embodiment, the task of specifying and maintaining these indices is performed manually by system administrators.

2. Second, the data from the queries in step 1 is joined with the dependent variable to be studied, which consists of one or more pieces of measurement data around the corresponding user profiles (e.g., shares, views, callbacks, etc.). For each professional presentation in the system, a set of analytical data recording these dependent variables is maintained in order to facilitate this join. For example, when a viewer follows a URL to view a system user's Vizume, that event is recorded in a database table and is subsequently made available for this module to join with the indices discussed above. Several other such events are recorded for the same purpose, such as when a viewer clicks on a particular infographic component of a Vizume, when a viewer opens an email containing a PDF representation of a Vizume, when a system user records a "call back" when applying for a job, and the like.

3. Third, the relevant analysis is conducted (e.g., multivariate regression) to determine which variables are responsible for any observed differences in outcome.

Fourth Module:

The fourth module is adapted to recommend a particular presentation based on engagement or outcome results obtained via other professionals in the system in similar cases (e.g., identifying the most effective presentation for applying to a specific firm, such as Google). In one embodiment, the system formulates a recommendation via the following process:

1. First, a web form is presented to the user who desires a recommendation for a presentation. The web form asks for information such as one or more of the following: (a) if not already contained in the user's Data Store, the professional's industry (in addition, the professional may also specify one or more job titles from a list presented to the professional based on the set of job titles contained within the system database); (b) in a text input field, a list of one or more comma-separated companies or organizations to whom the professional seeks to present himself or herself to in a professional manner; (c) using a radio button element, an indication of whether the professional is seeking employment, attempting to win clients, or attempting to grow his or her professional reputation; and (d) optionally, using a series of drop-down list elements, an indication of which aspects of their professional experience the individual believes to be his or her biggest strengths (the schema used to catalog and order the members that appear on these lists will be discussed in further detail below).

2. Once the form has been submitted, the system constructs a database query to identify the subset of professionals in the system who match one or more of the criteria supplied via the form in step 1. For company matches, the system pulls professionals who applied for a particular position at a matching company, as well as professionals who list a position with the matching company.

3. Next, each of the professionals returned by the query is assigned a numeric score based on one or more of the following exemplary criteria, whose weights will be adjusted (e.g., by a system administrator) over time: (i) a count of the number of criteria that match the query, (ii) whether a matching professional has outcome data matching the outcome sought by the professional requesting the recommendation, (iii) for company names, how recently the matching professional listed a position with the company, (iv) for company names, whether the matching professional is still employed by the company in question, and (v) how recently the matching professional updated his or her information in the system.

4. The matching professionals are sorted based on score.

5. A smaller group of high-scoring professionals is extracted from the pool. In one exemplary method, only the top third of scorers are used for further evaluation.

6. Cluster analysis is performed against this pool of professionals across one or more of the following presentation dimensions, to determine if there are any significant clusters within the high-scoring population: colors, fonts, layouts, visualization order, and visualization components.

7. If so, then the values for the significant clusters are reported to the user requesting the recommendation.

Fifth Module:

The fifth module is adapted to display benchmarks to a particular user for some aspect of their professional data, based on means, medians or comparisons to other professionals with comparable data forms. In one embodiment, the data contained in each visualization/data schema is typed. As a result, it is relatively straightforward to calculate the appropriate average or mean values across the Data Stores that represent a set of given professionals in the database. In the case of numeric or interval scale data, it is relatively straightforward to calculate means and medians. In the case of itemized or list data, such as recommendations, minimum and maximum counts of these items, as well as means and medians, may be calculated. In one embodiment, the system creates indices in a database that allow for easy grouping of data based on segments of professionals. The system may segment professionals based on industry and job title, or based on additional or alternative criteria, such as years of work experience, skills, and companies worked for. In that scenario, the system employs two indices that point to Data Stores: the industry (e.g., Information Technology) and job title (e.g., Software Engineer). Any data that is to be benchmarked also has a corresponding index created for it in Data Store. For example, the system might contain an index of the number of recommendations that are present in a user's Data Store.

A job periodically runs that queries the database for the mean, median, minimum, and maximum of data to be benchmarked in each segment of professionals, where there is interest for this data. In one embodiment, this query is run for each industry currently in the system. The query is also run for each industry and job title combination in the system. This data is then stored in separate records in the database for quick access by users when they wish to compare themselves to others. The system may be configured to add additional segments to be benchmarked or data inside the Data Store to be benchmarked at any time, and this data will also be gathered when the job runs next.

For any of the visualizations that can be rendered by the exemplary system and that contain numeric, scaled or ordinal values as components of their data, it is possible to render (e.g., using the techniques described in further detail above), the associated mean or benchmark value as computed by the system.

Portfolios

In one embodiment, the system is adapted to build and present a portfolio of professionals or services offered by individual professionals, where each professional is represented by one or more of their own particular infographics. The system may be adapted to normalize the infographic presentations according to the design of portfolio builder or viewer (including, e.g, selection of which data elements to include and/or exclude, and optionally, the presentation related to those elements). The system may further be adapted to transmit this portfolio to a third party for viewing, or to a website for publishing and/or presentation, where it can be viewed by website visitors.

Figure 30:
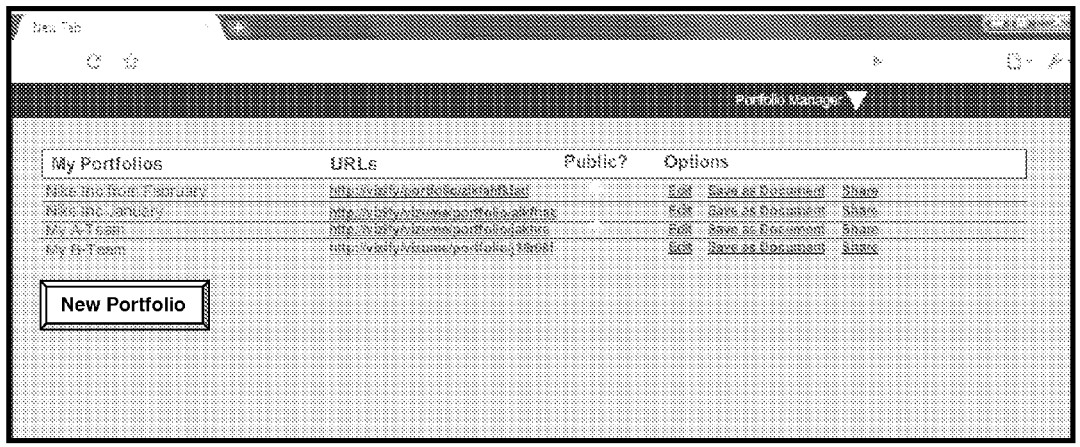
FIG. 30 is a screen view of a "portfolio manager" window, in one embodiment of the disclosure.
Figure 31:
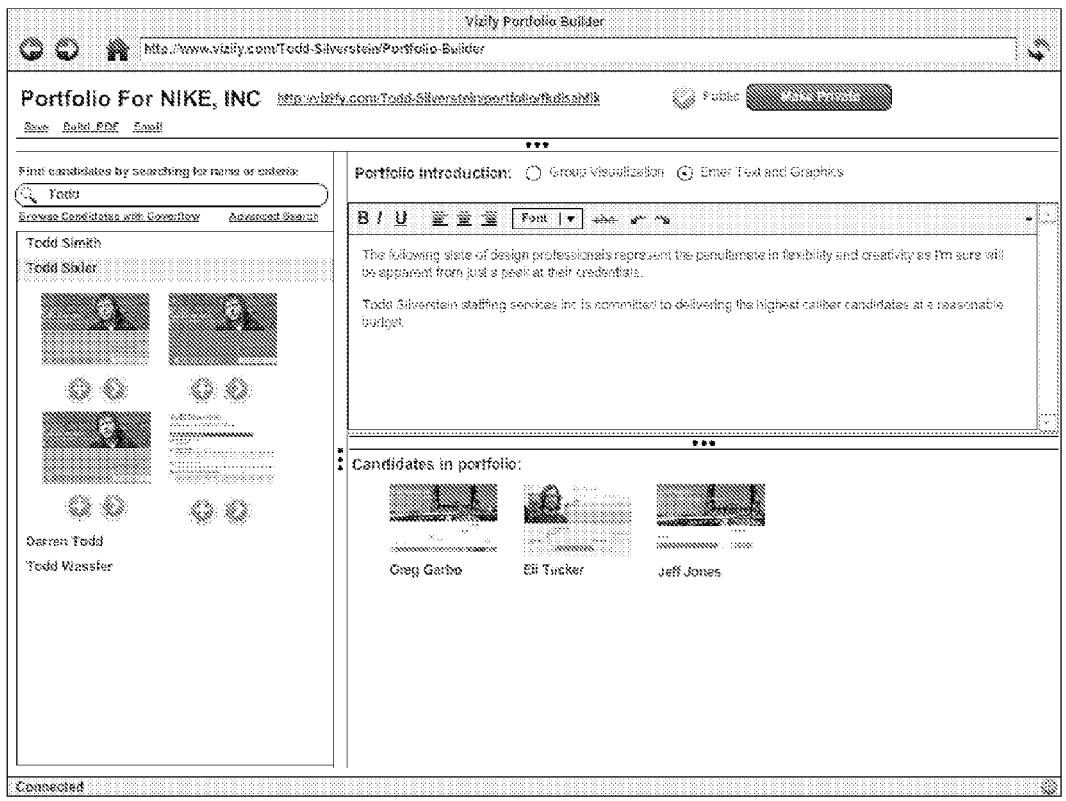
FIG. 31 is a screen view of a "portfolio builder" window, in one embodiment of the disclosure.
Figure 32:
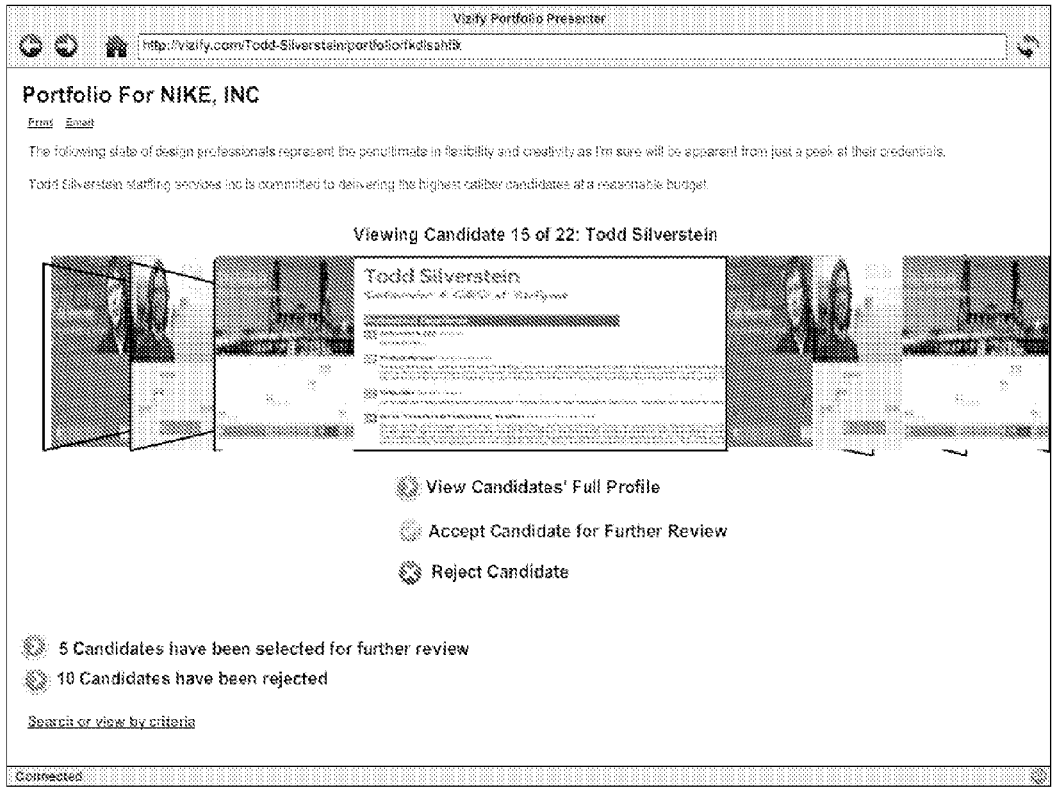
FIG. 32 is a screen view of a "portfolio presenter" window, in one embodiment of the disclosure.

The foregoing functionality is provided, e.g., using a set of tools that enable users classified as group administrators to build a portfolio of professionals for presentation to a third party, as illustrated in the example screen views of FIGS. 30-32.

In one embodiment, group administrators are users with permission to view, manage, and present the profiles represented by the Data Stores of other system users they have invited to create profiles, via a unique URL. Group administration is managed through a user, group, and role data structure. Users can belong to one or more groups. Roles can be assigned to groups or individual users. If a user is a group administrator, then the User would have a Role of Administrator that would point to the group in which the user has that Role.

In one embodiment, a group administrator wishing to build and present a new portfolio will access the "portfolio manager" settings through the account menu system, as shown in FIG. 30. As shown, this portfolio manager screen presents a list of all of the saved portfolios associated with the group administrator's account and stored in the system database. In one embodiment, each instance of the portfolio model contains, e.g., the following elements: (i) a name (typed as a string); (ii) a datatime representing the most recent update; (iii) a bit describing whether the portfolio is public or private; (iv) an associated URL; (v) a settings variable describing whether the portfolio introduction should be a group visualization of the members of the portfolio (constructed as described in further detail below), a content block made up of html text and images, or both; (v) optionally, a content block containing HTML and links to images used to introduce the portfolio; and (vi) a hash containing an ordered list of pointers to the Personas of users or groups represented in the portfolio.

FIG. 30 shows that, for pre-existing portfolios, the name, URL, whether the portfolio is public, and associated options (e.g., editing, saving as a document, and sharing) may be accessed directly from the portfolio manager screen. To create (instantiate) a new portfolio, the group administrator clicks on the "New Portfolio" button and is then asked to name the new portfolio via a naming dialog.

After naming the new portfolio, the group administrator arrives at the "portfolio builder" screen shown in FIG. 31, which shows an exemplary tool used to build the portfolio. In the top panel, the newly-named portfolio is repeated. In addition, the system has generated a unique URL that will be the location for the portfolio. By default, portfolios start as public and may be viewed and/or accessed via the URL by the same method as other infographics/visualizations, as described in further detail above. The bit describing whether the portfolio is public or private may be toggled (as shown in the top right portion of the window), and such functionality may be implemented in like manner to other public/private visualizations in the system.

Also located in the top panel of FIG. 31 are menu options to save the portfolio (which writes the current state of the portfolio to the system database); a build PDF option, which generates a PDF file of the full portfolio (as described in further detail above), and a link to email the document (using, e.g., Rails's actionmailer to generate an email message with the correct URL for sending).

The group administrator can build the portfolio of individual professionals or entities by finding and selecting candidates from the panel at left using the "+" icon. Professionals can be found either by typing strings that are matched against both the names and text values contained within the Personas of individual or entity Data Stores that the group administrator has permission to access, or as seen in the "browse candidates with coverflow" by browsing through individuals and entities one at a time.

As shown in FIG. 31, for each individual or entity matched, a thumbnail is generated of each public Persona for that individual which can be added (via the "+" icon) to the portfolio. It is also possible to view each of these Personas within a popup iframe by clicking the ">" object. When a group administrator selects the "+" icon, a pointer to that Persona is added to the end of the portfolio hash, and a thumbnail representing that individual is added to the "Candidates in portfolio" panel shown at the bottom-right portion of the window.

In addition, the group administrator can define the portfolio introduction through the "Portfolio Introduction" panel appearing at middle-right of the window. The administrator can select "Group visualization," which will build a composite visualization of each member of the portfolio (as described in further detail below), and the administrator can choose to enter text, graphics, or both (as shown). In the event the group administrator chooses to enter text and graphics, a text-entry panel (as shown) appears on the screen and allows the administrator to type in text or HTML, or to drag and drop graphics that will all be recorded in the content-block portion of the portfolio model. At any point, the group administrator can also view the portfolio by following the link at the top of the window, which will open up the presentation mode in another window.

Live portfolios may be shared, emailed or accessed in the same manner as other infographic/visualization presentations described above. However, the viewing experience for portfolios provides additional interactivity to a portfolio viewer, as shown in the "portfolio presenter" screen of FIG. 32. When a viewer of a portfolio accesses the portfolio via the corresponding URL, the viewer is first presented with the top-level portfolio view, which view includes the portfolio name and options to print or email the portfolio. As shown in FIG. 32, the top-level portfolio view renders in HTML a number of distinct components, e.g.:

(i) Near the top of the page, and depending on the settings variable described earlier in this section, the portfolio's HTML content block is rendered in a Rails view partial (as seen in FIG. 32). If the settings variable included a group visualization, then the group visualization would be constructed (as described in further detail below) and rendered in a view partial using the standard visualization rendering methods described in further detail above.

(ii) Beneath the portfolio introduction, a coverflow element presents a thumbnail slideshow of each of the candidates in the portfolio that the user can flip through.

(iii) For the candidate in focus (in this example, Todd Silverstein at center), a text label identifies the candidate by name and number.

(iv) Underneath the candidate in focus are several menu options that allow the portfolio reviewer to visually browse, evaluate and select entities from the candidate pool for a particular job, assignment or work. The ">" symbol leads to a full-page view of the current Persona in focus, which is rendered as described in further detail above. The "√" symbol adds the element ID associated with the candidate to a pool for further consideration (implemented as a selection hash, using the methods described in further detail below). The "X" symbol adds the candidate to a rejected pool (also implemented as a selection hash, using the methods described in further detail below).

(v) Also shown are navigation links to revisit candidates that have already been sorted into one of the pools, or to search/view the candidate pool by using specific keyword matching criteria, which initiates a query against each set of user data included in the portfolio. In one embodiment, each Persona's content data is both indexed and made searchable by an external system that runs Lucene (see http://lucene.apache.org/java/docs/index.html).

This exemplary configuration confers a series of benefits for staffing and recruiting professionals, team builders, and anyone who has a need to manage pools of professionals or entities, both for presentation and evaluation and/or selection by third parties. For the administrator selecting a slate of candidates or entities for presentation to a third party, time is saved by allowing for a quick visual search, review and addition of a candidate or entity to the portfolio. With the ability to save and reuse the portfolio, additional time is saved if the slate of candidates needs to be presented multiple times. The administrator can introduce the slate of candidates with a visual infographic representation of the capabilities of the team as a whole. The candidate slate can be easily shared via URL or in document form. The third party who is evaluating or selecting from a slate of candidates can quickly review and sort candidates into different groups, saving time. The third-party reviewer can examine each candidate in more detail using methods discussed above in further detail.

In addition to the foregoing features, in one embodiment, the system also enables a group administrator building a portfolio of candidates to apply a standard visual presentation to the Personas of each of the candidates/entities to be included in the portfolio. An exemplary process for applying this standard presentation includes the following three steps. First, while constructing the portfolio, the group administrator accesses a menu option to "Apply a standard presentation to all members of the portfolio." Second, via a series of web forms, the group administrator specifies which data/visualizations the group administrator wishes to include in the presentation. The list of potential data/visualizations from which to choose is generated by the system directly based on the named data types/visualizations that are detailed in the system data schema and that are common to 75% or more of the Data Stores in the system. For example, the exemplary system can make selections from the database of a group of Data Stores to get a count of each of the data elements that are present in that Data Store. If the result count over the total number of Data Stores examined is greater than the target percentage, then the visualization is eligible to be included in the presentation. Third, for each visualization chosen in the second step, the administrator selects the visualization variant that will be applied to each applicant's data, including optional setting of visual colors and styles as described in further detail above.

Visual Comparison and Evaluation

In one embodiment, the system enables visual comparison and evaluation of entities and/or users (or parts of the data Persona that belongs to these entities and/or users) by generating side-by-side or overlay-layer comparison visualizations of the data associated with these entities and/or users. An evaluator can score and/or sort these entities via button clicks or added tags. The infographic templates and/or variants to be applied to the data can be specified, and one or more master styles (such as colors and fonts) can optionally be assigned to those visualizations. A subset from a full set of available data (in the data Persona or Data Store) can be selected for inclusion in the comparison visualizations. The system may also provide methods for aiding comparison techniques, such as displaying means and/or benchmark lines for scored values and interval scales, totals for collections of objects, and equivalent time segments for time-based data. Job applicants or slates of candidates (such as potential contractors) can be compared via this system. The precise parts of the resume/CV or pre-existing system data to include in an applicant comparison can be specified.

One of the challenges faced both by human resource (HR) and staffing professionals, as well as by ordinary people who are evaluating a slate of candidates to hire for a position or service, is to efficiently conduct an initial screening of applicants or available contractors to see which ones should be considered in further detail. In the case of hiring, while some larger companies utilize software systems that handle some of this initial screening and sorting through automated processes, such as the use of algorithms, keyword matching, or document analysis, it is not uncommon for HR professionals to report that they still prefer to perform the initial filtering themselves due the inability of current-day expert/artificial intelligence (AI) systems to adequately or accurately discriminate in the initial evaluation of candidates, or to accurately weigh candidate pros and cons effectively. When ordinary people hire contractors, they must perform a similar weighing and sorting process, which is often completely manual.

A related challenge is that, when screening a large number of applicants for a job opening, this first-pass filtering can take significant time due to several limitations, including, e.g.: (i) variation in resume/CV formats, which requires time-consuming mental translation on the part of the screener; (ii) parsing lexical dates, positions, skills and other content traditionally included in job applications into a coherent mental image, which requires further mental translation on part of the screener; (iii) finding the specific sections of the document that the screener cares about (such as Education or Skills) for the particular filtering operation requires time on the part of the screener; and (iv) lexical data less readily admits true side-by-side comparison, since it has not been standardized in any meaningful way.

In one embodiment of the disclosure, the system addresses these challenges through the use of a side-by-side or shared plot infographic/visualization comparison engine, wherein the visualizations (i) might or might not be further adjusted (such as through the addition of benchmark indicators) to facilitate comparison and (ii) can be configured by the HR professional or person hiring a service professional, such as a lawyer, accountant or freelance designer, to display only those parts of the job seekers' or other candidates' credentials that are relevant to the position in question.

Figure 33:
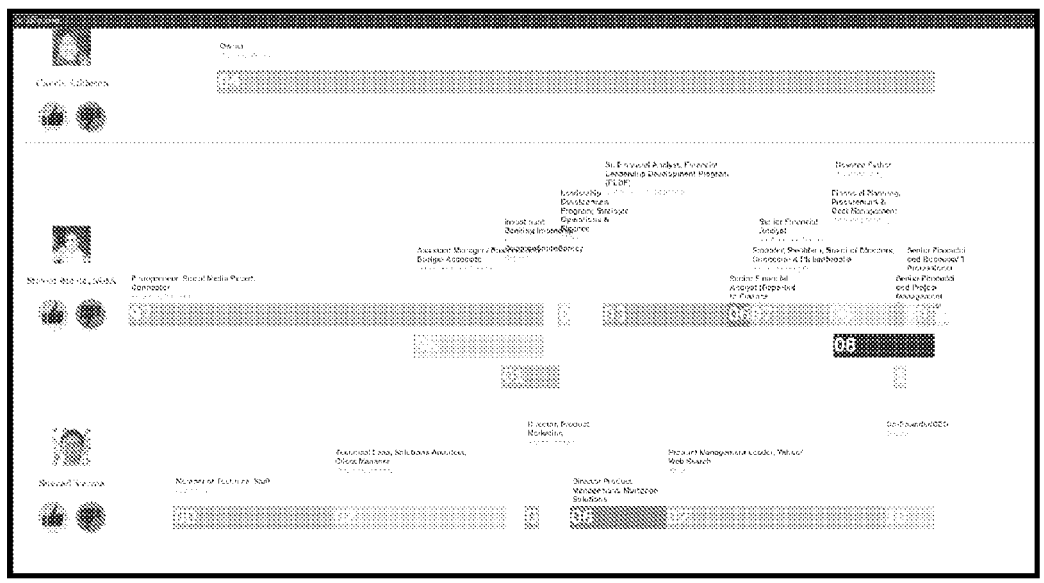
FIG. 33 shows an exemplary screen view of a side-by-side comparison of a plurality of individual candidate images and work histories that have been standardized, in one embodiment of the disclosure.

FIG. 33 shows an exemplary screen view of the system's side-by-side comparison capabilities in the case of job applicants, wherein a plurality of individual candidate images and work histories have been standardized and placed side-by-side (i.e., stacked on top of one another), in one embodiment. As seen in FIG. 33, single-click controls (e.g., thumbs-up and thumbs-down icons) have been placed next to each candidate to allow the evaluator (e.g., an HR professional) to quickly sort and/or filter candidates into two buckets, one for further review (indicated, e.g., using a green-colored thumbs-up icon), another to discard candidates from consideration (indicated, e.g., using a red-colored thumbs-down icon). Although not specifically shown in FIG. 33, as the evaluator sorts candidates as part of the filtering process, additional candidates' visualizations representing unsorted candidates replace those currently on the screen that have already been sorted. The evaluator is able to return and view the full visual profiles of the sorted candidates (typically, an evaluator would return to view only candidates for which the evaluator has given a thumbs-up).

In one embodiment, the system builds such comparisons using the following exemplary method:

1. A system user responsible for evaluating the job candidates (such as an HR professional) creates an open position in the system, which is stored in the system database and constructed through a series of web forms. Data for the open position may include, e.g.: job title, job description, job requirements, hiring company, salary range, and other data to be supplied by the applicant, including information about work history, education, skills, and the like. The open-position data may also include acceptable data types for submission, such as a résumé document, a LinkedIn login, and so forth, as well as submission dates that define a start and (optionally an) end date for accepting applicants.

2. As an additional option or alternative starting point to the process initiated in step 1, a system user looking to hire or engage a professional service provider can search for relevant candidates already in the system database by providing search criteria through another series of web forms. These criteria can potentially include any of the data categories and/or types that exist within the system schema and which may specify, among other pieces of information: industry, years of experience, keywords, job titles, employers, skills, specific skills, and recommendations.

3. In addition to specifying the information or criteria that will define applicable candidates, the system user looking to hire also specifies via web forms which data the user wishes to display for the side-by-side evaluation. The list of potential data to choose from is either defined in step 1 above, or can be generated by the system directly based on the named data types detailed in the system data schema. The system user may also specify, for each type of data that the user wishes to display in side-by-side fashion, the standard visualization that will be applied to each applicant's data, including, e.g., setting visual colors and styles as described in further detail above.

4. After a position reaches its submission starting date, the open positions are listed on a web page that can be viewed by candidates in the system. If a candidate is interested in a particular position, then the candidate applies for the position using their information as it already exists in the system. In the event the applicant's data is not yet in the system, the applicant submit his or her information to the system using one or more of a variety of methods, e.g., by filling in web forms to collect the information, or more commonly, by uploading his or her professional information (in the form of a résumé, CV, or lexical professional document) or by providing access to a Data Store that contains similar information (such as authorization to access the applicant's LinkedIn profile), and then editing the resulting output, as described in further detail above, to complete their submission.

5. As described in further detail above, the system processes the applicant data into the structured schema data that can be rendered in a visual infographic format.

6. In tandem with each applicant's submission, a list is generated and stored in the system database containing references to the IDs (and Vizumes) corresponding to all candidates who have applied for a given position. In the case of a search in step 2 above, references to the IDs (and Vizumes) are also stored for any system users who have matched the search criteria.

7. Next, the system generates the side-by-side comparisons, e.g., as shown in FIG. 33, by displaying the first slate of candidates retrieved from the list and rendering those candidates' data visualizations using the infographic definitions selected in step 3 above.

8. Lastly, an HR professional or similar agent can visually evaluate each candidate and screen them into buckets by clicking on the rating controls (e.g., thumbs-up/thumbs-down buttons), which will refresh the display with new visualizations until every applicant on the list has been reviewed, or until the HR professional considers the screening complete.

While not explicitly illustrated in the example above, in some embodiments, the system may support the following exemplary additional variations to the above:

In some embodiments, the system provides the ability to sort and/or filter candidates into any number of user-configurable buckets, each accompanied by a label and control (e.g., button). For example, an HR professional might wish to sort job candidates into 3 buckets: "definitely yes," "possibly," and "no." The system can store the number of buckets and their accompanying labels as strings in the database and can cycle over those elements to generate and/or render the accompanying control buttons. When candidates are screened, candidate IDs are added to a hash representing both those candidates who have not yet been sorted and those that have already been placed in a particular bucket.

In some embodiments, the system is adapted to automatically generate emails to individuals that are already in the system database and who either match (have 100% of the data for) or score strongly (are above the mean benchmark value) on the selection criteria (specified in step 3 in the exemplary process described above) for a given position and who have not yet applied for the given position.

Figure 34:
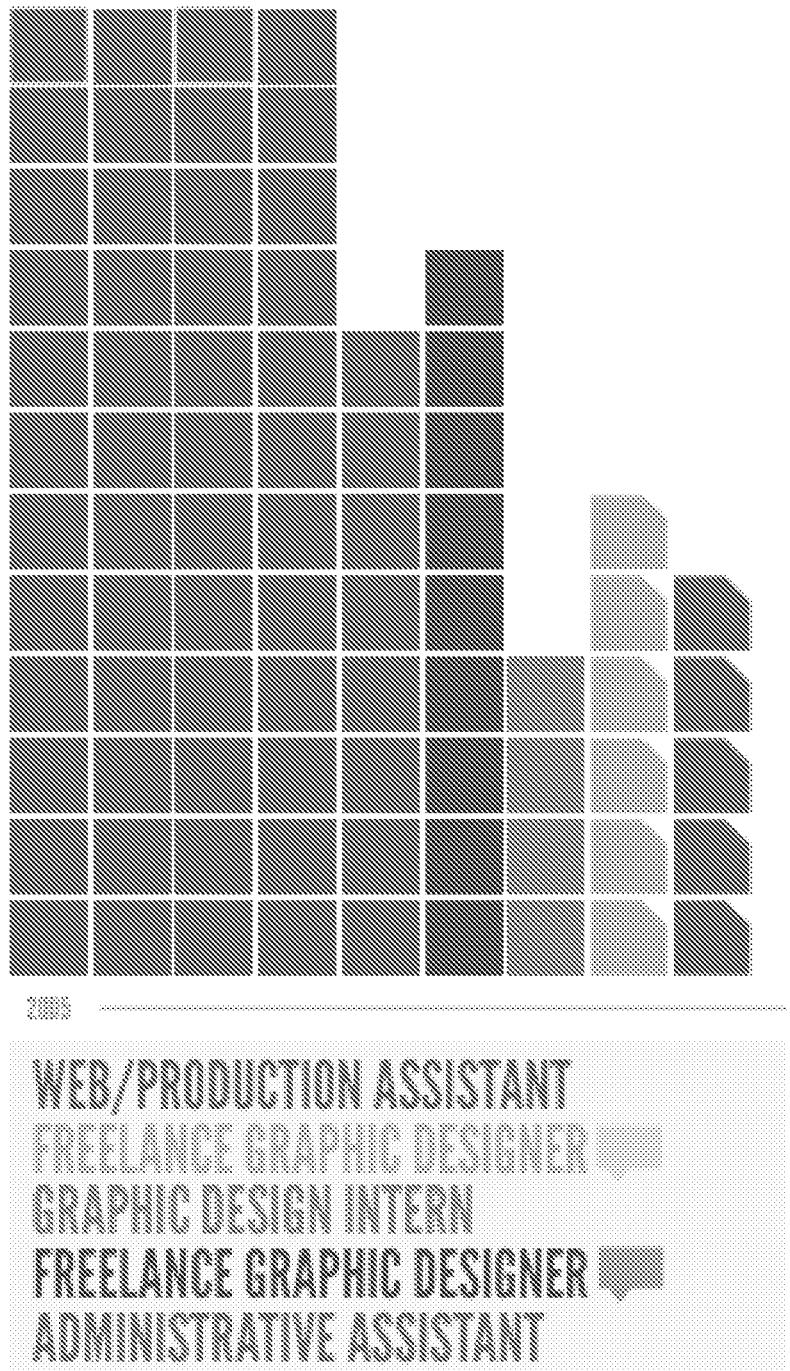
FIG. 34 shows an exemplary screen view of a normalized representation of job positions, with each square representing a fixed interval of time, in one embodiment of the disclosure.

In some embodiments, additional adjustments can be made to the visualizations to aid comparison techniques, such as displaying means and/or benchmark lines for scored values and interval scales, totals for collections of a given object (e.g., the total number of recommendations a candidate has obtained), and adjustments to presentation of time-based data, including excerpting an equal period of time (e.g., just the last 10 years of activity from present backwards, scaling the work histories to occupy a fixed width on the page, as seen in FIG. 33), or rendering time data as fixed-width elements representing a fixed unit of time (e.g., squares representing a month of work, as shown in FIG. 34, which shows a normalized representation of positions, with each square representing a fixed interval of time).

In some embodiments, each applicant's data visualization is displayed as data represented on a shared plot or single canvas, rather than side by side, in order to visually identify and screen out groups of applicants in a single step. To provide an illustrative example of how this works in one embodiment, an example of an HR professional looking to find candidates who have both advanced Adobe Photoshop and Ruby on Rails programming skills will be used. In step 3 of the process above, the HR professional would select a shared-plot visualization, rather than a standard side-by-side visualization. Shared plot visualizations are designed to plot data from multiple applicants or individuals on a single canvas. To provide a concrete instance of one exemplary shared-plot visualization, the system could have a two-skill shared plot that represents a first given specified skill (in this case Adobe Photoshop expertise) as an x-value on an x-y axis and a second given specified skill (in this case Ruby on Rails programming) as the y-value on the x-y axis. Thus, the skill level for each candidate can be represented as a single x-y coordinate pair on the shared plot canvas. In one embodiment, the data schema might reflect the degree of expertise for a given skill on a 6-point scale (e.g., 1 being a beginner and 6 being the most expert). In the resulting visualization, each candidate's expertise at Photoshop and at Rails would be reflected as an x-y coordinate pair that would be placed between (1,1) and (6,6) on the plot. In one embodiment, the system further divides this visualization into four even quadrants, each comprising a 3×3 portion of the x-y coordinate space, i.e.: (x:1→3, y:1→3), (x:4→6, y:1→3), (x:1→3, y:4→6), (x:4→6, y:4→6). By selecting one of the quadrants (in this example, most likely the upper-right quadrant (x:4→6, y:4→6)), and then clicking the green thumbs-up arrow, the screener can pick out the desired experts in both skills very rapidly, rather than having to screen each candidate's expertise in these skill areas individually.

In some embodiments, the system maintains average scores or votes for a candidate based on more than one individual undertaking the screening process (such as an HR team having multiple members, with each member reviewing all of the candidates in a given set of candidates).

Marketplace

In one embodiment, the system includes a marketplace for infographic and infographic designs. Processes for building an online marketplace that connects consumers with providers of software are known. Such marketplaces offer a number of advantages for both consumers and providers. Benefits to consumers of such software are convenience, selection, additional security if the software has been vetted by the marketplace, ratings, being able to keep a credit card or electronic payment details on file for repeat purchases, and the like. For software makers, benefits include exposure and an existing distribution scheme for their software, typically in exchange for a percentage of the sale price taken by the marketplace operator. Examples of online marketplaces include Apple's "App Store" (a marketplace for mobile applications that run on the company's iOS devices), the "Google Play" application (a marketplace for mobile applications that run on Android devices), and, on the design side, marketplaces for weblog or blog themes (e.g., Templatic: http://templatic.com/wordpress-themes-store) and stock images (such as those offered by Getty Images: http://www.gettyimages.com/).

No known marketplaces of this type exist for infographics, due to barriers that would render creating such a marketplace meaningless to traditional practitioners of infographics. One barrier is that there has to date been no way to package a general infographic description that can be applied to separate Data Stores (as discussed in further detail above). As a result, it was impossible to "sell" infographics as templates in the past. In addition, similar challenges exist in terms of uncertainties about the data that is used to create the infographics, which challenges are eliminated by the standardization of such data provided by embodiments of the disclosure. Due to the foregoing barriers, a marketplace for infographics previously had little or no utility, and there was not enough general interest to create such a marketplace.

Another barrier is the general lack of programmatic skills on the part of the typical graphic artist, or the web designer conversant in HTML/CSS but unable to program. By abstracting the programmatic aspects of the design process and creating an API for typical web designers to easily create infographic templates, the system facilitates the availability of a sufficiently-rich pool of infographic template designers to create a viable marketplace.

An additional barrier to a viable marketplace has been the lack of demand. Traditionally, infographics are commissioned by larger organizations, rather than by a mass of lay consumers (i.e., professionals). By offering technology that allows a much broader set of individuals to interact with infographics, widespread demand is created for infographics by everyday professionals, which demand has not previously existed. Without using the approaches consistent with embodiments of the disclosure, it is not apparent that there would ever be sufficient demand to justify a marketplace of this type.

By using schemes consistent with embodiments of the disclosure, the foregoing barriers are overcome, and the creation of a viable marketplace of infographics is facilitated. An exemplary marketplace, in one embodiment, contains infographic definitions and prices for those definitions.

In one embodiment, infographic designers create infographic definitions (as discussed in further detail above). When an infographic designer creates a new infographic template, the designer interacts with a form in the system to create a new template. The designer gives the template a name and uploads all files associated with the template, including, e.g., HAML, CSS, and image files. The HAML, CSS, and image files used by the template are the basic building blocks of the actual template itself.

The designer also sets the desired (e.g., per-use or per-user) price for use of the template and agrees to legal terms that allow purchasers of infographic templates to use the infographic. (It should be understood that such a purchase transaction could alternatively be characterized or established as a licensing arrangement.) The designer also chooses which schema elements defined in the system are used by this infographic and may also assign keyword tags to the template. This data is later used by the system to allow for editing of data in an infographic, as described in further detail above, and such data is also used specifically by the marketplace components to categorize infographics, so that they can be browsed or searched. For example, the user may wish to browse all infographic templates that depict data elements defined as "recommendations" in the schema.

Figure 35:
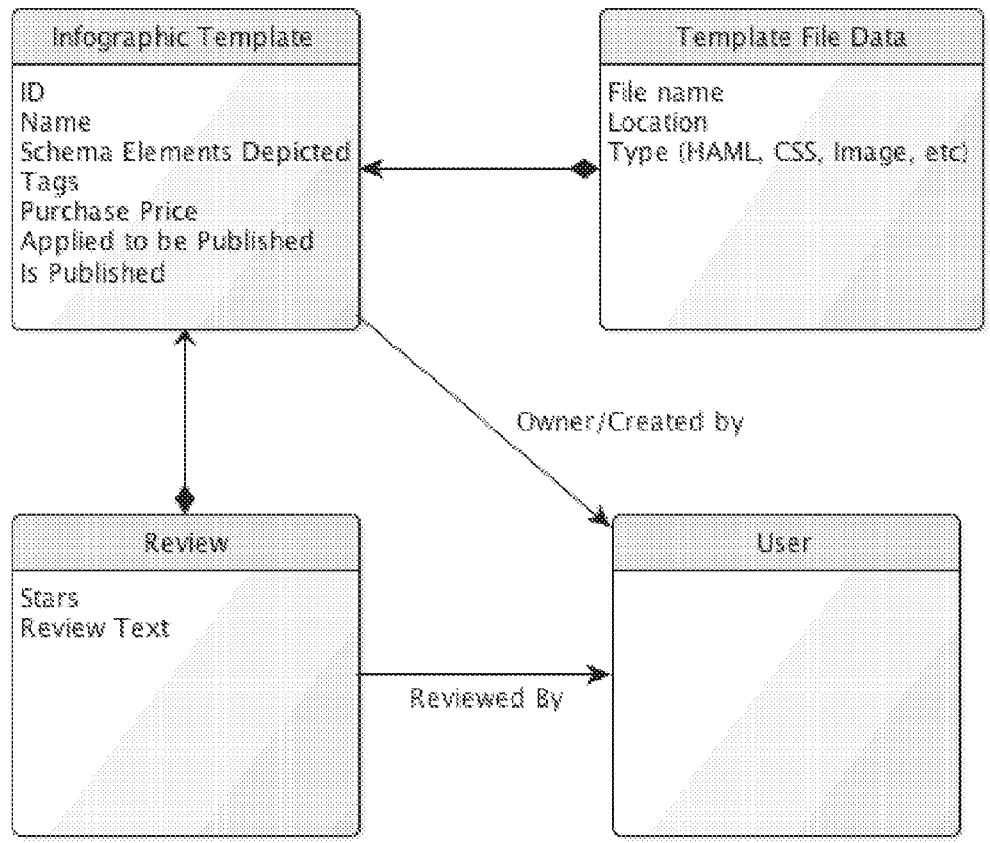
FIG. 35 is an entity relationship diagram of exemplary database tables relating to infographic templates, in one embodiment of the disclosure.

All of this information is stored inside the system's database and/or file system. An entity relationship diagram of exemplary database tables relating to infographic templates is shown in FIG. 35.

Once the infographic template is uploaded to the system, the system allows infographic designers to preview the infographic with data from their Data Store. The designer may choose to associate this Data Store with his or her infographic definition (or some other predetermined set of data) so that purchasers in the marketplace can see the template populated with a full data set. Each template that is stored in the system thus may have its own Data Store from which a rendered template may be previewed by purchasers.

End users of the system may browse infographic templates in the system randomly, through the items cataloged by the schema elements they depict, by tags, or using another method. For example, the user may see a list of schema elements to be depicted, click on the name of that element, and see a list of infographic templates that contain the ability to render that component. The user may also type in or click from a list of tags to see all infographic templates that are assigned to a given tag. This process is facilitated by basic selection techniques from the database.

Upon viewing an infographic template, an end user can choose either to render a preview based on the Data Store designated by the infographic template designer (which can be fully populated to exemplify all of the capabilities of the infographic template) or based on the end user's own Data Store. Rendering of an infographic is handled as described in further detail above.

End users may also review infographic templates, e.g., assigning a star rating from 1 to 5 and optionally providing a textual review of the template. This review data is also stored in the database along with the identity of the user that created the review. Accordingly, when a user is browsing an infographic template in the marketplace, the user can see the average rating of that template (which is calculated by querying for the average number of stars assigned in all ratings).

Linking to Infographics

In one embodiment, the system links an individual digital infographic or set of digital infographics to one or more real world objects, such as business cards that are printed with a specific hyperlink or encoded URL, such as a quick-response (QR) code, that can then be used to access or read the related infographic data via an Internet-connected mobile or desktop device. The presentation or underlying data driving these digital infographics can be independently altered and/or adjusted after the real-world object has been manufactured or distributed, e.g., through one or more of the following mechanisms: A first mechanism involves encoding separate codes that map to these separate presentations on related objects (such as a set of business cards), allowing the infographic owner to disseminate different codes to different recipients based on the desired presentation. The real-world objects may further be marked with colors, tags, or other distinctive aspects that would enhance the owner's ability to discriminate in selecting which objects to disseminate without necessarily conveying that discrimination to the object recipient. The owner may also append an identifying number to each code to uniquely identify recipients. A second mechanism involves electronically prompting (such as via text messaging or email) the infographic owner at the time the infographic is in the process of being accessed by a potential viewer to indicate which presentation and/or data set should be presented. A third mechanism involves enabling the infographic owner to change and set the presentation linked to a given code via a web-enabled mobile or desktop device at any time via their user controls. A fourth mechanism involves enabling the infographic owner to set rules around the presentation to display which determines the presentation shown. The owner may include rules that alter the presentation and/or data shown based on time and/or date, type of device accessing the infographic, the number of views, a unique identifying number contained in the code, or the identity of the viewer as may be ascertained, by among other things, a login to a site such as Facebook or LinkedIn.

The system may further permit viewers of a visual infographic to contribute data that is incorporated into the visualization. Further, the digital infographic connected to the real-world object can serve to populate or supplement underlying data used or plotted in one or more linked infographics, e.g., through one or more of the following mechanisms: prompting the potential viewer to supply information in advance of viewing the infographic, collecting information about the viewer at the time the viewer attempts to access the infographic (such as capturing their location via an IP address, device type, cookie, or the like), or linking the infographic to a real-world object that is itself an electronic device capable of generating and transmitting (or storing and transmitting) data.

The infographic or link to the infographic could alternatively be transmitted digitally via a mobile device (e.g., through the Bump API provided by Bump Technologies, Inc.), whereby a menu of possible presentations is presented to the infographic owner in advance of the transmittal via a mobile device, allowing the owner to select which presentation (or related link to that presentation) to send from a list of all currently available presentations. As described in further detail above, the exemplary system enables users of the exemplary system to display one or more Vizumes (i.e., Vizume templates & data Personas) at specific URLs that have been defined in the system. These Vizumes can be explicitly linked to a real-world object, such as a printed business-card, by printing the correct URL or an encoded version of the URL on an object.

Figure 36:
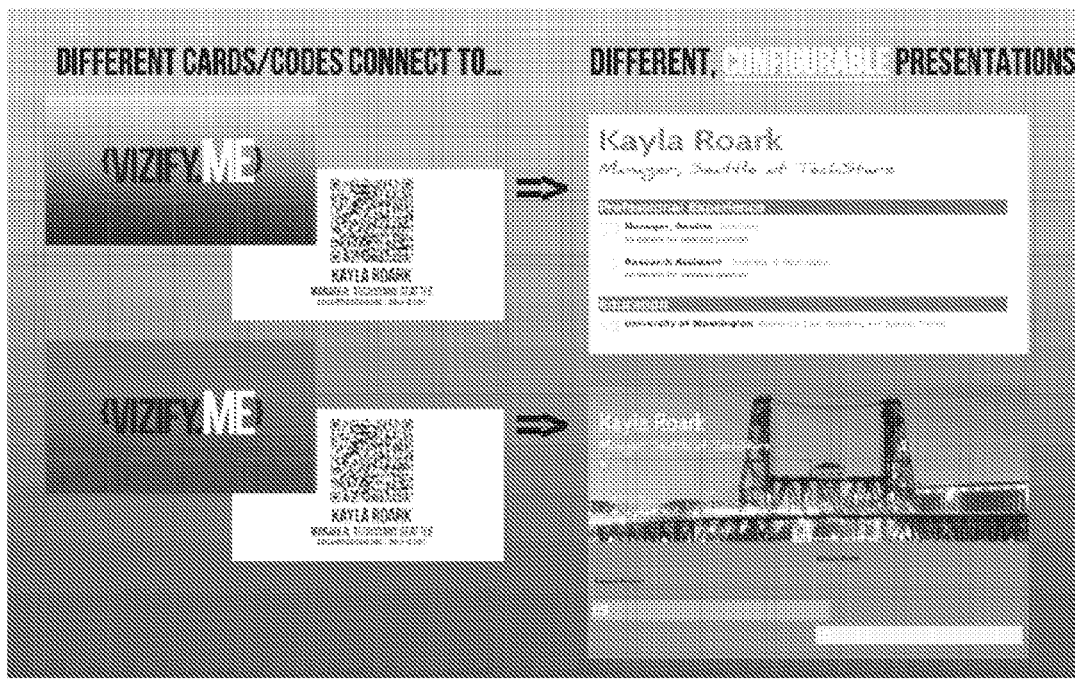
FIG. 36 illustrates exemplary business cards bearing QR codes, in one embodiment of the disclosure.

FIG. 36 illustrates exemplary business cards bearing QR codes, in one embodiment of the disclosure. Such business cards illustrate linkage through the use of a machine-readable QR code. In this case, the top business card links to one presentation of the individual's Persona, whereas the bottom business card links to a different presentation of that individual's Persona.

Figure 37:
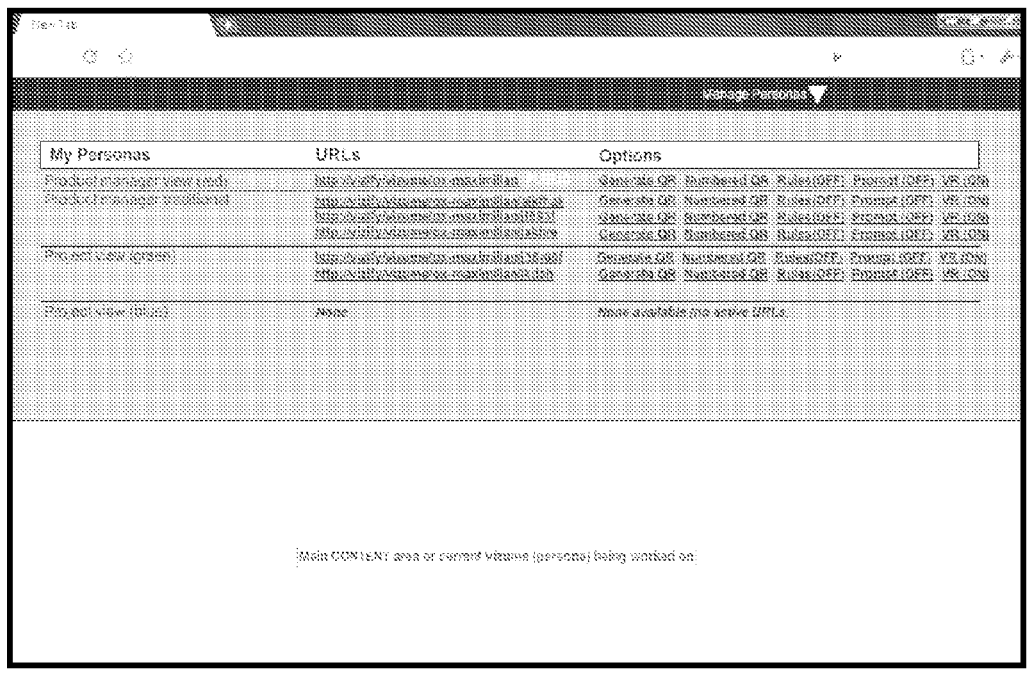
FIG. 37 shows an exemplary screen view of a "Manage Personas" panel, in one embodiment of the disclosure.

FIG. 37 illustrates an exemplary "Manage Personas" panel that can be accessed by a given user or group who control a specific Data Store, in one embodiment. This panel lists each of the user's Personas, whether they are active or not, accompanying URL(s), and configuration links to controls that can be used to generate either a QR code from that URL ("Generate QR" link) or a numbered series of links and/or QR codes ("Numbered QR," as described in further detail below).

Figure 38:
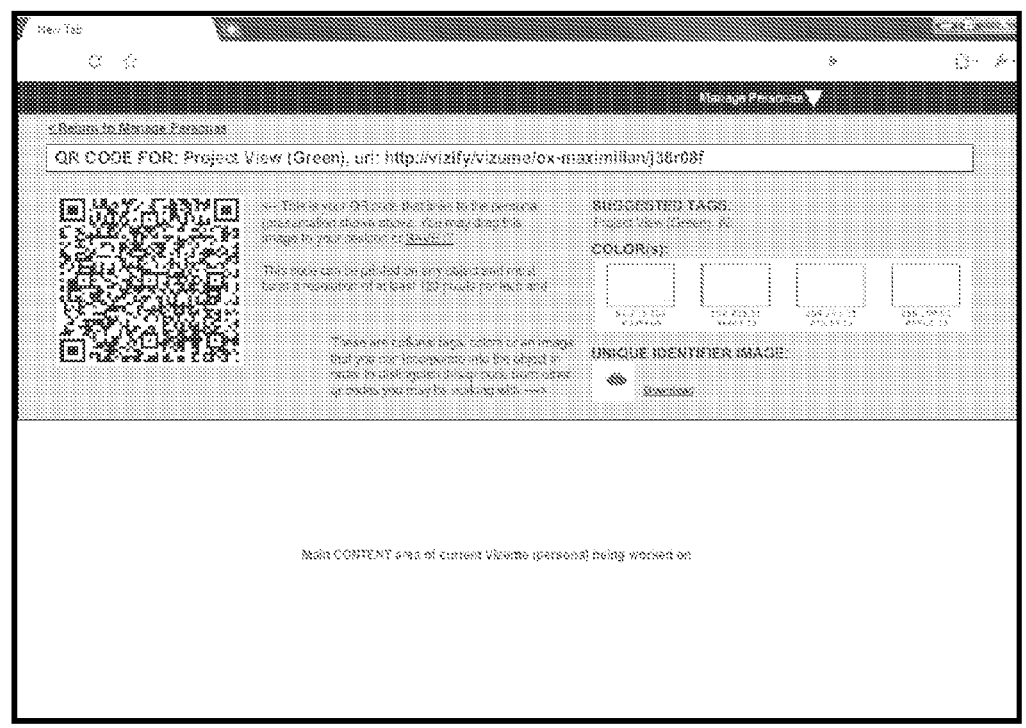
FIG. 38 shows an exemplary screen view of a page for generating a QR link, in one embodiment of the disclosure.

FIG. 38 illustrates an exemplary page for generating a QR link, in one embodiment. As shown in the screen view of FIG. 38, when the user clicks the "Generate QR" link, the QR code is made available for download, along with additional suggested tags, colors, and identifying images that can be downloaded and incorporated into the design of any object, but especially printed ones that may be ordered from commercial sites such as Zazzle.com, Moo.com, or Vistaprint.com, and which enable the incorporation of both links and individual graphics into the designed objects.

For example, an individual can control the specific presentation that a viewer following the encoded URL will see by selecting one of two business cards (e.g., either a red or blue card) to hand out to a given viewer, the selection of which will determine the destination URL at which this specific viewer will arrive to view the presentation.

Figure 39:
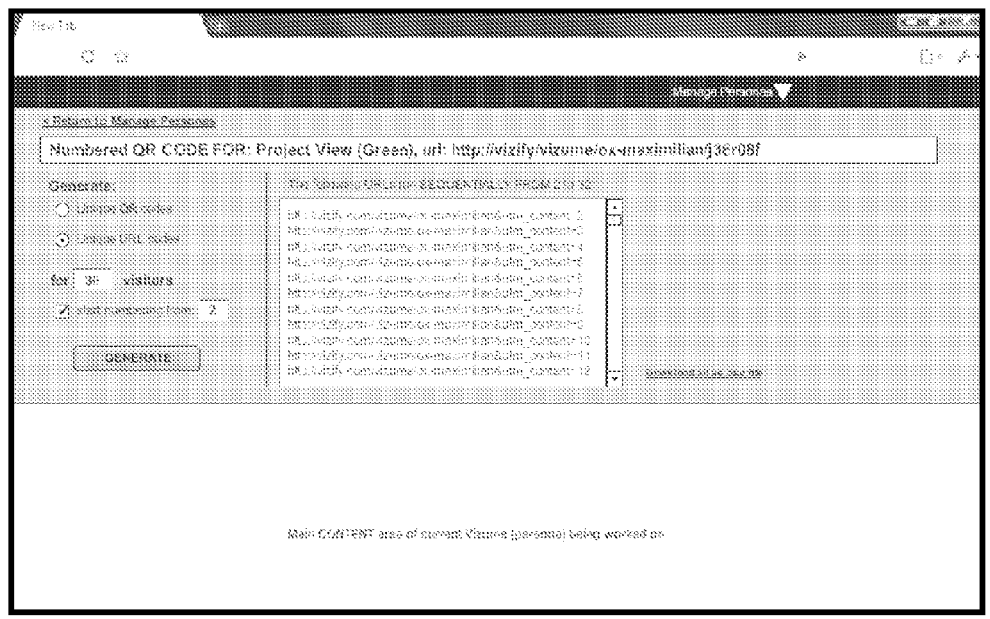
FIG. 39 shows an exemplary screen view of a page for generating numbered QR links, in one embodiment of the disclosure.

In one embodiment, the system also allows for the tracking of individual viewers through a basic numbering and URL-variation scheme, which may be accessed, e.g., via one of the "Numbered QR" links shown in FIG. 37. Unlike the red/blue business card example above, tracking of the individual viewer is keyed to a single primary destination URL rather than multiple different destination URLs. In this scenario, each individual viewer is tracked by appending a unique string to this destination URL that will be ignored when the page is rendered, but that is captured by an analytics program connected to the system. In one embodiment, this unique string is formatted to work with the Google Analytics tracking software and is algorithmically generated according to the same format specified in Google's URL Builder tool (see: http://www.google.com/support/analytics/bin/answer.py?answer=55578). The algorithm takes the user-supplied number of viewers and loops from 1 to that number, generating a single URL per traversal through the loop. According to the Google Analytics URL-suffix format, a string is used that begins with the "?" symbol and contains "&utm_content=1", where the number "1" is replaced by successive numbers (i.e., the count in the loop) that will be imprinted on each unique instance of the printed objects. If QR or other encodings are to be included on the printed objects instead of the URLs themselves, then a specific QR code is generated for each of these encodings, as shown in the exemplary screen view of FIG. 39.

Each of these codes can be embedded into an object via the following process similar to that described above. When a visitor arrives at the site via one of the numbered URLs, that visit is recorded in the analytics program. From there, standard pageview data can be accessed by the system and reported back to the user via a delayed job that gathers traffic data from the analytics system. In one embodiment, pageview data is downloaded through Google Analytics' Data Export API (http://code.google.com/apis/analytics/docs/gdata/home.html). This data can then be presented to the user to show which codes were viewed, when those codes were viewed, and how often those codes were viewed. Alternatively, an API such as the Mixpanel API could be used instead of Google Analytics, because Mixpanel permits direct access to the data of interest and can even generate graphs of the data of interest using simple API calls.

In some embodiments, the system contains one or more advanced methods to control or adjust the particular Persona that a viewer will experience, even after the linked object has been manufactured or disseminated to the potential viewer.

One method for Persona control and/or adjustment involves the system user continuing to edit or modify a particular Persona that resides at a given URL, as described in further detail above. In addition, the user's main public profile can be set to point to any of the user's existing Personas. For objects that point to this public profile, any change of the default public Persona will result in changing the presentation seen by visitors following an URL or encoded URL that points to this default public profile.

In one embodiment, additional settings are accessible through the Manage Persona control panel of FIG. 37. These controls are particularly unique and useful, because conventional online professional-presentation methods do not allow for the dynamic shifting of presentation from viewer to viewer. The value of this behavior is further enhanced by the way in which the linked object directs the viewing user to a page whose content can be dynamically shifted in a way that will not destructively affect (i.e., break) the link itself.

Additional exemplary methods that can be activated by a specific user of the system through options shown in FIG. 37 include the following:

In one embodiment, the "prompt" feature (to which a link is shown in FIG. 37) enables the system to electronically prompt the owner (e.g., via an email, web notification, or text messaging number collected via a form dialog when the prompt is activated) each time an infographic is in the process of being accessed by a potential viewer, to query the owner regarding which presentation and/or data set should be presented to the potential viewer. When a viewer attempts to access a destination URL having a prompt feature that has been turned on, the system's web server initially responds by serving a placeholder interstitial image (e.g., that advises the viewer that the "presentation is being accessed"). Simultaneously, the web server generates a message that is routed to the infographic owner, e.g., via standard messaging protocols (SMTP, SMS, etc.), advising the owner that the page is in the process of being accessed and providing a numbered list of possible presentations that can be shown (which list represents all of the Personas available to the user). The infographic owner replies to the message with the number (in the numbered list) of the Persona that is to be presented. When this reply message is received, the system then serves the appropriate Persona. In one embodiment, a default presentation Persona and time limit can be set, such that if the infographic owner does not reply within the set time limit, the default Persona would automatically be displayed.

Alternatively, the "rules" feature (to which a link is shown in FIG. 37) enables the infographic owner to specify rules that are evaluated each time a viewer arrives at the corresponding presentation page, which rules determine dynamically which page is shown. These rules are built by the infographic owner's entry of rule data into form fields that can be used by the system to establish "if-elseif-then" evaluation relationships, e.g., represented in the system code as condition/presentation pairs, where the condition is first evaluated. If the evaluation passes, then the presentation part of the pair is a pointer to the Vizume that should be displayed, thereby allowing users to customize both the data and presentation of an infographic based on these rules. Exemplary rules include:

1. Rules that alter the presentation and/or data displayed based on comparing time or dates specified in the rules to the current time and date: To construct these rules, the infographic owner enters values that represent date-time variables connected by logical operators ($<, <=, =, >, >=$), and, for each rule created, an accompanying selection from the list of Personas available for display. The list of Personas is generated by querying the set of saved Personas contained in a specific user's Data Store.

2. Rules that alter the presentation and/or data shown based on type of device used to view the infographic: These rules are constructed by presenting the infographic owner with a selection list of device types, including mobile and desktop devices that are identified based on User-Agent headers (see, examples at http://www.zytrax.com/tech/web/mobile_%5Fids.html), and, for each rule created, an accompanying selection from the list of Personas available for display.

3. Rules that alter the presentation and/or data shown based on the number of views, or a unique identifying number contained in the code: In this case, the infographic owner enters numeric values that represent either the number of visitors or the specific identifying number code to be associated with a presentation (as shown in shown in FIG. 39 and described above with reference to the numbering URL system), and can set ranges by adding logical operators ($<, <=, =, >, >=$) to these values, and, for each rule created, an accompanying selection from the list of Personas available for display.

4. Rules that alter the presentation and/or data shown based on the identity of the viewer as may be ascertained, e.g., by a login to a site such as Facebook or LinkedIn: In this case, the infographic owner enters strings that match the first and last name of the individual in question, and, for each name rule created, an accompanying selection from the list of Personas available for display. In addition, the infographic owner supplies a default Persona in the event the name produces no matches. The system implements this rule by first prompting a visitor to the page in question to identify himself or herself by logging in with a service such as one of the common identity-based social networks on the web (e.g., Facebook or LinkedIn). The user's name is then extracted at the time of login and matched against the set of strings contained in the rule.

Figure 40:
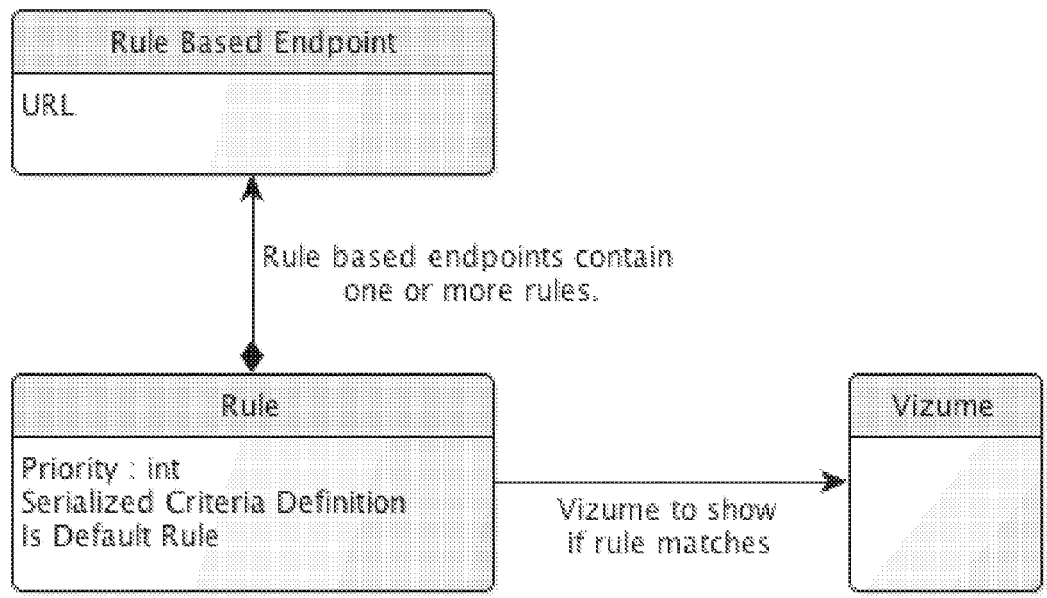
FIG. 40 is an entity relationship diagram of exemplary presentation rules in the system database, in one embodiment of the disclosure.

FIG. 40 is an entity relationship diagram of exemplary presentation rules in the system database, in one embodiment of the disclosure. In this example, presentation rules are defined in the database as follows:

Each URL that is subject to the evaluation process is stored in a rule-based endpoint decision table, wherein each endpoint contains one or more rules. Each rule either has one or more associated criteria that define what constitutes a match, or is a default rule that contains no criteria. Criteria are stored as serialized Rails code. Each rule also points to the Vizume to be used if that rule matches. Since a Vizume points to the data to be presented (i.e., the Persona) and the presentation itself (i.e., the infographic template, font and color sets, etc.), the choice of the entire rendered infographic can be defined by a rule.

When a request for a URL that exists in a rule-based endpoint is made, the system evaluates each of the rules, one by one, in order of the rule's priority attribute. This is done by loading the rule and then executing the serialized Rails code stored in the criteria definition to see if the rule's criteria have been met. If the criteria have been met, then the Vizume to which the rule points is rendered just as it normally would be if accessed directly. Otherwise, the next rule (in order of priority) is examined. All rules are examined until the default rule, which has the lowest priority, is examined. At this point, the Vizume that is associated with the default rule is rendered.

In one embodiment, the "VR" feature (to which a link is shown in FIG. 37) enables the construction of dynamic infographic visualizations, wherein individual pieces of data are supplied by viewers of the infographic using one or more of several different methods. These viewer-contributed pieces of data are added to a single specific Data Store that serves as the primary data source used to render the infographic visualization in question. The primary owner of the specific Data Store can activate and configure the capture of viewer-response (VR) data in the exemplary system via the "VR" link. In one embodiment of the disclosure, viewer-response data is configured using the following exemplary method:

1. First, the professional builds a Vizume containing a visualization that is compatible with VR data, e.g., via the exemplary methods described above. For example, a legal professional who wishes to represent his or her overall client satisfaction, as rated by individual clients, might build a Vizume containing a "client satisfaction" visualization that portrays satisfaction on a five-point score, with each individual rating as a point plotted in a cluster above the five-point scale.

2. Next, the professional visits his or her Manage Persona configuration settings (shown in FIG. 37) and selects the "VR" option.

Figure 41:
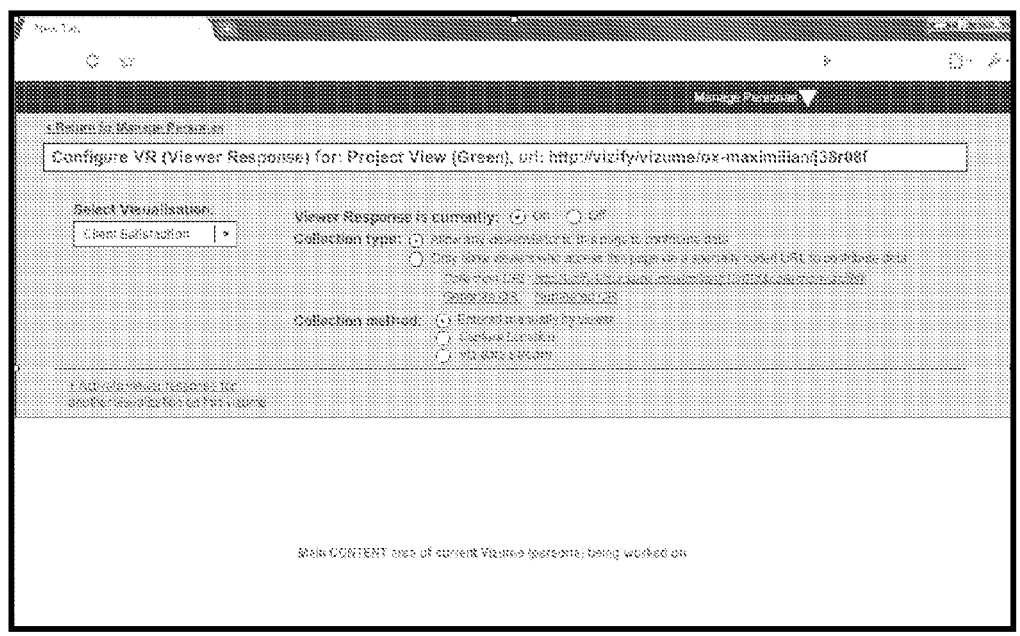
FIG. 41 shows an exemplary screen view of a page for viewer-response (VR) configuration, in one embodiment of the disclosure.

3. After selecting this option, a drop-down list, an example of which is shown in FIG. 41, of the visualizations eligible for VR is presented to the user. In this example, the professional would select the "Client Satisfaction" visualization.

4. The professional can turn viewer response collection on and off with a radio button, as shown in FIG. 41. When a Vizume or Persona is accessed, the system checks to see if VR is on and proceeds with collection of data from viewers only if this logical check passes. In this example, the legal professional would set his or her viewer response to "on."

5. The professional (i.e., the Data Store owner) configures the viewer-response collection method by selecting from one of two configuration options. The first option is to "Allow any viewer/visitor to this page to contribute data." When selected, this option works as described in further detail above, offering a control to a viewer of the infographic to bring up a specialized data collector where the viewer can contribute his or her own structured data to the Data Store. The second option is to "Only allow viewers who access this page via a specially coded URL to contribute data." When this option is selected, only visitors who arrive at the visualization via the generated "Collection URL" will be prompted to contribute data to the visualization. In one embodiment, this URL contains an additional string "&collection=key" that the system can use to validate whether visitors should be presented with the collection option. The "key" value is a randomly generated string that is stored in the database and associated with a given User, Vizume, or Visualization in question. In the example of the legal professional, he or she would select this option.

6. The professional (i.e., the Data Store owner) configures the data collection by selecting from one of three configuration options. The first option is "Entered manually by viewer," which is the default collection method and allows the viewer to enter in data manually, as described in further detail above. In the example of the legal professional, this would be the only option and default presented. Viewers would be presented with the same dynamically-generated editing controls described in further detail above, except that those controls would allow only adding data, not modifying or deleting existing data. Viewer-response data is structured according to the system schema just as any other data, which enables the system to automatically generate forms for collecting this data. The second option is "Capture Location." This method is presented only if the visualization is location-compatible, i.e., a visualization defined in the system as being of the "map" type. In the event this option is selected, the viewer's location is automatically determined using either their IP address or device-native geolocation features (using, e.g., an API provided by a 3rd party, such as https://simplegeo.com/docs/tutorials; http://www.iplocationtools.com; and http://developer.quova.com). The third option is "Via data stream." In one embodiment, this method is presented only if the Data Store owner has an approved developer's key and is working with a device or application capable of storing or transmitting a stream of data in the appropriate data format by an HTTP POST request. When this option is selected, the system will look for additional POST data in the view request that is passed in under a specific parameter and matches the same format employed for the visualization, as described in further detail above with respect to data adapters. In one embodiment, the system supports a representational state (REST) API that allows external systems to supply data in a manner similar to direct submittal by system users. The Data Store owner can enable this API to collect data on his or her behalf from such an external system or device. This capability enables designers and/or developers to develop infographics specifically to collect and visualize data supplied by external systems. For example, a designer might design an infographic (via methods described in further detail above) to tally survey results and enable those results to be supplied by a third-party survey application via the REST API.

The foregoing exemplary method is sufficient to enable and render visualizations that contain one or more pieces of viewer-supplied data in the Data Store. In addition, these methods can be combined with methods for linking a particular infographic persona to a real-world object, as described in further detail above, to facilitate viewer-response data collection via these linked objects.

As shown in the VR-configuration screen view of FIG. 41, additional options are provided to enable the infographic owner to generate encoded QR or numbered QR sequences (in addition to the URL itself) that contain the additional access string as part of their encoding. Continuing the example of the legal professional, it would be possible for him or her to follow the "Generate QR" link and be taken to a results page similar to that shown in FIG. 38. In this case, the encoded link would also contain the access key that can later be used by the viewer to contribute data. The legal professional can then display this QR code on printed cards that invite a client to provide an individual satisfaction score regarding the legal professional's work. These viewers would visit the visualization via the URL encoded in the QR code. Because the URL contains the key, the satisfaction score can be incorporated into the associated Data Store. This score would then be rendered as part of the visualization via the methods discussed in further detail above. Over time, as more clients visit and provide satisfaction ratings, the visualization would continue to be updated and re-rendered.

In addition to the methods described above to link and manage presentations through URLs, in some embodiments, the system also supports a mechanism whereby the available presentations and links can be transmitted in real time to proximate mobile devices, and wherein the infographic owner can optionally select, from a list of available presentations, which presentation should be transmitted through the mobile device. Methods and protocols for transmitting information between two mobile digital devices are known, e.g., Bluetooth or SMS. In addition, a range of third-party services can provide an additional service wrapper around these protocols, facilitating easy transfer of digital information, such as the Bump API discussed above. Such technologies enable the transfer of a professional presentation from the owner to one or more recipients via a mobile device. In one embodiment, this process works as follows:

1. First, the infographic owner and the intended recipient establish a mobile device connection (i.e., session) using the protocol of the Bump API.

Figure 42:
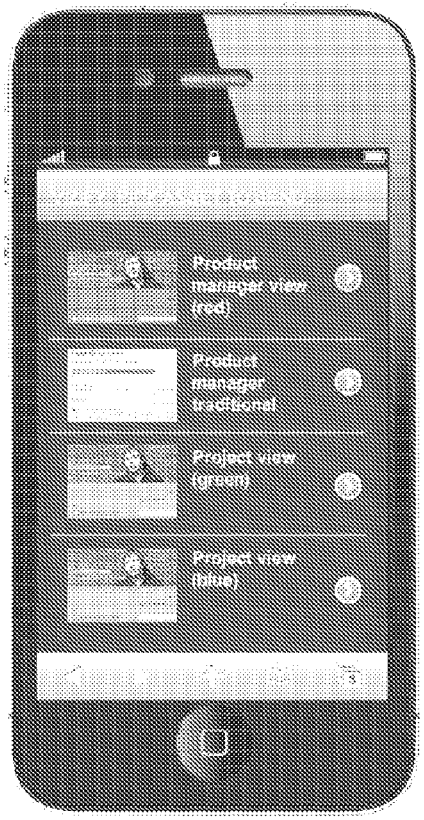
FIG. 42 shows a mobile-application presentation-selection screen, in one embodiment of the disclosure.

2. As shown in FIG. 42, a mobile application is used to present, to the infographic owner, a list of available presentations (along with a visual preview image) to show to the infographic recipient. The infographic owner selects the desired presentation from this list and specifies the transmittal format (e.g., a link to a URL or a system- or device-supported file format, such as JPEG and PDF files representing the infographic), as discussed above in further detail.

Figure 43:
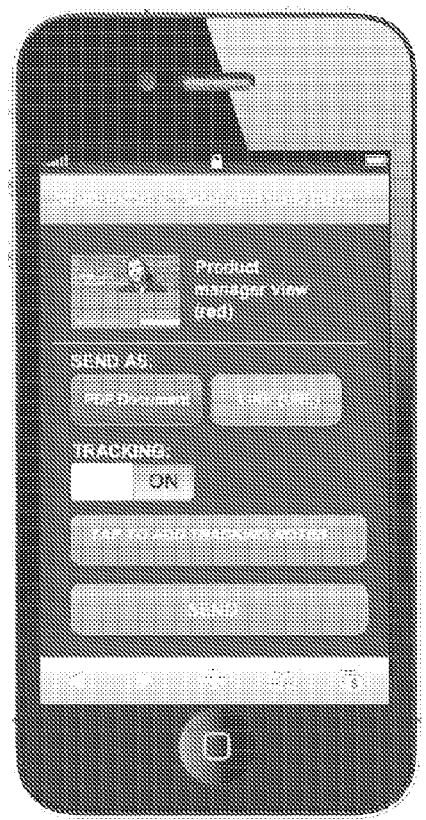
FIG. 43 shows a mobile-application presentation-transmittal configuration screen, in one embodiment of the disclosure.

3. Optionally, as shown in FIG. 43, if the link format is selected, then the infographic owner can select to track this individual's link and add a tracking note. A similar method of URL variation, as described above with reference to numbered QR codes, is used in this case to form the tracking URLs. The base URL leading to the presentation selected by the infographic owner is extended by appending a string recognized by the system to the base URL, enabling the tracking. In one embodiment, the string "&mtr={trackingid}", where the expression "trackingid" is replaced by an incrementing integer, is appended to the end of the URL transmitted. This URL can then be recognized by the system analytics package, as described in further detail above.

4. The infographic owner then selects "transmit" to initiate the transfer of the appropriate digital presentation or presentation link to the recipient (viewer) via mobile-to-mobile device transfer.

5. Once the transmission has successfully completed, the session is ended (e.g., per the BUMP API endSession call).

Aggregate Infographics

In one embodiment of the disclosure, the system enables building "aggregate infographics" by grouping the data contained in a set of individual infographics that represent equivalent data as defined by a schema. Aggregate infographics may be constructed based on totals or averages.

In the embodiments discussed above, an infographic visualization is typically created based on the data contained in the Data Store of a single system user. However, because the form of the data used to render a specific visualization and/or infographic is standardized in a given Persona, some embodiments of the disclosure enable rendering an "aggregate infographic" that reflects data pulled from multiple users' Data Stores.

While not strictly required when building aggregate infographic visualizations, in some embodiments, the system builds the aggregate infographic by copying relevant data and nodes from each of the Data Store users who will be represented in the aggregate infographic into a single new Data Store. In this case, however, the schema reflects the Persona and/or Data Store of the source user, rather than the external source of data for each individual cluster of data (i.e., a reference to an internal database source rather than an external one). The benefit of taking this approach for creating a Data Store is that data contained in this new store can be rendered, shared, and modified in like manner to other Data Stores, as described above in further detail.

In one embodiment, the system stores data related to a single instance in a format defined previously in the schema. A user can choose to group data from multiple instances of data that use the same schema into a single new instance of data. The data can be grouped by summation (i.e., totals) or averages. If the data is grouped by summation, then the values of each instance of data in a particular schema element are added together. This total is stored in a special new instance type of data for groups of data. In one embodiment, the new instance is identical in schema to individual instances of data, except that there is a reference to the other elements that represent the sum of individual instances being summed. Similarly, if the system is configured to group data based on averages, then the values of each instance of data in a particular schema element are added together and then divided by the total number of elements defining that value. This average value is stored in a special new instance type, in like fashion to grouping by totals.

In some embodiments, the individual data points in an aggregated infographic (or Vizume) can point back to their individual source.

One additional element of functionality unique to visualizations and/or infographics created via the foregoing described method is that when the system comes across an internal reference to one or more users' individual Data Stores, an option is provided to the viewer to see any of the linked individual's profiles in full. When viewing and engaging with an aggregated infographic, the user can click or otherwise engage with an infographic component. This click brings up another view that shows infographic components with individual values for each individual piece of data that was represented in the aggregate. This system allows users to see summary infographics of a group of individual instances of data, and then click to highlight/display, in infographic form, the individual instances of data that made up the summary, thereby offering a fast and graphical approach for understanding data.

For example, an aggregate infographic might be constructed to represent the years and areas of practice of thirty different lawyers in a given law firm in the form of a pie chart, where slices of the chart represent practice areas, and the size of the slices is the overall percent or number of years of collective practice. In one embodiment, when clicking on a slice of the pie representing a given practice area, the slice would contain data referencing any of the individual attorneys practicing in this area. The system displays to the user, in addition to the number of years practiced, a hyperlinked list of each attorney represented in the slice, which is constructed from the internal Persona references contained as sources in the data schema. By clicking on one of the names in the hyperlinked list, the viewer is able to browse that individual's legal infographic or visual profile (as reflected in the corresponding Data Store of that individual).

Aggregate views may also be constructed based on a composite "layering approach," in addition to the method described above for building aggregate views based on a summation approach. In the layering approach, the data from each contributing individual's or entity's Data Store is rendered separately as an interactive "layer" in the new aggregate infographic.

When an aggregate infographic of this type is rendered, the system adds a key containing a swatch that is coded, e.g., by color or fill pattern (or some other distinguishing visual indicator, such as a unique image icon), each swatch representing a particular individual or entity that contributed to the collective store, in like fashion to a map key. Each of these swatches acts as an interactive link to an action method that will re-render the aggregate visualization by plotting the data from the given entity whose swatch has been toggled by the viewer. Once the data has actively been plotted, clicking the swatch again will toggle that individual's appearance on the aggregate visualization by invoking a method to remove or clear the connected data from the visualization.

In one embodiment, multiple swatches can be active simultaneously, creating an overlay "layering" effect that plots more than one individual's or entity's data in the same visualization area.

This experience can enhanced, in certain embodiments, through the system's use of non-overlapping colors to distinguish separate entities. In this scenario, when the system encounters or recognizes an aggregate infographic of this type, code is invoked based on the color palette currently applied to the infographic and/or visualization canvas to "step" along the hue, saturation, luminosity (HSL) color scale in regular intervals (whose size is a fraction of the number of individuals and/or entities contained in the aggregate infographic). By altering the colors used to represent each individual, it is easier to understand which individual is responsible for which data when multiple swatches are active. In addition to, or as an alternative to, using different colors to distinguish individuals and/or entities, swatches having different fill patterns, icons bearing different images, or other visually-differentiating mechanisms or features can be used.

This capability represents a particularly useful method for representing the capabilities of groups or teams in infographic formats without requiring a lot of manual manipulation of the underlying data. In addition, the capability to drill down to the individual professional representation reflected in the aggregate whole can be powerful, since the viewer can easily perceive, at an interactive level, the capabilities and talents of individual contributors to the team and/or group.

In various embodiments, aggregate infographics can be generated based on, e.g., (i) pooled data, (ii) averaged data, and (iii) popularity data. In an example scenario in which each individual has an associated list of books that the individual has read, pooled data-based infographics could be used to depict, e.g., (a) a list of unique books read by the collective group of individuals, where the same book read by multiple individuals counts only once, or (b) a weighted list of books read by the collective group of individuals, where the same book read by multiple individuals counts multiple times. In that same example scenario, averaged data-based infographics could be used to depict, e.g., a list of the average books read by an individual in the collective group of individuals. Popularity data-based infographics, in that same example scenario, could be used to depict, e.g., a list of the books most frequently read by the collective group of individuals.

Industry-Specific or Job-Specific Infographics

In one embodiment, industry-specific and/or job-specific schema may be employed to enable infographics to be built in the context of a professional presentation such as an infographic (or Vizume). A "personal skills" based schema enable a specific infographics to be built in the context of personal skills, including, e.g., personality-based traits (e.g., Myers-Briggs rating), general skills (e.g., strong communication skills), certifications (e.g. nursing certifications or Windows Server skill-test results) and specific tasks (e.g., typing words per minute). These schemas can be supplemented through the use of user-contributed or administrator-contributed tags that can be searched via string matching in the database table containing the infographic and/or visualization schemas. A matched group of infographics returned by a query formed either around a selection from the categorization schema or string-based search can be displayed, enabling a user to select and insert the matching infographics into a Vizume.

An exemplary system consistent with embodiments of the disclosure will typically contain a store of visualizations and/or infographic definitions (and display variants thereof), as discussed in further detail above. A system user can construct one or more Personas and/or Vizumes, each containing some number of visualizations and their associated data. In embodiments of the disclosure, each visualization in the system may be represented in the system database with one or more the following components: visualization name, visualization description, visualization author, whether the visualization is free or paid, the cost of the visualization, the visualization master key (used to define all visualization definitions that are variants of the same underlying data), a bit reflecting whether the current visualization is the master default, industry key (a comma-separated string used to define each of the Standard Occupational Classifications (see: http://www.bls.gov/soc/2010/soc_alph.htm) to which the visualization may apply), personal-skills key (comma-separated string used to define each of the skills supported in the system to which the visualization may apply), and associated keywords (comma-separated list of admin or user supplied keywords representing the visualization).

The complete industry-key and personal skills-key lists are each represented as unique tables in the database, whose values are maintained by the system administrator. In the case of the industry key, the values are modeled on a list developed by the U.S. Bureau of Labor Statistics to reflect various occupations. In the case of the personal-skills key, this is a list that has been directly constructed by the system administrators. When a new visualization is added to the system database by the system administrator, industry and personal-skills keys will be applied, if they have not already been included as part of the infographic definition.

In embodiments of the disclosure, various methods may be used for selecting which visualizations are to be contained on a particular Vizume. In one exemplary method, the user selects from a list of system "templates," each of which represents a collection containing one or more of the following parameters: the list and order of the visualizations to be used (and which variant of each of these to render), styling palettes, and the particular data sources for which the user should either supply logins (or from which data will be manually supplied), as described in further detail above.

Alternatively or additionally, a user can construct a Vizume and/or Persona by manually adding one or more infographic visualizations to his or her Persona by selecting an "add visualization" menu option available when the user is in edit mode for a given persona. When toggled, this menu offers three methods that return a list of visualizations that can be selected for addition to the Vizume at the current position order in the Vizume canvas.

The first method is to add visualizations based on occupation by selecting one or more occupations from a drop-down menu of occupations populated with the full list of occupations defined in the system database. When one or more occupations are selected, the system queries the industry key in the database table of visualizations and returns a list of visualizations matching the industry selected. This list is presented to the user, who can then select and add any of the returned visualizations to their active Vizume canvas.

The second method is similar to the first, but adds visualizations based on personal skills selected from a drop-down menu populated with the full list of personal skills Rather than querying the industry key, the query is run against the personal-skills key in the database.

The third method involves the user choosing to search for keywords by typing into a text input box. This constructs a query that searches in all string-based fields associated with the visualization, as described in further detail above.

The selected infographic visualization is then added to the Vizume by inserting a key reference to that visualization into the Vizume document in the appropriate order.

In addition to the foregoing methods, a system user browsing through the list of infographics may also add keyword tags used to describe a given visualization using the following exemplary method: When browsing a given visualization for inclusion in the Vizume, a thumbnail image of the visualization and tags associated with that visualization are presented to the user. In addition, an option to "add more keywords" is visible to the user. When the user selects this option, the user is presented with a text-input dialog that instructs the user to "Add more keywords, separated by commas." When the user has finished typing the new keywords and presses Enter, the system validates the input (e.g., stripping non-standard characters and punctuation, etc.) and appends the new keywords to the existing list by writing them to the database.

Alternative Embodiments

It should be understood that appropriate hardware, software, or a combination of both hardware and software is provided to effect the processing described above, in the various embodiments of the disclosure. It should further be recognized that a particular embodiment might support one or more of the modes of operation described herein, but not necessarily all of these modes of operation.

Although embodiments of the disclosure are described herein in the context of a Data Store corresponding to a single individual "professional" person, it should be understood that such embodiments are similarly applicable to entities. The term "entity" refers in this case to any group of individuals, e.g., an organization, a professional office, a service provider, a company, a non-profit, or another group of individuals. Accordingly, a single Data Store may contain data corresponding to either an individual or an entity (or a plurality of individuals and/or entities, as described in further detail above with reference to aggregate infographics).

The term "match," as used herein, should be construed broadly to refer not only to exact, character-for-character keyword matches and matching of identical numbers, but also to fuzzy-logic matches, i.e., matches made based on the most-probable word or phrase match (or a close numerical match) when no character-for-character keyword match (or exact numerical match) exists. Matching, in the context of the present disclosure, should also be construed to include non-exact keyword matching and matching based on any other criteria and algorithms, e.g., using synonym-based, related-term-based or concept-based keyword matching.

The term "random," as used herein, should not be construed as being limited to pure random selections or pure random number generations, but should be understood to include pseudo-random, including seed-based selections or number generations, as well as other selection or number-generation methods that might simulate randomness but are not purely random. Accordingly, randomization functions, as used in embodiments of the disclosure, may be based on random numbers, non-random numbers, or combinations of random and non-random numbers.

The term "third-party service," as used herein, should be construed as including LinkedIn, Twitter, and Facebook, as well as any other source of data characterizing one or more individuals or entities, where that data source is used to construct one or more infographics and/or visualizations, in certain embodiments of the disclosure. Although, in the foregoing description, data is obtained from a third-party service using a user's login, e.g., via the OAuth authentication mechanism, in conjunction with the third party service's API, data can be obtained from the third-party service (or other data source) in other ways. For example, if the data is available publicly (e.g., displayed on a user's public LinkedIn page), data for a user can be obtained without having any login information by extracting (or "scraping") the data from the HTML code on the user's public web page.

The term "infographic," as used herein, should be construed as being a graphical and/or textual representation of information, data, or knowledge, where such representation has a particular associated visual appearance when that representation is displayed, printed, viewed, or otherwise shared.

The term "output device," as used herein, includes a printer, a monitor or other display, a mobile phone or other mobile device, a disk drive or other storage device, and any other device adapted to interface with a computer system to provide output to one or more users.

It should be understood that various changes in the details, materials, and arrangements of the parts which have been described and illustrated in order to explain the nature of embodiments of the disclosure may be made by those skilled in the art without departing from the scope of the disclosure. For example, it should be understood that the inventive concepts of embodiments of the disclosure may be applied not only in systems for creating infographics representing attributes of individuals and entities, but also in other infographic applications for which embodiments of the disclosure may have utility.

Embodiments of the present disclosure can take the form of methods and apparatuses for practicing those methods. Such embodiments can also take the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the disclosure. Embodiments of the disclosure can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the disclosure. When implemented on a general-purpose processor, the program code segments combine with the processor to provide a unique device that operates analogously to specific logic circuits.

It will be appreciated by those skilled in the art that although the functional components of the exemplary embodiments of the system described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present disclosure. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the disclosure as described herein may be implemented in one or more computers residing on a network transaction server system, and input/output access to embodiments of the disclosure may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, Google Chrome™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the disclosure, in real-time and/or batch-type transactions. Likewise, a system consistent with the present disclosure may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, Google Chrome™, or Apple Safari™). Thus, embodiments of the present disclosure may be appropriately adapted to include such communication functionality and Internet browsing ability. Additionally, those skilled in the art will recognize that the various components of the server system of the present disclosure may be remote from one another, and may further include appropriate communications hardware/software and/or LAN/WAN hardware and/or software to accomplish the functionality herein described.

Each of the functional components of embodiments of the present disclosure may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the disclosure may be server-based and may reside on hardware supporting an operating system such as Microsoft Windows NT/2000™ or UNIX.

Components of a system consistent with embodiments of the disclosure may include mobile and non-mobile devices. Mobile devices that may be employed in embodiments of the present disclosure include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the disclosure include 2.5G cellular network technologies such as GPRS and EDGE, as well as 3G technologies such as CDMA1×RTT and WCDMA2000, and 4G technologies. Although mobile devices may be used in embodiments of the disclosure, non-mobile communications devices are also contemplated by embodiments of the disclosure, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to embodiments of the present disclosure. These personal computers may run the Unix, Microsoft Windows NT/2000™ or Windows 95/98/NT/ME/CE/2000/XP/Vista/7™ operating systems. The aforesaid functional components of a system according to the disclosure may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present disclosure may also be part of a larger system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present disclosure to achieve additional functionality (e.g., as part of an multifaceted online career center, employment bureau, or service provider).

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present disclosure include Java, HTML, Perl, UNIX shell scripting, assembly language, Fortran, Pascal, Visual Basic, and QuickBasic. Those skilled in the art will recognize that embodiments of the present disclosure may be implemented in hardware, software, or a combination of hardware and software.

Accordingly, the terms "computer" or "system," as used herein, should be understood to mean a combination of hardware and software components including at least one machine having a processor with appropriate instructions for controlling the processor. The singular terms "computer" or "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present disclosure. Thus, embodiments of the disclosure are intended to cover all such alternatives, modifications, and equivalents as may be included within the spirit and broad scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

We claim:

1. A processor-implemented method for creating one or more infographics, the method comprising:
(a) the processor receiving, from one or more third-party services, data in a first format, the data associated with an individual or an entity;
(b) the processor mapping the data from the first format to a second format according to a schema employed to (i) define infographics in terms of the data they visualize, (ii) assist system users in selecting data to visualize with a given infographic, (iii) assist users in selecting infographics compatible with a given type of data, and (iv) automatically generate editing components;
(c) the processor storing the mapped data, in the second format, on one or more storage devices;
(d) the processor reading at least a portion of the mapped data from one or more storage devices;
(e) the processor reading an infographic definition from one or more storage devices, the infographic definition comprising a reference to the schema describing visualization of the data and transformation rules governing transformation of the data represented by the schema to an intermediate "pre-rendered" representation for rendering wherein a visual setting affects the visual appearance of the infographic and a rendering rule specifies how one or more individual data elements are to be rendered;

(f) the processor generating one or more infographics based on (i) the at least a portion of the mapped data and (ii) the infographic definition; and (g) the processor providing the one or more generated infographics to an output device and automatically updating the infographics without requiring additional work by a graphic artist or designer.

2. The method of claim 1, further comprising:
the processor prompting a user to provide one or more additional data items included in the infographic definition but not received in step (a);
the processor receiving the one or more additional data items from the user; and
the processor storing the one or more additional data, in the second format, on one or more storage devices.

3. The method of claim 1, further comprising:
the processor notifying a user that updated data from one or more third-party services is available;
the processor obtaining permission from the user to update the stored mapped data based on the available updated data from one or more third-party services is available; and
the processor updating the stored mapped data based on the available updated data from one or more third-party services is available.

4. The method of claim 1, wherein the selections of (i) the at least a portion of the mapped data and (ii) the infographic definition used to generate the one or more infographics are determined by a template.

5. The method of claim 4, further comprising the processor enabling a sale or license of the template to a user.

6. The method of claim 1, wherein:
step (f) comprises:
  (f1) the processor transforming the at least a portion of the mapped data into visualization data in a third format based on the infographic definition; and
  (f2) the processor applying at least one scripts or stylesheet to the visualization data in the third format to determine how the one or more infographics are rendered; and
step (g) comprises the processor rendering the one or more infographics based on the determination in step (f2).

7. The method of claim 1, further comprising:
the processor assigning a uniform resource identifier to the one or more generated infographics;
the processor generating one or more updated infographics using updated mapped data in response to a request from a user supplying the uniform resource identifier; and
the processor providing the one or more updated infographics to an output device.

8. The method of claim 1, further comprising the processor enabling a sale or license of the infographic definition to a user.

9. A non-transitory machine-readable medium, having encoded thereon program code, wherein, when the program code is executed by a machine, the machine implements a method for creating one or more infographics, the method comprising:
  (a) receiving, from one or more third-party services, data in a first format, the data associated with an individual or an entity;
  (b) mapping the data from the first format to a second format according to a schema employed to (i) define infographics in terms of the data they visualize, (ii) assist system users in selecting data to visualize with a given infographic, (iii) assist users in selecting infographics compatible with a given type of data, and (iv) automatically generate editing components;
  (c) storing the mapped data, in the second format, on one or more storage devices;
  (d) reading at least a portion of the mapped data from one or more storage devices;
  (e) reading an infographic definition from one or more storage devices, the infographic definition comprising a reference to the schema describing visualization of the data and transformation rules governing transformation of the data represented by the schema to an intermediate "pre-rendered" representation for rendering wherein a visual setting affects the visual appearance of the infographic and a rendering rule specifies how one or more individual data elements are to be rendered;
  (f) generating one or more infographics based on (i) the at least a portion of the mapped data and (ii) the infographic definition; and
  (g) providing the one or more generated infographics to an output device and automatically updating the infographics without requiring additional work by a graphic artist or designer.

* * * * *